US011163422B1

(12) United States Patent
Boyers

(10) Patent No.: US 11,163,422 B1
(45) Date of Patent: *Nov. 2, 2021

(54) METHODS AND GRAPHICAL USER INTERFACES FOR POSITIONING A SELECTION AND SELECTING TEXT ON COMPUTING DEVICES WITH TOUCH-SENSITIVE DISPLAYS

(71) Applicant: David Graham Boyers, Los Altos, CA (US)

(72) Inventor: David Graham Boyers, Los Altos, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/698,692

(22) Filed: Nov. 27, 2019

Related U.S. Application Data

(63) Continuation of application No. 15/040,717, filed on Feb. 10, 2016, now Pat. No. 10,534,502.
(Continued)

(51) Int. Cl.
*G06F 3/0482* (2013.01)
*G06F 3/0484* (2013.01)
(Continued)

(52) U.S. Cl.
CPC ........ *G06F 3/0482* (2013.01); *G06F 3/04812* (2013.01); *G06F 3/04817* (2013.01); *G06F 3/04842* (2013.01); *G06F 3/04883* (2013.01)

(58) Field of Classification Search
CPC .. G06F 3/04812; G06F 3/0481; G06F 3/0482; G06F 3/0488; G06F 3/04883; G06F 3/04842; G06F 3/038; G06F 3/04817; G06F 3/0485; G06F 3/04886; G06F 3/017; G06F 3/0346; G06F 3/04815; G06F 3/03545; G06F 9/451; G06F 2203/04805;
(Continued)

(56) References Cited

U.S. PATENT DOCUMENTS 7,856,605 B2   12/2010   Ording et al.
8,201,109 B2    6/2012   Van Os et al.
(Continued)

OTHER PUBLICATIONS

Vim, "Highlight Current Line," 2004, Vim Tips Wiki, Published on Web; http://vim.wikia.com/wiki/Highlight_current_line.
(Continued)

*Primary Examiner* — Sheree N Brown

(57) ABSTRACT

A device and method and graphical user interface for positioning a selection and selecting text on a mobile computing device with a touch-sensitive display is described. This includes: displaying a selection having a selection start point and a selection end point within a text content having a text content type; determining the text content type; in response to determining that the text content type is editable text content, displaying the selection within the text content wherein the selection is a zero-length selection; in response to determining that the text content type is read-only text content, displaying the selection within the text content wherein the selection is a one-character-length selection; displaying a control icon; detecting a contact on the touch-sensitive display; and in response to detecting a change in a position of the contact beginning anywhere on the control icon, changing a position of the selection.

24 Claims, 86 Drawing Sheets

Related U.S. Application Data

(60) Provisional application No. 62/117,754, filed on Feb. 18, 2015.

(51) Int. Cl.
*G06F 3/0488* (2013.01)
*G06F 3/0481* (2013.01)

(58) Field of Classification Search
CPC ............ G06F 3/04892; G06F 3/04895; G06F 16/2457; G06F 16/9537; G06F 1/1626; G06F 1/169; G06F 2200/1614; G06F 2203/0381; G06F 2203/04806; G06F 3/0237; G06F 3/0304; G06F 3/03547; G06F 3/041; G06F 3/0425; G06F 3/0484; G06F 3/04845; G06F 16/13; G06F 16/168; G06F 16/2428; G06F 16/24578; G06F 16/248; G06F 16/34; G06F 16/904; G06F 16/9535; G06F 16/954; G06F 16/957; G06F 1/1613; G06F 1/1684; G06F 1/1694; G06F 1/3203; G06F 1/3259; G06F 21/36; G06F 21/83; G06F 2200/1637; G06F 2203/0337; G06F 2203/0339; G06F 2203/0384; G06F 2203/04101; G06F 2203/04801; G06F 2203/04803; G06F 2203/04804; G06F 2203/04807; G06F 2203/04808; G06F 2206/1008; G06F 3/01; G06F 3/011; G06F 3/013; G06F 3/016; G06F 3/0202; G06F 3/0233; G06F 3/0238; G06F 3/0321; G06F 3/033; G06F 3/0338; G06F 3/0354; G06F 3/03543; G06F 3/0362; G06F 3/0386; G06F 3/0395; G06F 3/0412; G06F 3/0416; G06F 3/048; G06F 3/0483; G06F 3/04855; G06F 3/0486; G06F 3/0487; G06F 3/0489; G06F 3/0605; G06F 3/0632; G06F 3/0653; G06F 3/067; G06F 3/16; G06F 40/103; G06F 40/186; G06F 40/274
USPC .......................................................... 715/857
See application file for complete search history.

(56) References Cited

U.S. PATENT DOCUMENTS

| | | | |
|---|---|---|---|
| 8,255,830 B2 | 8/2012 | Ording et al. | |
| 8,370,736 B2 | 2/2013 | Ording et al. | |
| 8,510,665 B2 | 8/2013 | Ording et al. | |
| 8,570,278 B2 | 10/2013 | Kocienda et al. | |
| 8,584,050 B2 | 11/2013 | Ording et al. | |
| 8,610,671 B2 | 12/2013 | Ording et al. | |
| 8,650,507 B2 * | 2/2014 | Westerman | G06F 3/04883 715/863 |
| 8,661,362 B2 | 2/2014 | Kocienda et al. | |
| 8,698,773 B2 | 4/2014 | Westerman et al. | |
| 8,756,534 B2 | 6/2014 | Ording et al. | |
| 9,021,386 B1 * | 4/2015 | Rasmussen | G06F 3/04817 715/786 |
| 9,032,338 B2 | 5/2015 | Murrett et al. | |
| 9,207,855 B2 | 12/2015 | Kocienda et al. | |
| 2008/0048980 A1 | 2/2008 | Love | |
| 2009/0167700 A1 | 7/2009 | Westerman | |
| 2009/0174679 A1 | 7/2009 | Westerman | |
| 2009/0228842 A1 | 9/2009 | Westerman | |
| 2009/0271733 A1 * | 10/2009 | Noma | G06F 3/0486 715/784 |
| 2011/0165913 A1 * | 7/2011 | Lee | G06F 3/04855 455/566 |
| 2011/0279384 A1 | 11/2011 | Miller | |
| 2012/0017147 A1 | 1/2012 | Mark | |
| 2012/0062564 A1 * | 3/2012 | Miyashita | G06F 3/0481 345/419 |
| 2012/0306772 A1 | 12/2012 | Tan | |
| 2012/0311507 A1 | 12/2012 | Murrett | |
| 2014/0078056 A1 | 3/2014 | Yu | |
| 2015/0074578 A1 * | 3/2015 | Liang | G06F 3/04886 715/770 |
| 2018/0129381 A1 * | 5/2018 | Chaudhri | G06F 3/0482 |

OTHER PUBLICATIONS

Head Minion, "Scroll a Word Document, Without Moving the Cursor," Aug. 23, 2010, Bitter Minion Development, Blog Article Published on Web; http://www.bitterminion.com/2010/08/23/stationinary-scrolling-in-microsoft-word/.

* cited by examiner

METHODS AND GRAPHICAL USER INTERFACES FOR POSITIONING A SELECTION AND SELECTING TEXT ON COMPUTING DEVICES WITH TOUCH-SENSITIVE DISPLAYS

RELATED APPLICATIONS

This application claims priority to U.S. Provisional Patent Application No. 62/117,754, "Methods and Graphical User Interfaces for Positioning a Selection and Selecting Text on Computing Devices with Touch-Sensitive Displays," filed by the applicant on Feb. 18, 2015.

TECHNICAL FIELD

The disclosed embodiments relate generally to mobile computing devices with touch-sensitive displays, particularly to a computer-implemented method and graphical user interface for enabling a user to conveniently position a selection and select text on a device with a touch-sensitive display.

BACKGROUND

Mobile computing devices with touch-sensitive displays such as smart phones and tablet computing devices are two of the fastest growing categories of computing devices. These devices threaten to displace notebook and desktop computers as the preferred platform for many tasks that users engage in every day. Developers of these mobile devices have eschewed mouse and touchpad pointing devices in favor of on-screen graphical user interfaces and methods that have the user select content and edit content on touch-sensitive displays using direct manipulation of objects on the screen. Ording, et. al. describe one example of this current approach in U.S. Pat. No. 8,255,830 B2. However, the performance and usability of these current solutions is generally inferior to the mouse and/or touchpad based solutions commonly employed with conventional notebook and desktop devices. Whereas these current solutions support a simple task such as quick selection of a single word or an entire content, they do not support quick selection of a character, group of characters, or group of words. In addition, they do not support equally well tasks performed at any location on the display ranging from tasks near the center of the display to those near the edge of the display. These existing solutions also do not support user setting of key control parameters to meet user preferences and user needs. Finally, these existing solutions do not support user accessibility settings to enable the broadest set of users to access applications on these powerful devices.

We have developed a method and graphical user interface for positioning the cursor and selecting text on computing devices with touch-sensitive displays that overcomes the deficiencies of existing solutions.

SUMMARY

A method, comprising: at a mobile computing device with a touch-sensitive display: displaying a selection positioning and control (SPC) icon; displaying a selection; detecting a finger contact on the SPC icon; and in response to detecting a change in a horizontal position of the finger contact relative to the SPC icon, changing the horizontal position of the selection; and in response to detecting a change in a vertical position of the finger contact: changing the vertical position of the SPC icon; and changing the vertical position of the selection.

A mobile computing device, comprising: a touch-sensitive display; one or more processors; memory; and one or more programs, wherein the one or more programs are stored in memory and configured to be executed by the one or more processors, the one or more programs including instructions for: displaying a selection positioning and control (SPC) icon; displaying a selection; detecting a finger contact on the SPC icon; and in response to detecting a change in a horizontal position of the finger contact relative to the SPC icon, changing the horizontal position of the selection; and in response to detecting a change in a vertical position of the finger contact: changing the vertical position of the SPC icon; and changing the vertical position of the selection.

A computer readable storage medium storing one or more programs, the one or more programs comprising instructions, which when executed by a computing device, cause the device to: display a selection positioning and control (SPC) icon; display a selection; detect a finger contact on the SPC icon; and in response to detecting a change in a horizontal position of the finger contact relative to the SPC icon, change the horizontal position of the selection; and in response to detecting a change in a vertical position of the finger contact: change the vertical position of the SPC icon; and change the vertical position of the selection.

A graphical user interface on a computing device with a touch-sensitive display wherein: a SPC icon is displayed; a selection is displayed; a finger contact on the SPC icon is detected; and in response to detecting a change in a horizontal position of the finger contact relative to the SPC icon, a horizontal position of the selection is changed; and in response to detecting a change in a vertical position of the finger contact: a vertical position of the SPC icon is changed; and a vertical position of the selection is changed.

We begin with a brief description of the drawings.

BRIEF DESCRIPTION OF THE DRAWINGS

For a better understanding of the embodiments of the invention, reference should be made to the detailed description, in conjunction with the following drawings in which like reference numerals refer to corresponding parts throughout the figures.

DETAILED DESCRIPTION

Reference will now be made in detail to embodiments, examples of which are illustrated in the included drawings. In the following detailed description, many specific details are set forth in order to provide a thorough understanding of the present invention. However, it will be apparent to one of ordinary skill in the art that the present invention may be practiced without these specific details. In other embodiments, well-known methods, procedures, components, circuits, and networks have not been described in detail so as to not obscure aspects of the embodiments.

The terminology used in the description of the invention is for the purpose of describing particular embodiments only and is not intended to be limiting of the invention. As used in the description, the singular forms "a", "an", and "the" are intended to include the plural forms as well, unless the context clearly indicates otherwise. It will also be understood that the term "and/or" as used herein refers and encompasses any and all possible combinations of one or more of the associated listed items.

Embodiments of computing devices, user interfaces for such devices, and associated processes for using such devices are described. In some embodiments, the computing device is a handheld mobile computing device such as a smart phone. In some embodiments, the computing device is a handheld mobile computing device such as a tablet. Exemplary embodiments of such handheld mobile computing devices include, without limitation, the iPhone by Apple computer, the Windows phone by Microsoft, the Blackberry by Blackberry, and Galaxy phone by Samsung, the Nexus phone by Google, the iPad by Apple computer, the Surface by Microsoft, and the Galaxy Tab by Samsung, and the Nexus tablet by Google. The device supports a variety of applications including a web browser, an email application, a contacts application, and productivity applications included with the device when sold. The device also supports a variety of applications (apps) developed by third parties that are available for purchase and download from an application store. Typically, an application store makes available applications written to run on a particular mobile operating system. Exemplary operating systems for handheld mobile computing devices include, without limitation, iOS by Apple, Android by Google, and Windows by Microsoft.

In the discussion that follows, a handheld mobile computing device that includes a display and touch-sensitive surface is described. It should be understood, however, that the computing device may include one or more physical user-interface devices, such as a physical keyboard, and mouse, and/or a touchpad.

Attention is now directed towards embodiments of handheld mobile computing devices with touch-sensitive displays.

Figure 1:
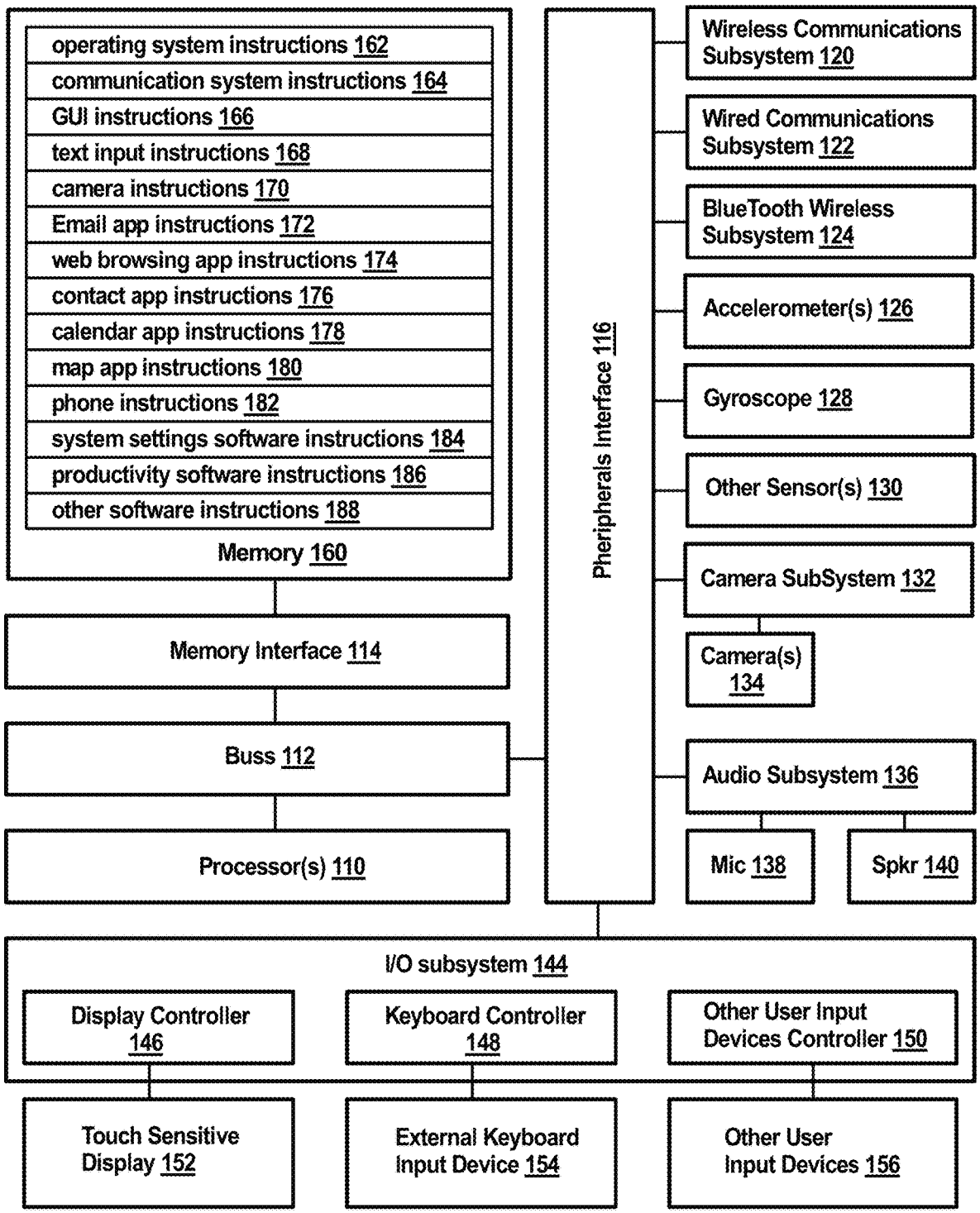
FIG. 1 is a block diagram illustrating a handheld mobile computing device with a touch-sensitive display in accordance with some embodiments.

FIG. 1 is a block diagram illustrating a handheld mobile computing device 100 with a touch-sensitive display in accordance with some embodiments. The device includes processor(s) 110 connected via buss 112 to memory interface 114 to memory 160. The memory will typically contain operating system instructions 162, communication system instructions 164, GUI (graphical user interface) instructions 166, and text input instructions 168. The memory may contain camera instructions 170, email app instructions 172, web browsing app instructions 174, contact app instructions 176, calendar app instructions 178, map app instructions 180, phone app instructions 182, system settings software instructions 184, productivity software instructions 186, and other software instructions 188. The device also includes processors(s) 110 connected via buss 112 to peripherals interface 116. Peripherals interface 116 may be connected to a wireless communications subsystem 120, wired communications subsystem 122, Bluetooth wireless communications subsystem 124, accelerometer(s) 126, gyroscope 128, other sensor(s) 130, camera subsystem 132, and audio subsystem 136. The wireless communication system includes elements for supporting wireless communication via WiFi or cellular or any other wireless networking system. The accelerometers provide information regarding device orientation to the GUI instructions to enable the change of the orientation of the graphical user interface to match the orientation of the device as the device is viewed in portrait or landscape orientation. The camera subsystem is connected to camera(s) 134. These cameras may include one or more cameras for supporting real time video conferencing over a network connection. The audio system may be connected to microphone 138 and speaker 140. The peripherals interface 116 is connected to I/O subsystem 144 comprising display controller 146, keyboard controller 148, and other user input devices controller 150. Display controller 146 is connected to touch-sensitive display 152. Keyboard controller 148 may be connected to other physical keyboard input device including external keyboard input device 154. Other user input devices controller may be connected to other user input devices 156, including, but not limited to a mouse, a touchpad, a visual gaze tracking input device, or other input device.

It should be understood that the device 100 is only one example of a handheld mobile computing device 100, and that the device 100 may have more or fewer components than those shown, may combine two or more components, or may have a different configuration or arrangement of components. The components shown in FIG. 1 may be implemented in hardware, software, or a combination of hardware and software.

Figure 2A:
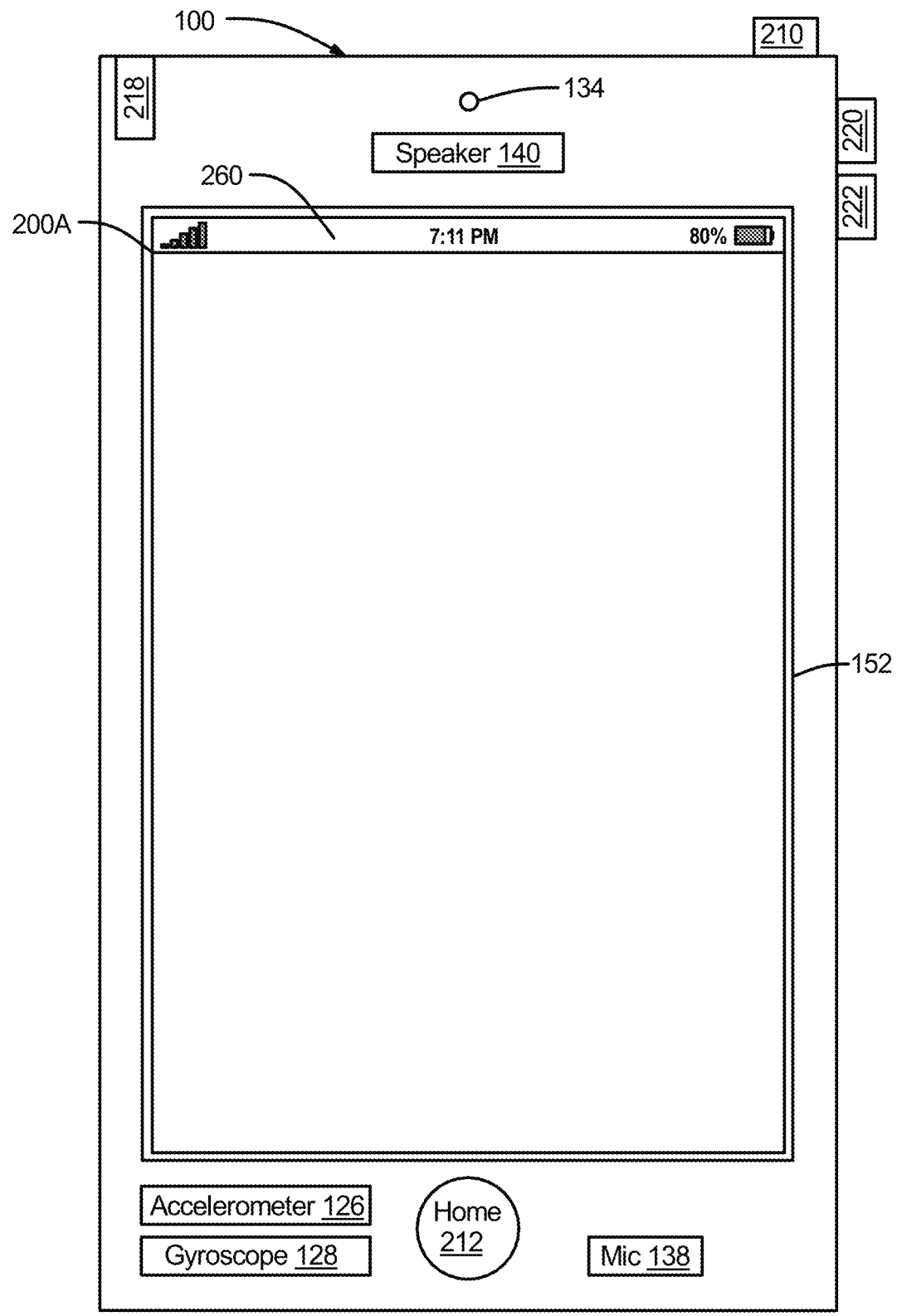
FIGS. 2A-2C illustrate handheld mobile computing devices having a touch-sensitive display in accordance with some embodiments.
Figure 2B:
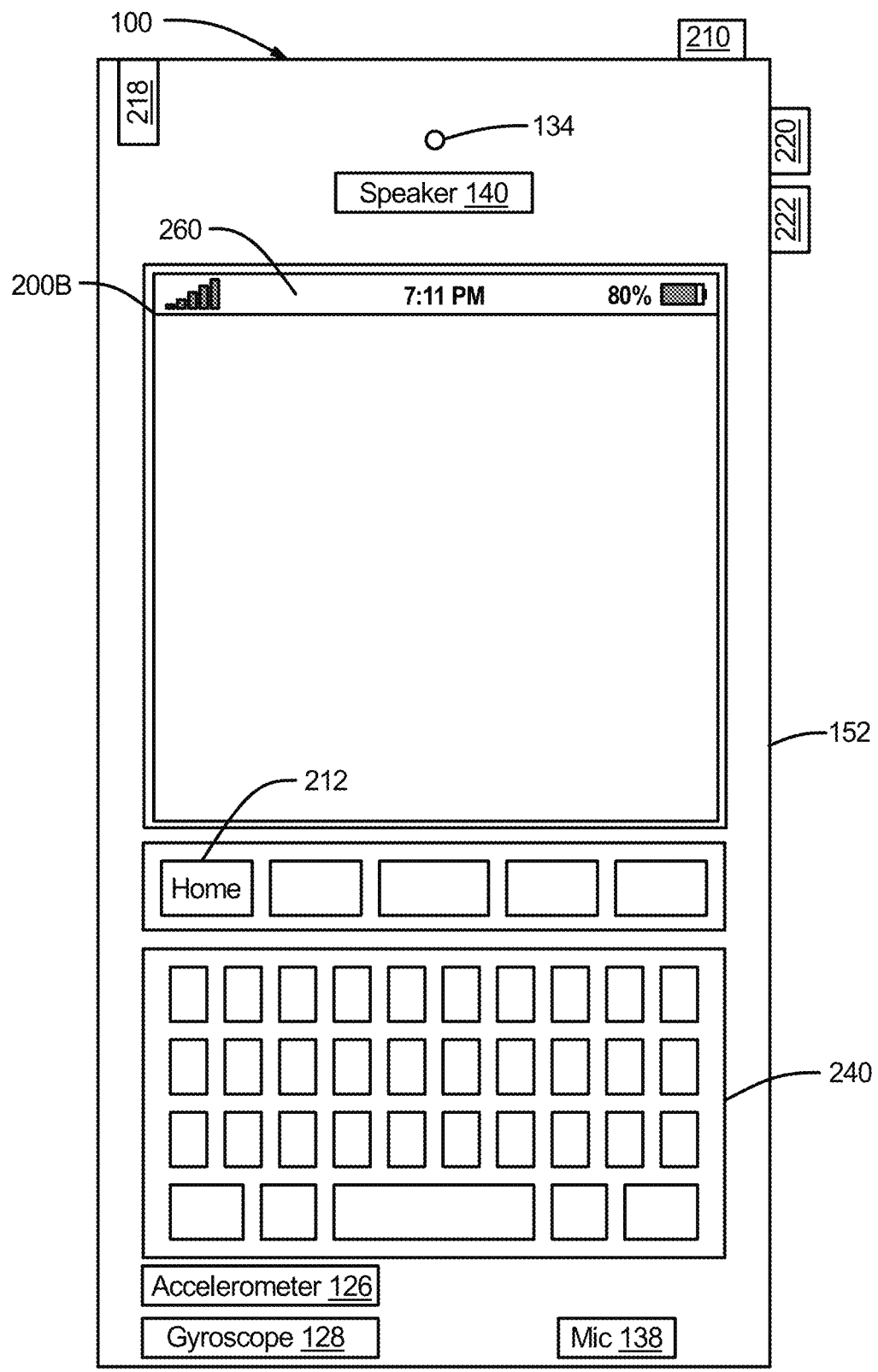
Figure 2C:
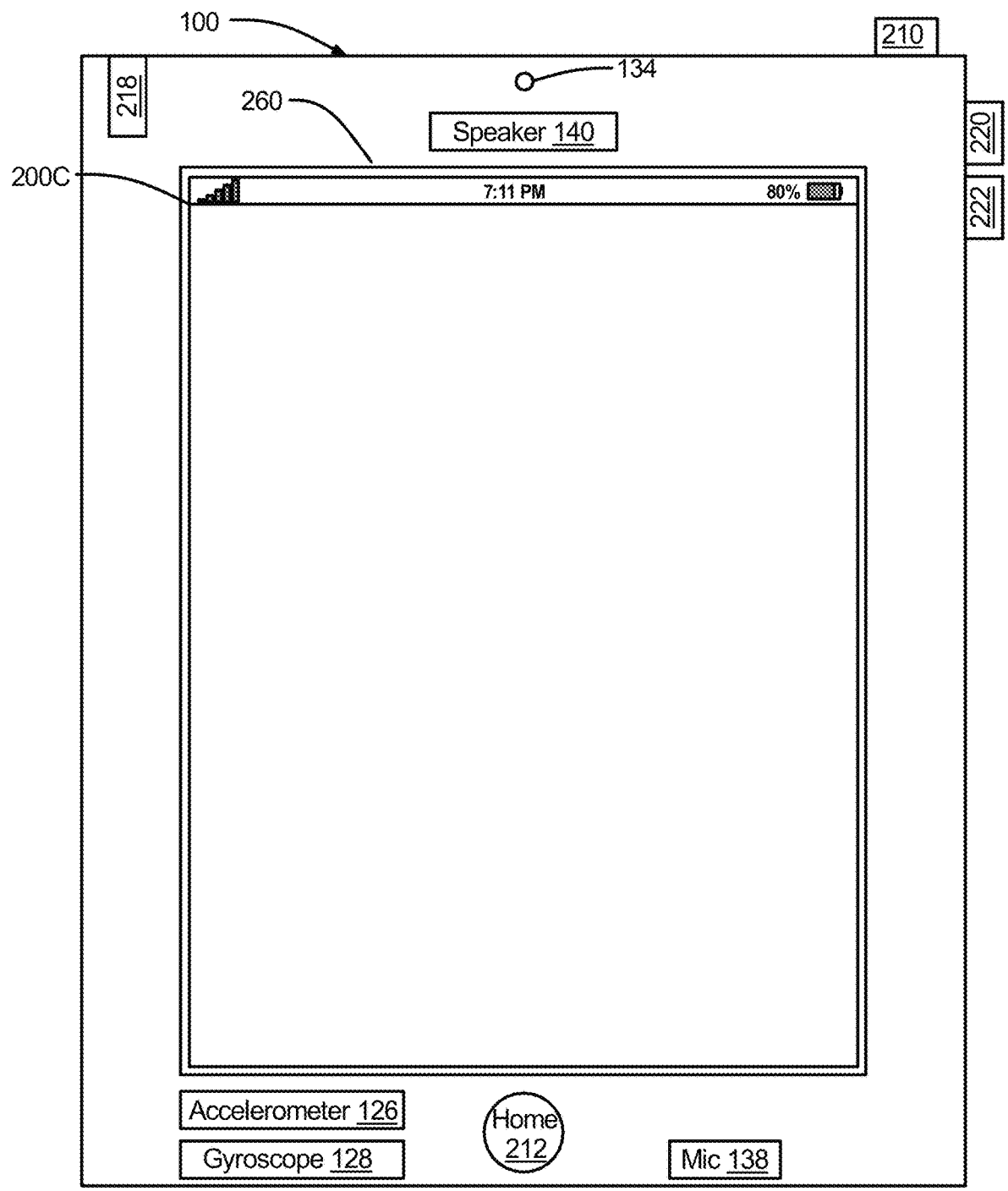

FIGS. 2A-2C illustrate examples of a handheld mobile computing device 100 having a touch-sensitive display 152 in accordance with some embodiments. Handheld computing device 100 may be a smart phone (FIGS. 2A and 2B) or a tablet (FIG. 2C). The touch-sensitive display may display one or more graphics within a user interface on touch-sensitive display 152. In this embodiment, as well as others described below, a user may select one or more graphics (in many instances these graphics are in the form of icons), by making contact with or touching the graphics, for example, with one or more fingers. In some embodiments, selection occurs when a user breaks contact with one or more graphics. In some embodiments, the contact may include a finger gesture, such as one or more taps, or swipes. A swipe finger gesture may be used to drag one icon to the location of another icon, for example. The device 100 may include one or more physical buttons such sleep/wake or power off/on button 210, home button 212, and volume up and down button pair 220 and 222. The device may include one or more accelerometers 126, a gyroscope 128 for sensing the position of the device position in space. The device may include a microphone 138, and speaker 140. The device may include earphone/microphone jack 218 for connection to an external headset. The device may include camera 134, status bar 260, and soft keyboard 240.

Attention is now directed towards embodiments of user interfaces and methods that may be implemented on handheld mobile computing device 100.

The device detects the location of a finger contact and movement of a finger contact across a touch-sensitive display. In some embodiments the finger contact is part of a finger gesture. The device detects the location of a finger gesture and type of finger gesture. Example finger gestures include, but are not limited to, a tap finger gesture (momentary contact of a single finger on the display with no motion across the display), a long-press finger gesture (extended contact of a single finger on the display with no motion across the display, with the duration of the finger contact being approximately 1 or 2 seconds for example), a two-finger-tap finger gesture (momentary and simultaneous contact of two fingers on the display with no motion across the display), a slide finger gesture (extended and uninterrupted contact of a single finger on the display together with motion across the display), and a tap-and-slide finger gesture (momentary contact of a single finger on the display with no motion across the display, followed by extended and uninterrupted contact of a single finger on the display together with motion across the display which begins at the location of the initial tap). The device responds to user gestures and displays a UI based upon the location and type of gesture that the device detects.

FIGS. 3A-3J, FIGS. 4A-4H, FIGS. 5A-5F, FIGS. 6A-6F, FIGS. 7A-7E, FIGS. 8A-8H, FIGS. 9A-9D, FIGS. 10A-10I, FIGS. 11A-11H, FIGS. 12A-12G, and FIG. 13A illustrate exemplary user interfaces and methods, and user interfaces for use in implementing the methods disclosed herein including but not limited to those methods presented in the flow diagrams in FIGS. 14A-14C, FIGS. 15A-15C, and FIGS. 16A-16C. In each case we show a sequence of user interface (UI) drawings to illustrate the use of the UI to implement key elements of the method.

Figure 3A:
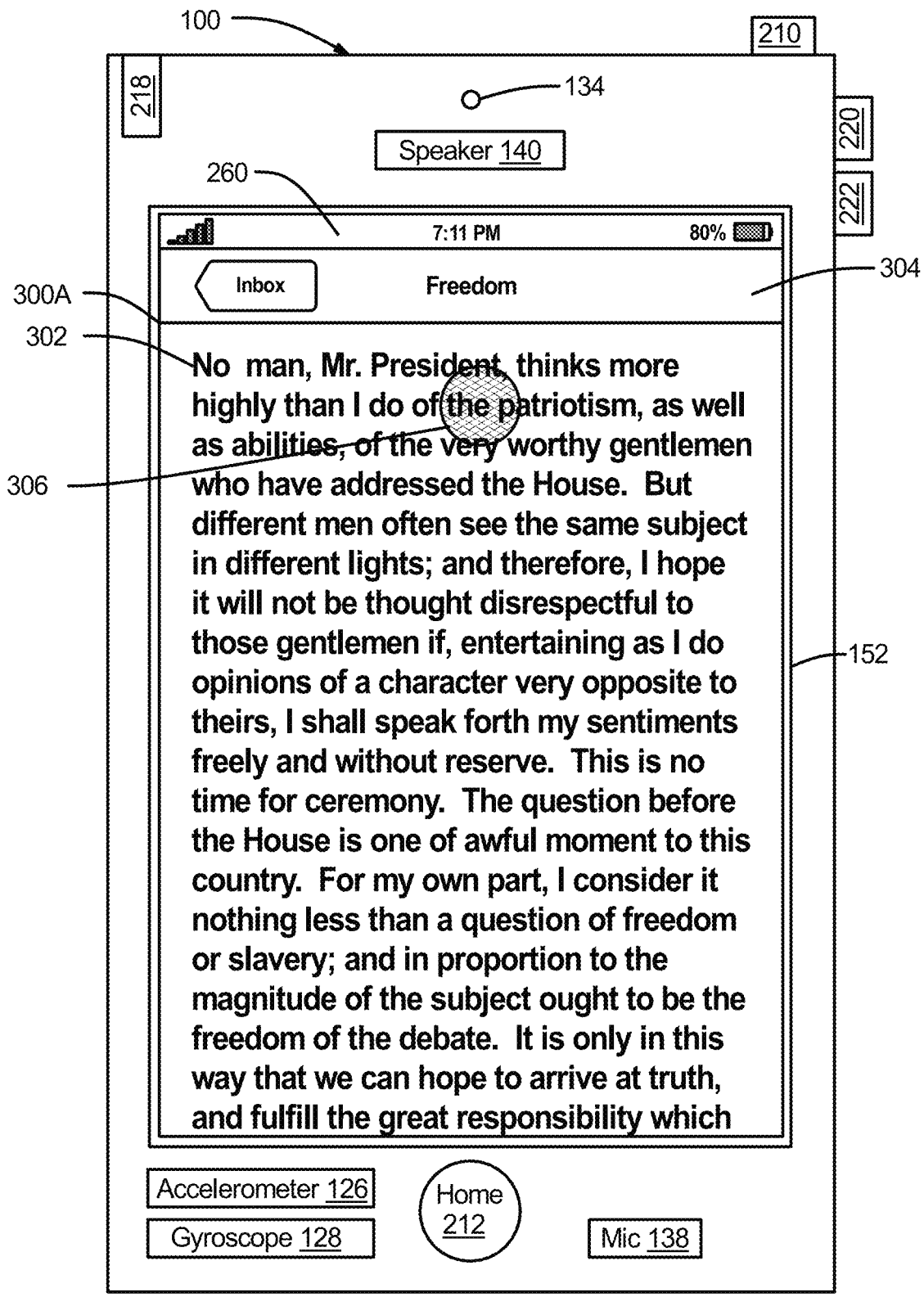
FIGS. 3A-3J illustrate an exemplary user interface and method for positioning a selection of one character length within read-only content on a handheld mobile computing device with a touch-sensitive display in accordance with a first exemplary embodiment.
Figure 3B:
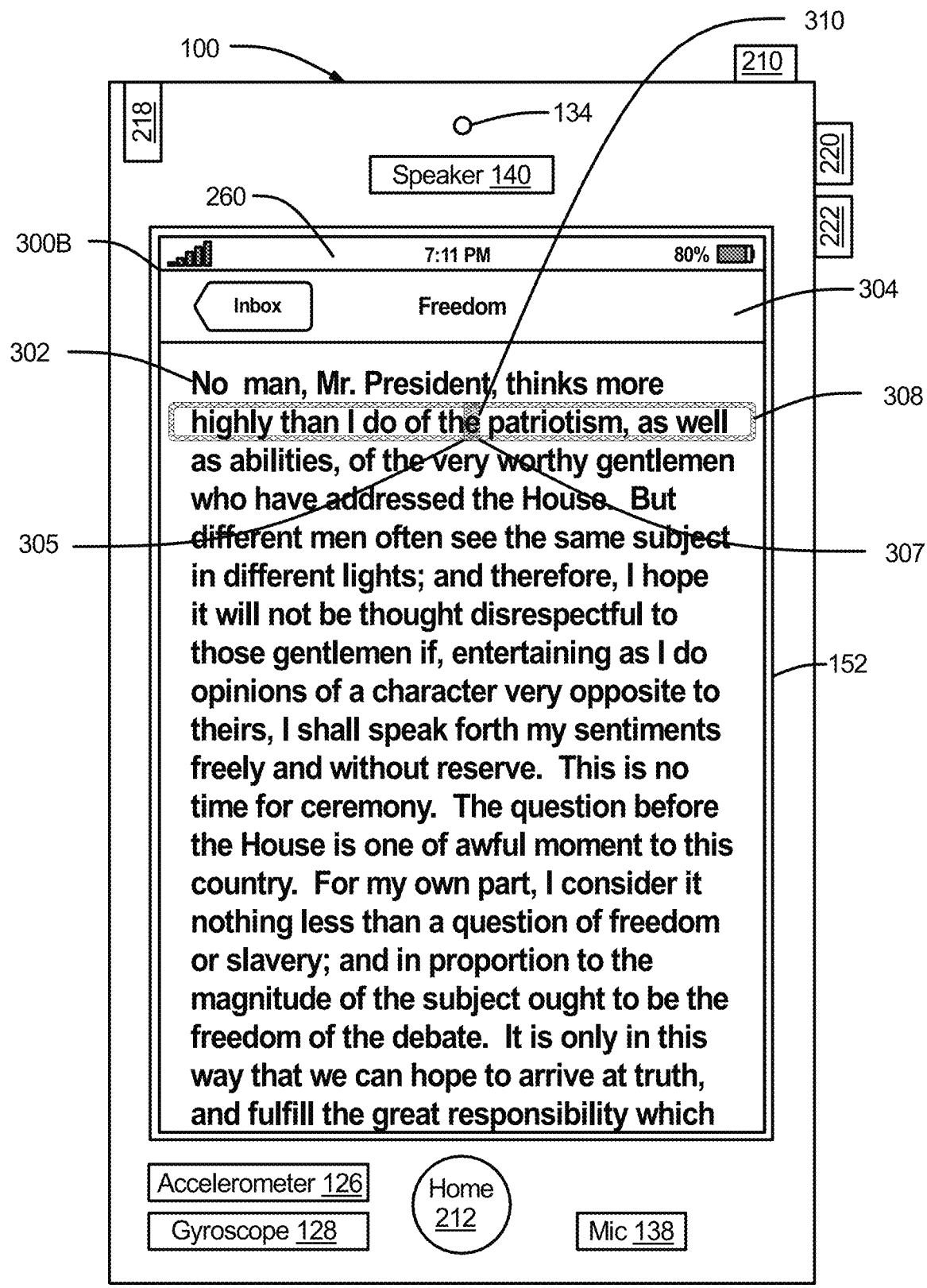
Figure 3C:
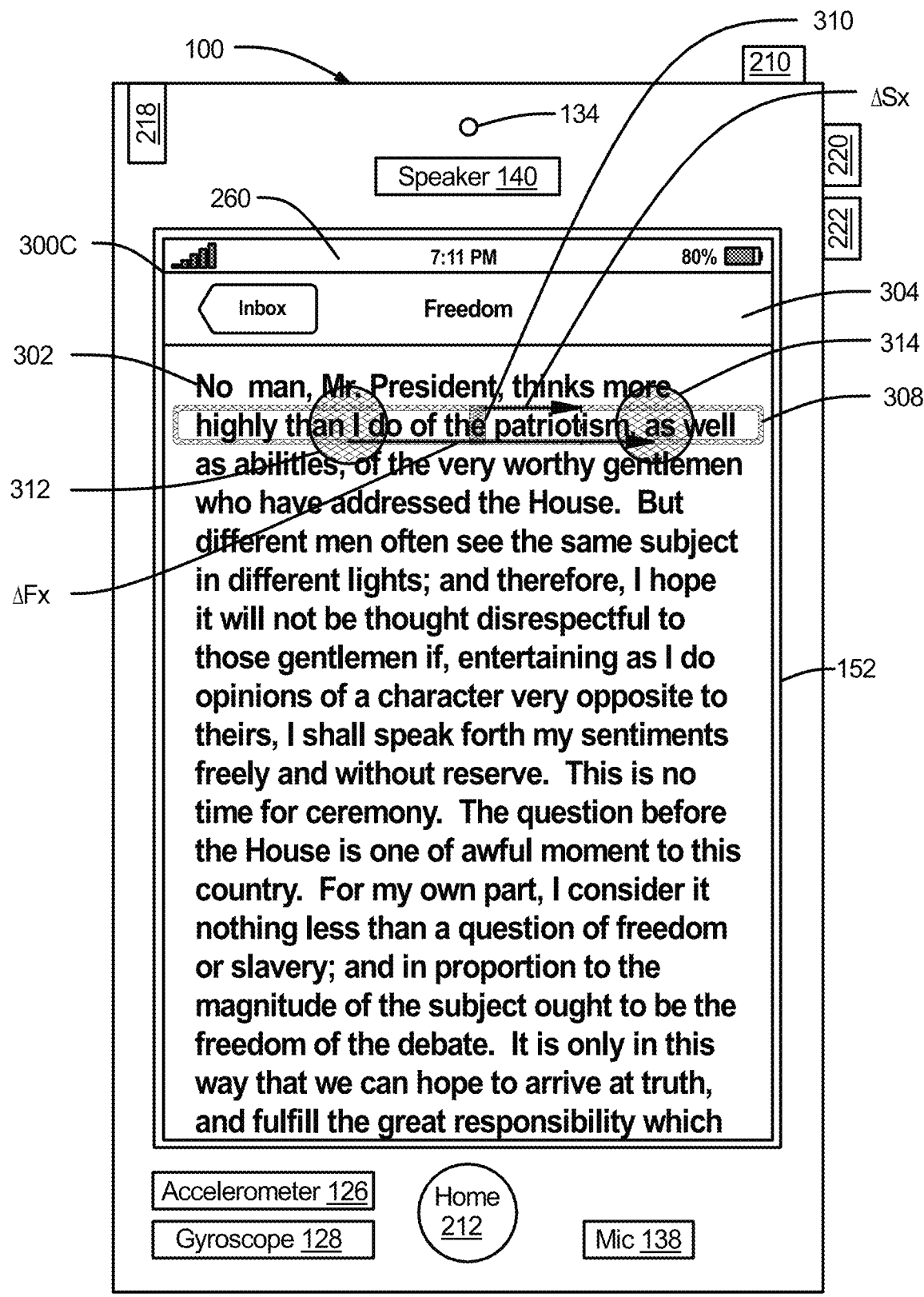
Figure 3D:
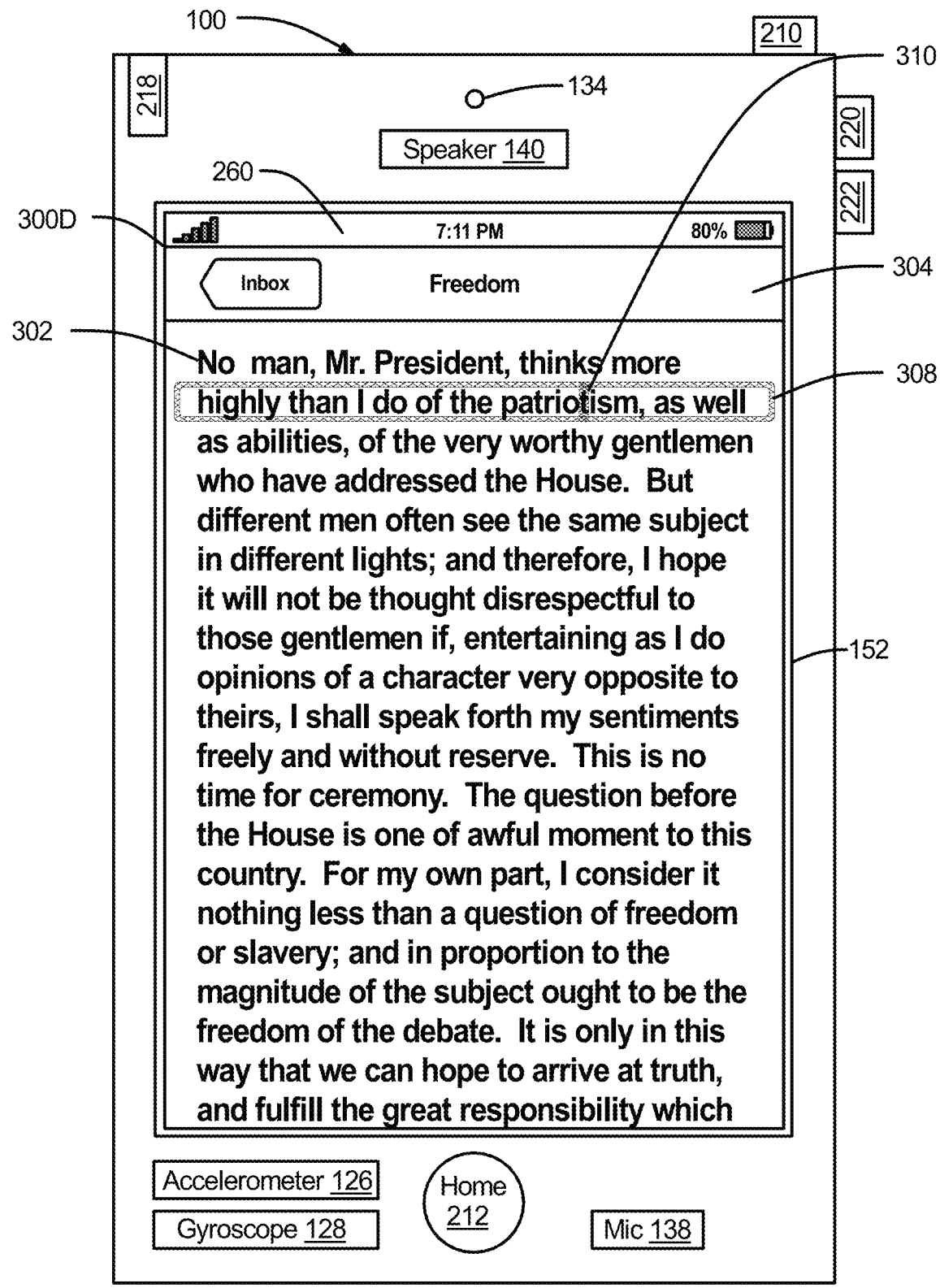
Figure 3E:
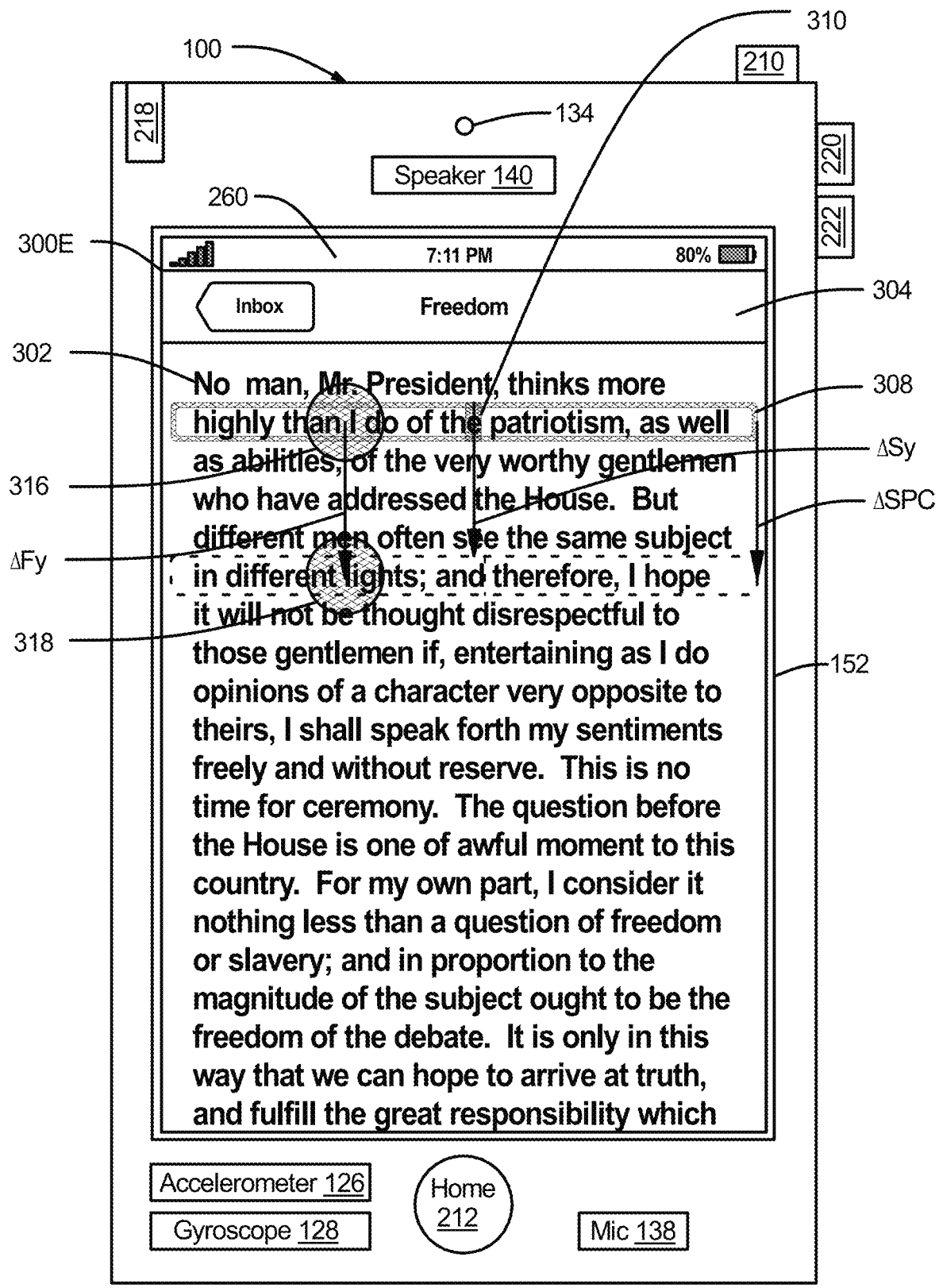
Figure 3F:
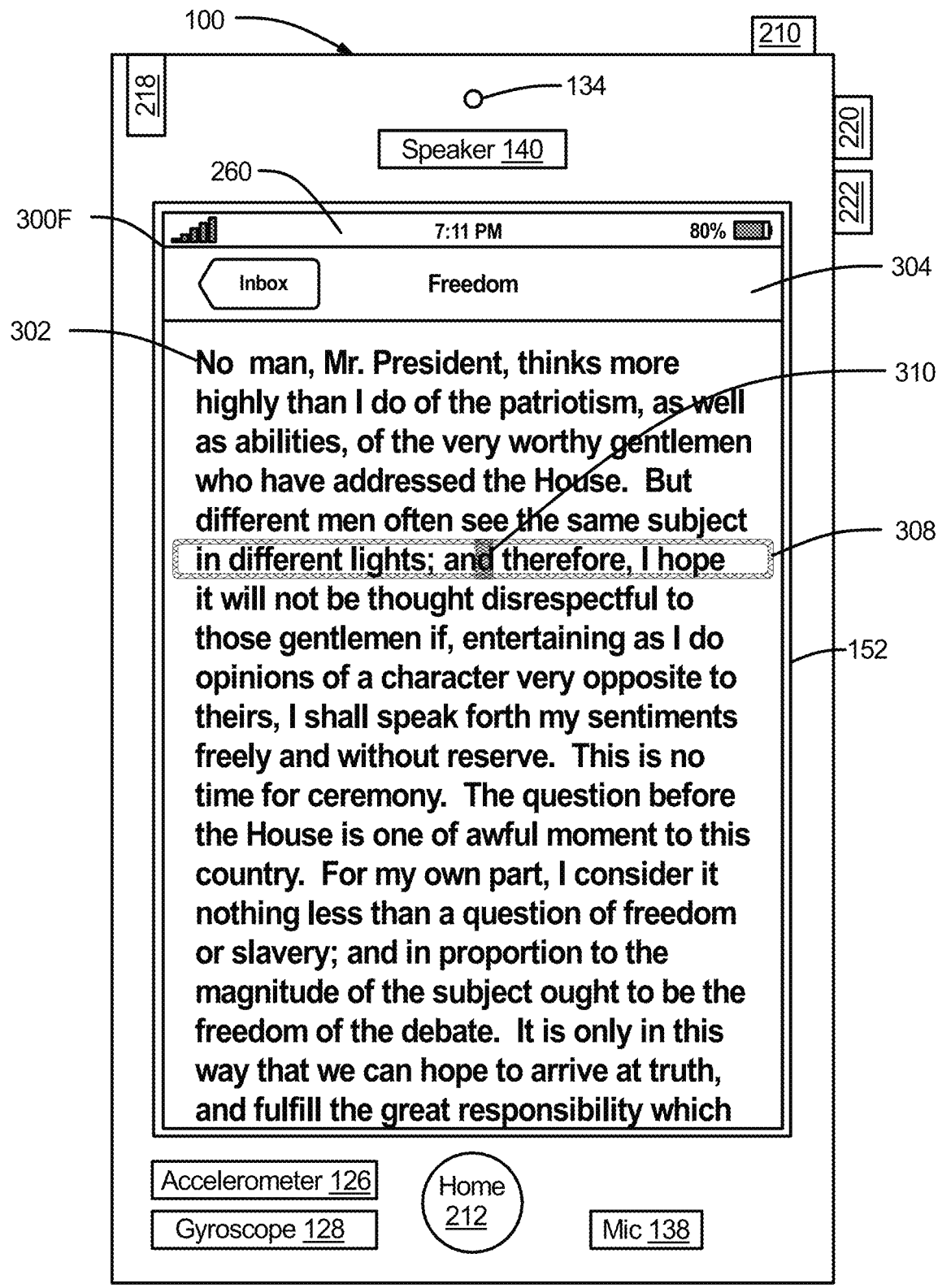
Figure 3G:
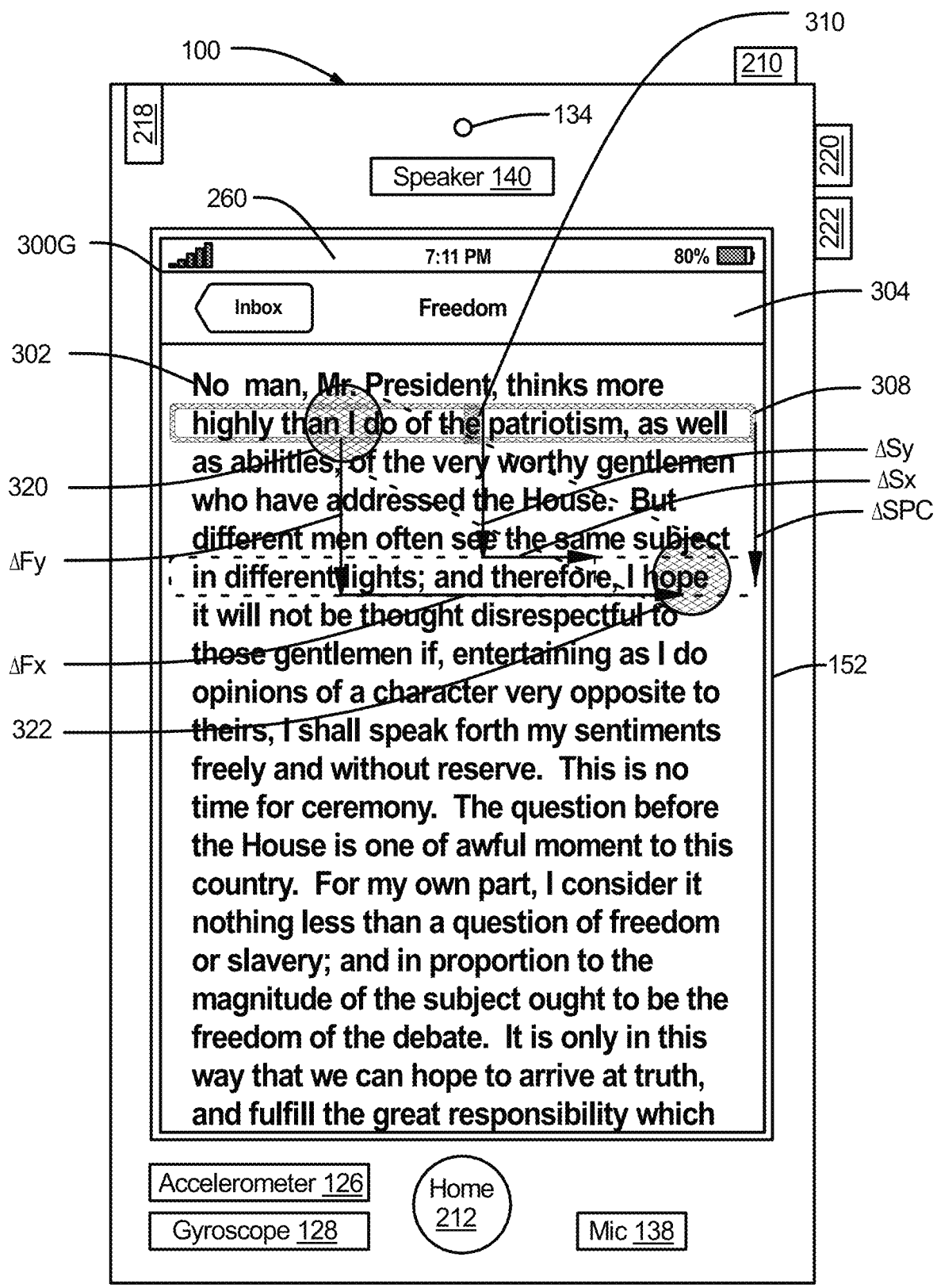
Figure 3H:
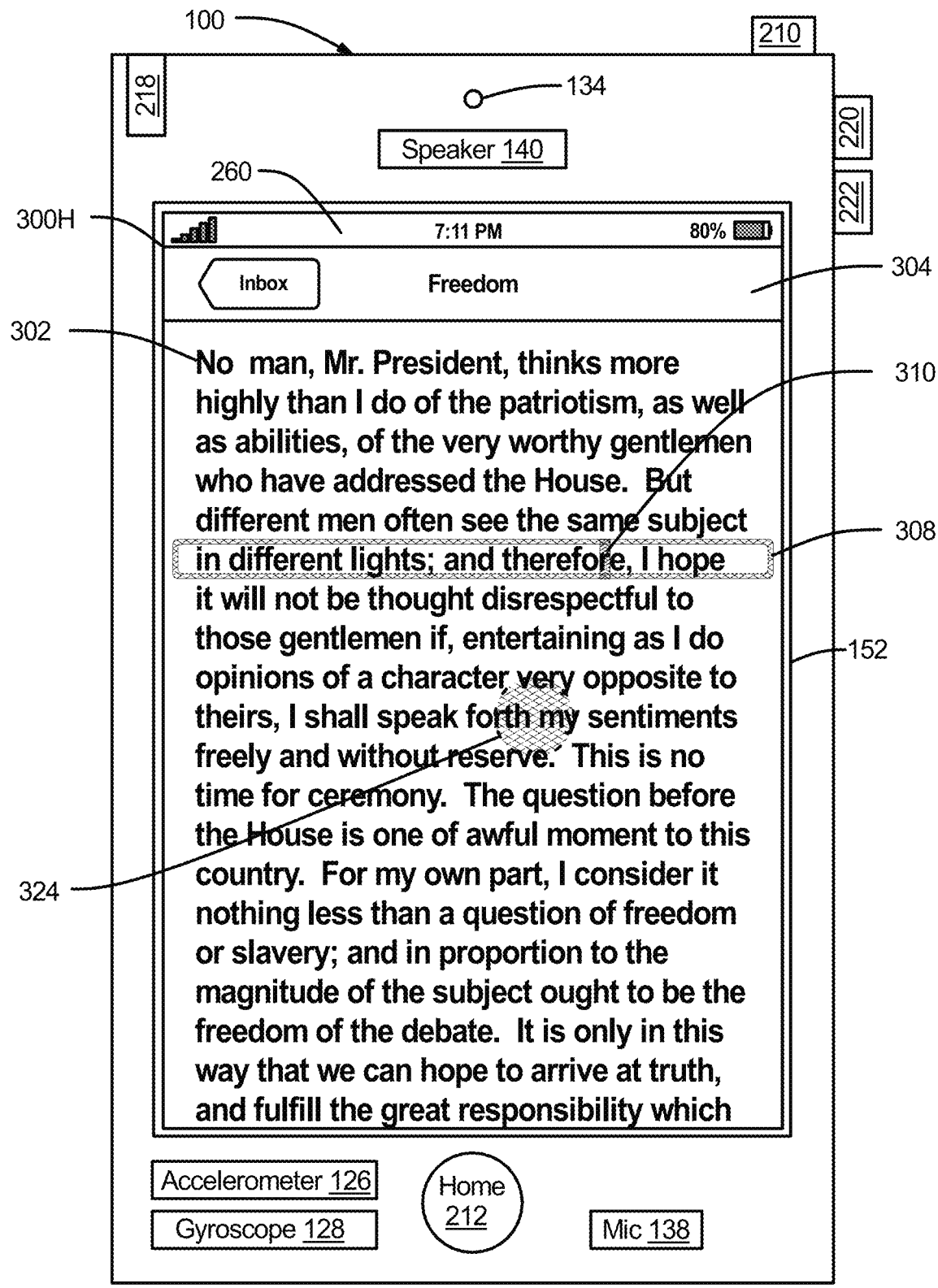
Figure 3I:
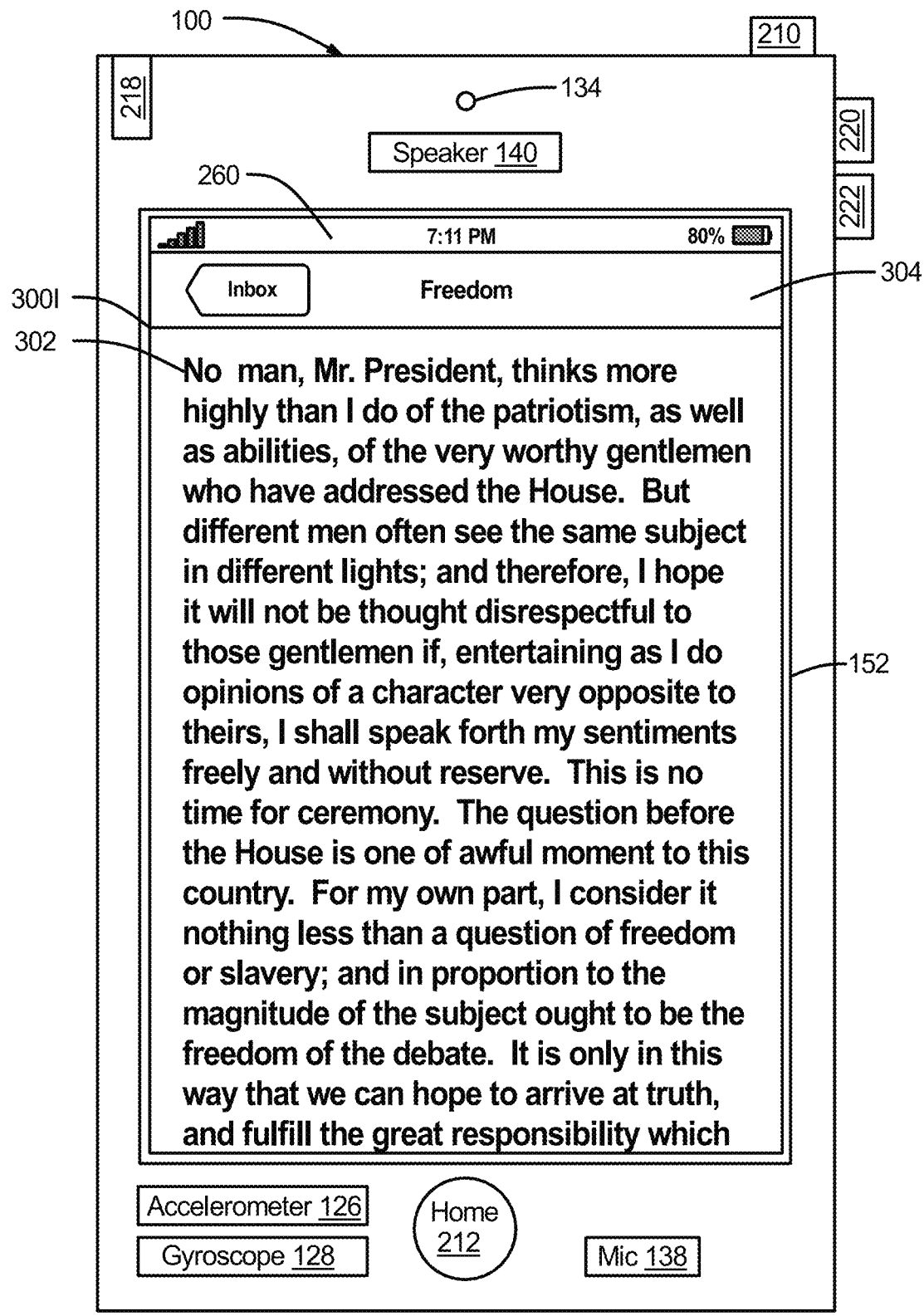
Figure 3J:
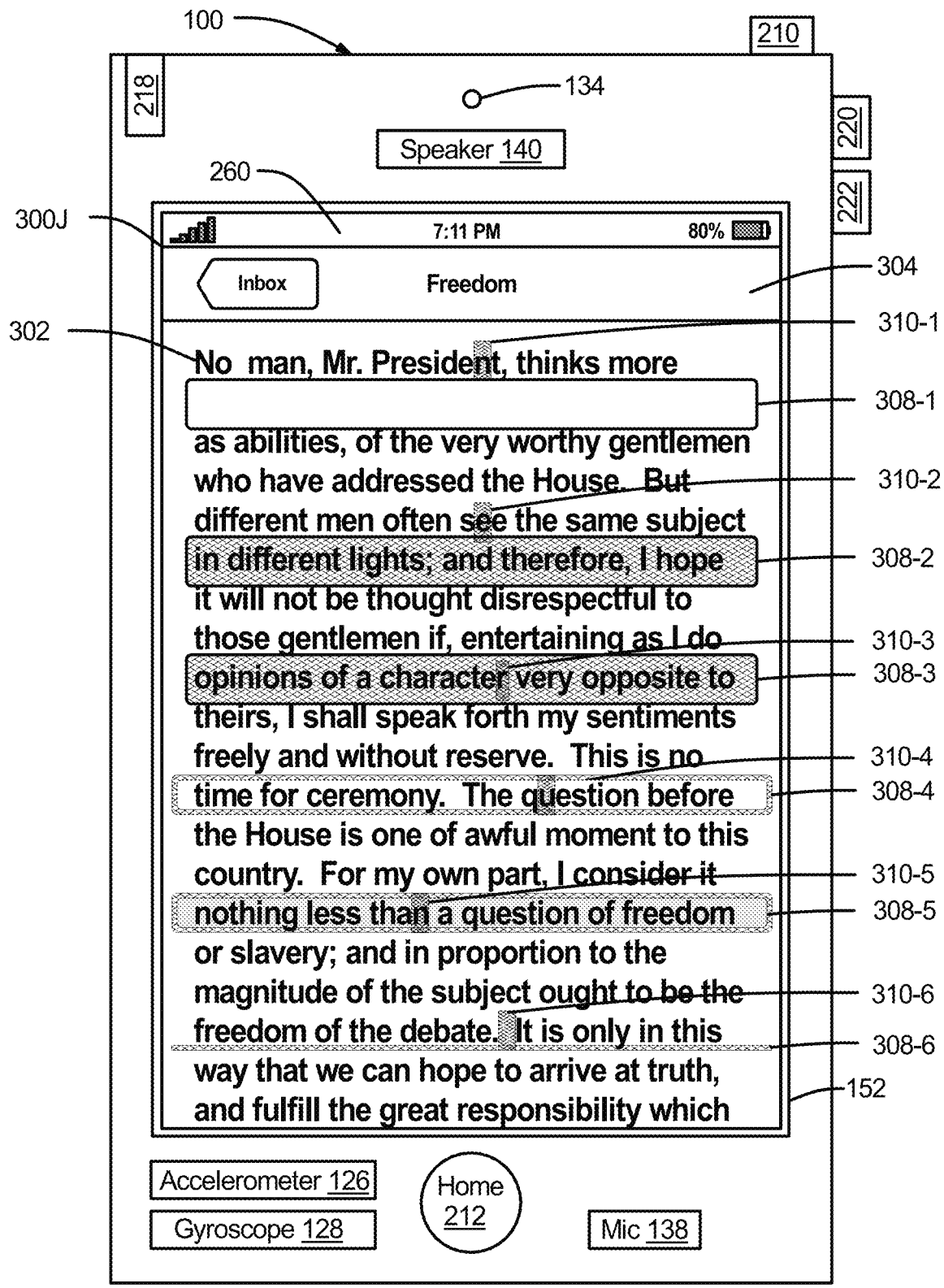

FIGS. 3A-3J illustrate an exemplary user interface and method for positioning selection 310 of one character length with selection start point 305 and selection end point 307 within read-only content on a handheld mobile computing device with a touch-sensitive display in accordance with a first exemplary embodiment. FIGS. 3A-3D illustrate an example of displaying selection 310 and changing the horizontal position of selection 310. FIGS. 3E-3F illustrate an example of changing the vertical position of selection 310. FIGS. 3G-3I illustrate an example of changing both the horizontal and vertical position of selection 310 in one diagonal slide finger gesture. FIG. 3J illustrates examples of alternative embodiments of selection positioning & control (SPC) icon 308. In the example embodiment shown, the selection 310 is one character long. In other example embodiments, the selection 310 could be more than one character long.

The device displays read-only content 302 in UI 300A (FIG. 3A). The device may also display application navigation bar 304. A user may perform a long-press finger gesture 306 on the read-only content in UI 300A. In response to detecting the finger gesture on the content, the device displays UI 300B (FIG. 3B) with selection positioning & control (SPC) icon 308 at an SPC icon first position and selection 310 of one character length at a selection first position. In one exemplary embodiment, the selection first position is the location of the finger gesture on the content. In UI 300C (FIG. 3C), a user may perform a slide finger gesture 312 to 314 on SPC icon 308. In response to detecting $\Delta F_y$ (a change in the horizontal position of an uninterrupted finger contact on the SPC icon), the device changes the horizontal position of selection 310 of one character length on the display from the selection first position to a selection second position such that $\Delta Sx$ (the change in the horizontal position of selection 310) is proportional to $\Delta F_x$ as illustrated in FIG. 3C. This can be written as $\Delta Sx = K_x \Delta F_x$ where $K_x$ is a proportionality constant. The device displays UI 300D (FIG. 3D) with selection 310 of one character length at the second selection position.

The device displays read-only content 302 in UI 300E (FIG. 3E). With selection 310 of one character length at a first position, a user may perform a slide finger gesture 316 to 318 on SPC icon 308. In response to detecting $\Delta F_y$ (a change in the vertical position of an uninterrupted finger contact on the SPC icon), the device changes the vertical position of selection 310 and SPC icon 308 such that $\Delta Sy$ (the change in the vertical position of selection 310) and $\Delta SPCy$ (the change in the vertical position of SPC icon 308) and are equal and proportional to $\Delta F_y$ as illustrated in FIG. 3E. This can be written as $\Delta Sy=\Delta SPCy=\Delta F_y$ where $K_y$ is a proportionality constant. The device displays UI 300F (FIG. 3F) with selection 310 at a second position. In this exemplary embodiment $K_y=1$.

A user may move both the horizontal and vertical position of selection 310 with a single diagonal-slide finger gesture as illustrated in FIGS. 3G-3H. The device displays read-only content 302 in UI 300G (FIG. 3G). With selection 310 at a first position, a user may perform a diagonal-slide finger gesture 320 to 322 on SPC icon 308. In response to detecting $\Delta F_x$ (a change in the horizontal position) and $\Delta F_y$ (a change in the vertical position) of an uninterrupted finger contact on the SPC icon, the device changes the position of selection 310 on the display from a first position to a second position such that $\Delta Sx$ (the change in the horizontal position of selection 310) is proportional to $\Delta F_x$, and such that $\Delta Sy$ (the change in the vertical position of selection 310) and $\Delta SPCy$ (the change in the vertical position of SPC icon 308) are equal and are proportional $\Delta F_y$, as illustrated in FIG. 3G. This can be written as $\Delta Sx=K_x\Delta F_x$ where $K_x$ is a proportionality constant and $\Delta Sy=\Delta SPCy=K_y\Delta F_y$ where $K_y$ is a proportionality constant. Again, in this exemplary embodiment $K_y=1$. The device displays UI 300H (FIG. 3H) with selection 310 at a second position.

A user may hide selection 310 and SPC icon 308 at any time. A user may perform tap finger gesture 324 at any location on the display screen that is not on the SPC icon 308. In response, the device displays UI 300I (FIG. 3I) in which both selection 310 and SPC icon 308 are no longer displayed.

In this description, we have shown one exemplary embodiment for an SPC icon for use in the exemplary UI. There are many different possible approaches to the design of the UI comprising SPC icon 308 and a selection 310. In reference to FIG. 3J we show several example embodiments. The SPC icon may be rectangular in shape with a horizontal extent substantially equal to the horizontal extent of the display in its viewing orientation. The SPC icon may be opaque and displayed at a position offset below the selection as illustrated by SPC icon 308-1 and selection 310-1. The SPC icon may be semitransparent and displayed at a position offset below the selection as illustrated by SPC icon 308-2 and selection 310-2. The SPC icon may be semitransparent and displayed at a positioned collinear to the selection as illustrated by SPC icon 308-3 and selection 310-3. The SPC icon may comprise a semitransparent frame around a clear central region displayed at a position collinear to the selection as illustrated by SPC icon 308-4 and selection 310-4. The SPC icon may comprise a semitransparent frame around a nearly transparent central region displayed at a position collinear to the selection as illustrated by SPC icon 308-5 and selection 310-5. The SPC icon may comprise a very narrow semitransparent rectangular region displayed at a position collinear to the selection as illustrated by SPC icon 308-6 and selection 310-6. In this last example, the exemplary SPC icon is the region that remains after removing one long side and the two short sides of the semitransparent frame SPC icon 308-5. There are other SPC icon designs that may be employed in user interfaces for use in implementing the method of this disclosure.

FIGS. 4A-4H illustrate an exemplary user interface and method for positioning a selection of one character length and selecting text within read-only content on a handheld mobile computing device with a touch-sensitive display in accordance with a first exemplary embodiment.

Figure 4A:
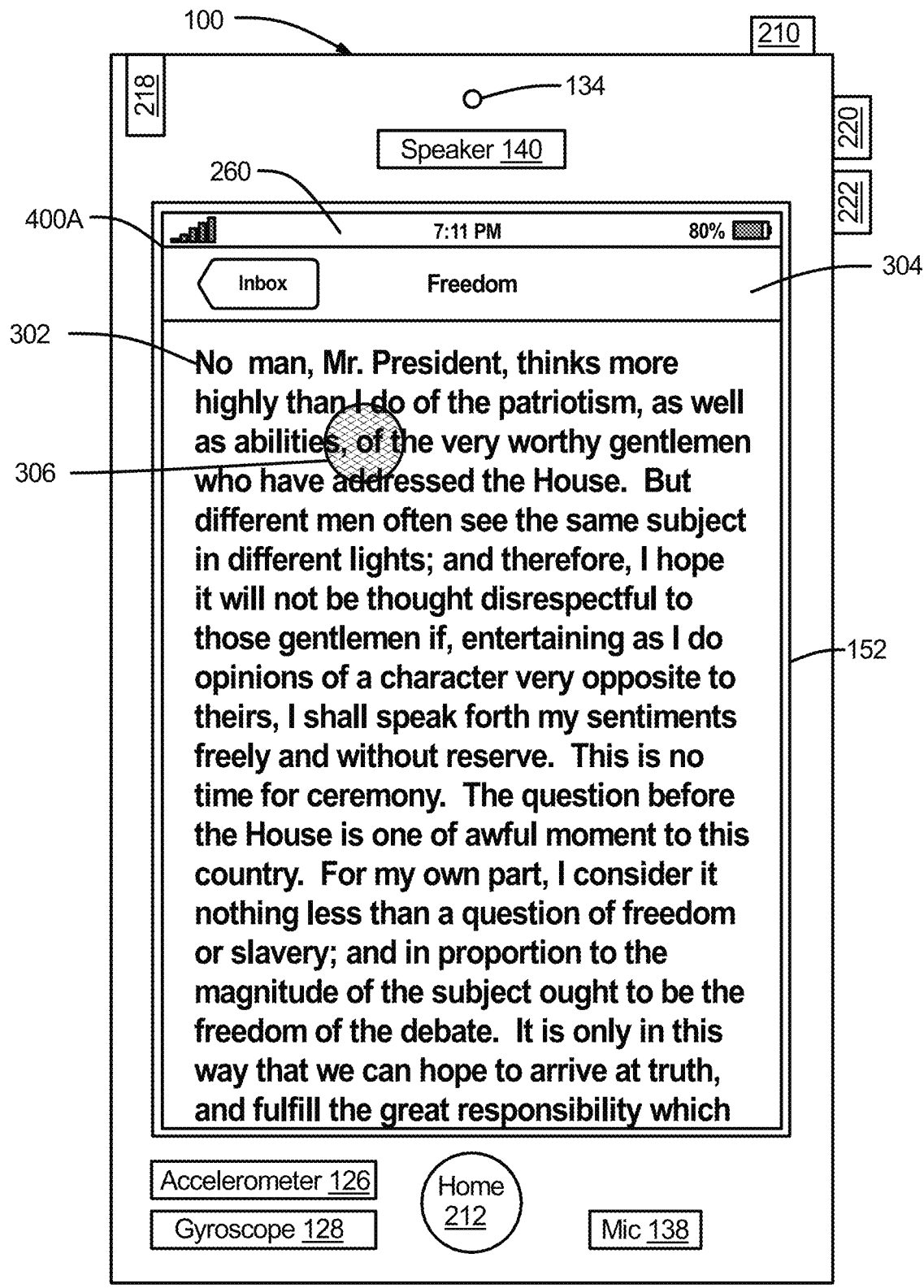
FIGS. 4A-4H illustrate an exemplary user interface and method for positioning a selection of one character length and selecting text within read-only content on a handheld mobile computing device with a touch-sensitive display in accordance with a first exemplary embodiment.
Figure 4B:
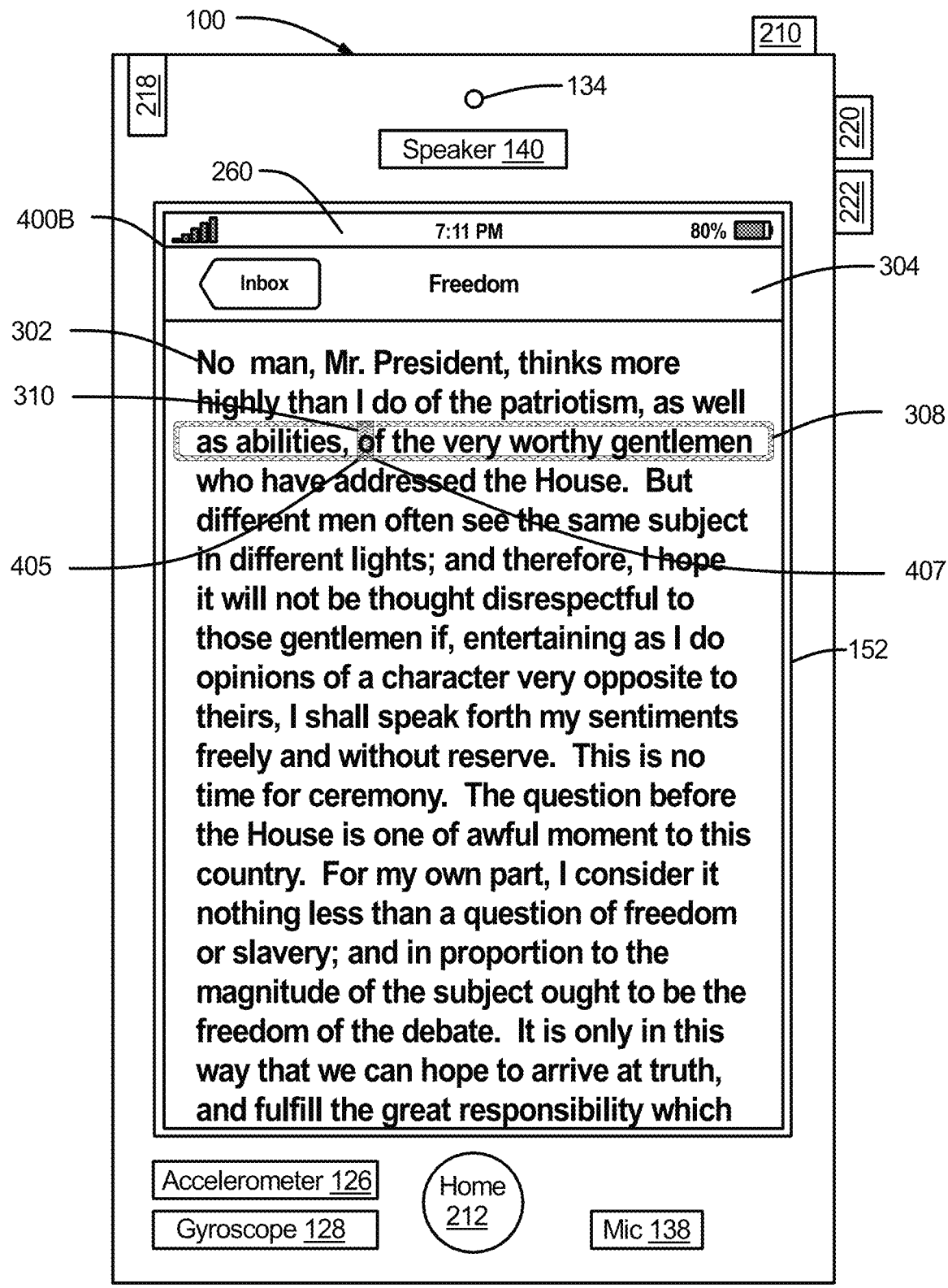

The device displays read-only content 302 in UI 400A (FIG. 4A). The device may also display application navigation bar 304. A user may perform long-press finger gesture 306 on the read-only content in UI 400A (FIG. 4A). In response, the device displays UI 400B (FIG. 4B) with selection positioning & control (SPC) icon 308 at a first position and selection 310 of one character length at a first position with start point 405 and end point 407. In one exemplary embodiment, the selection first position is the location of the finger gesture on the content. In another exemplary embodiment, the selection first position is offset from the location of the finger gesture on the content.

Figure 4C:
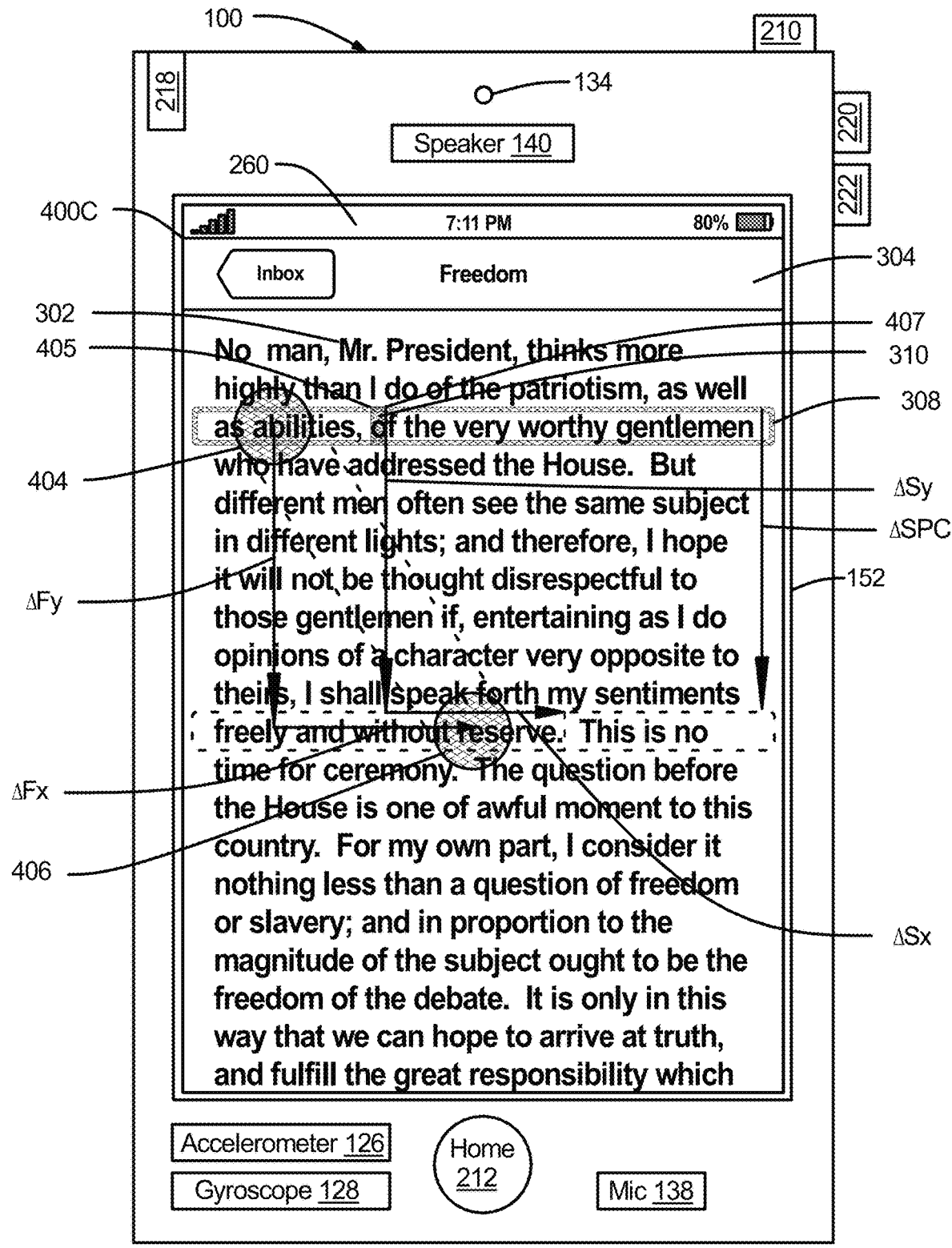
Figure 4D:
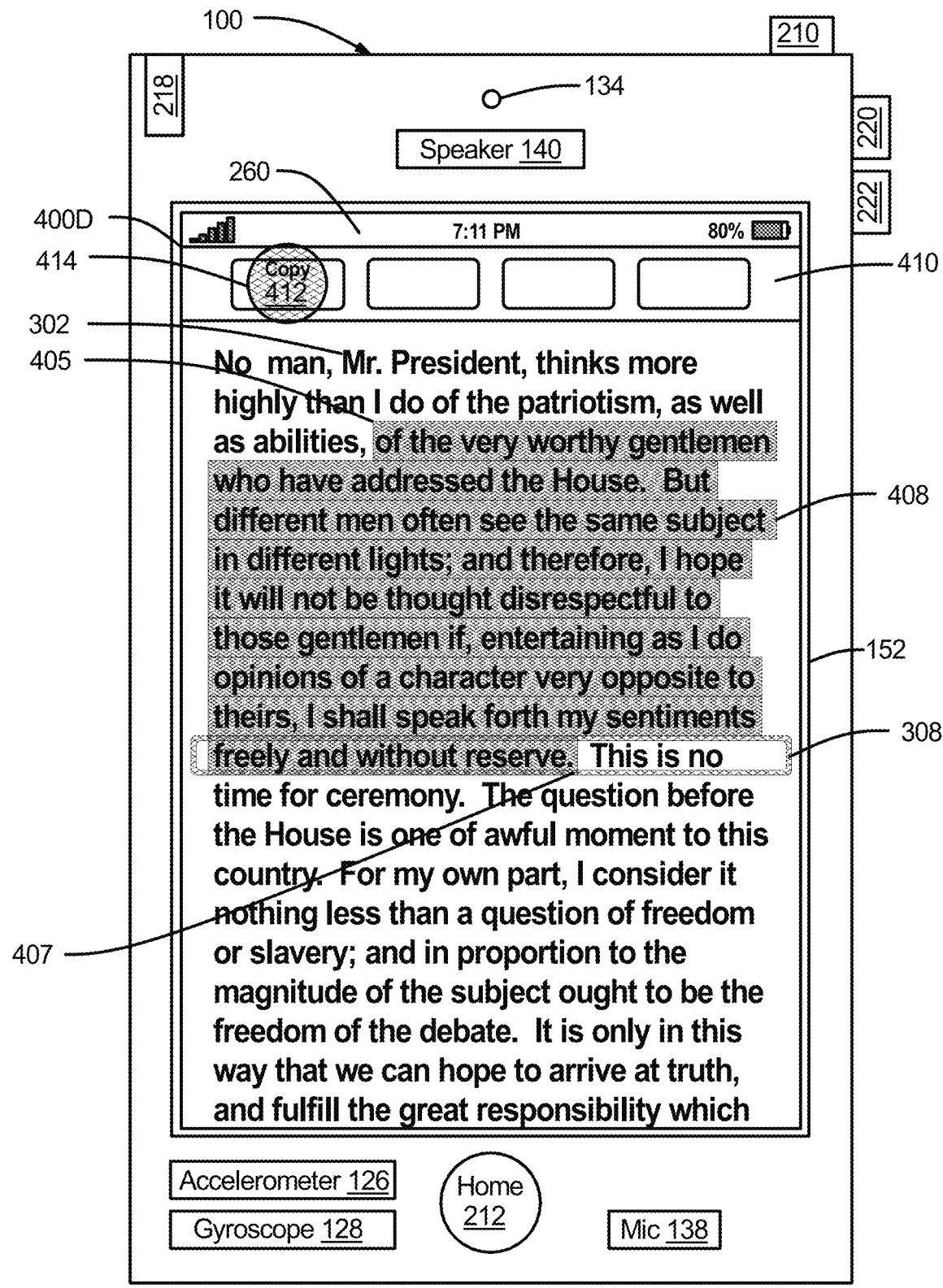

A user may perform tap-and-slide finger gesture 404 to 406 on SPC icon 308, as shown in FIG. 4C. In response, the device changes the length of the selection on the display from a first length to a second length and changes the position of SPC icon 308 from an SPC icon first position to an SPC icon second position and changes the position of the selection end point 407 such that $\Delta Sx$ the change in the horizontal position of selection end point 407 is proportional to $\Delta Fx$ the change in the horizontal position of the finger contact on SPC icon 308 and $\Delta Sy$ and $\Delta SPCy$ the change in the vertical position of selection end point 407 and SPC icon 308 are equal and proportional to $\Delta Fy$ the change in the vertical position of said finger contact and displays UI 400D (FIG. 4D).

Figure 4E:
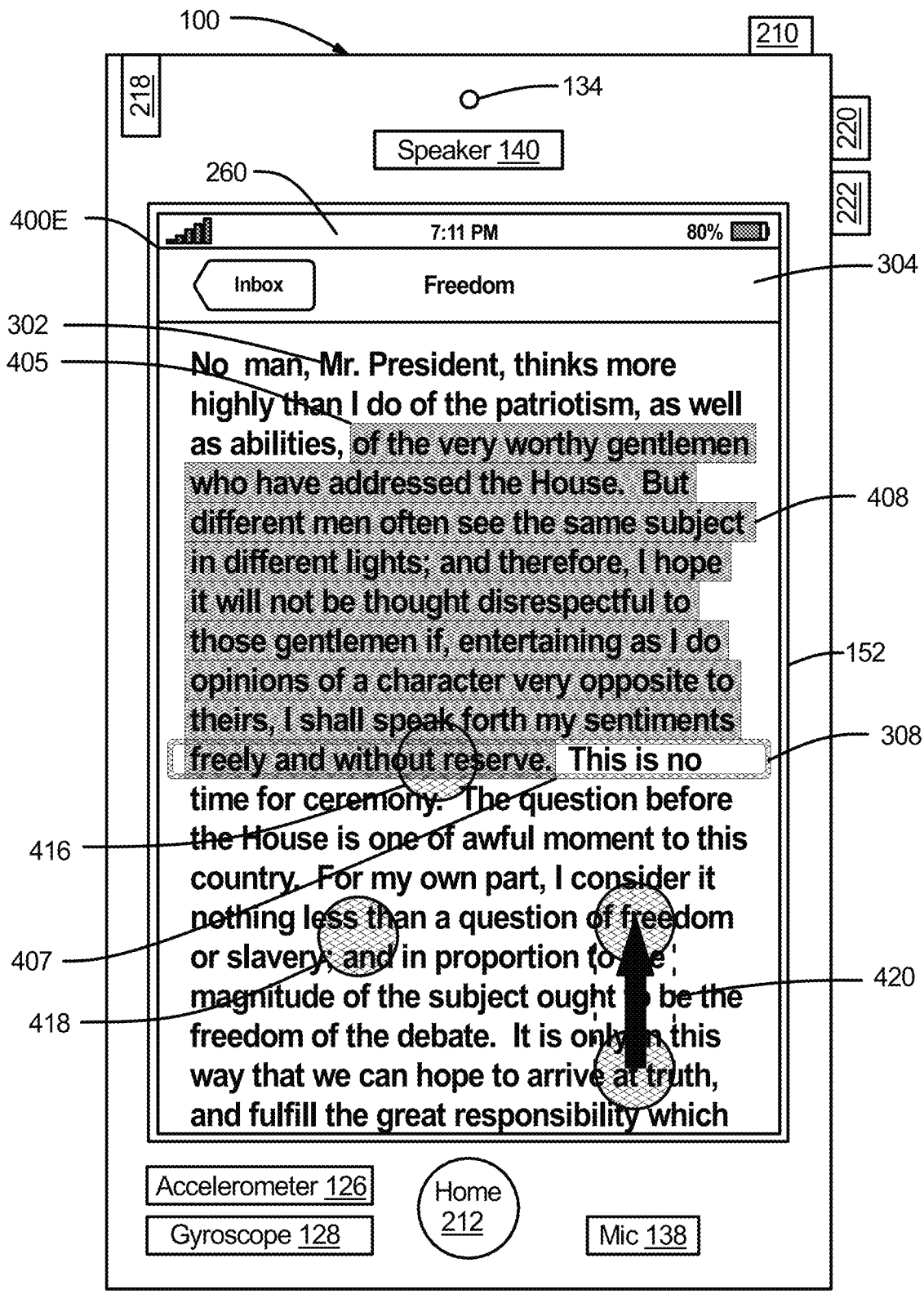
Figure 4F:
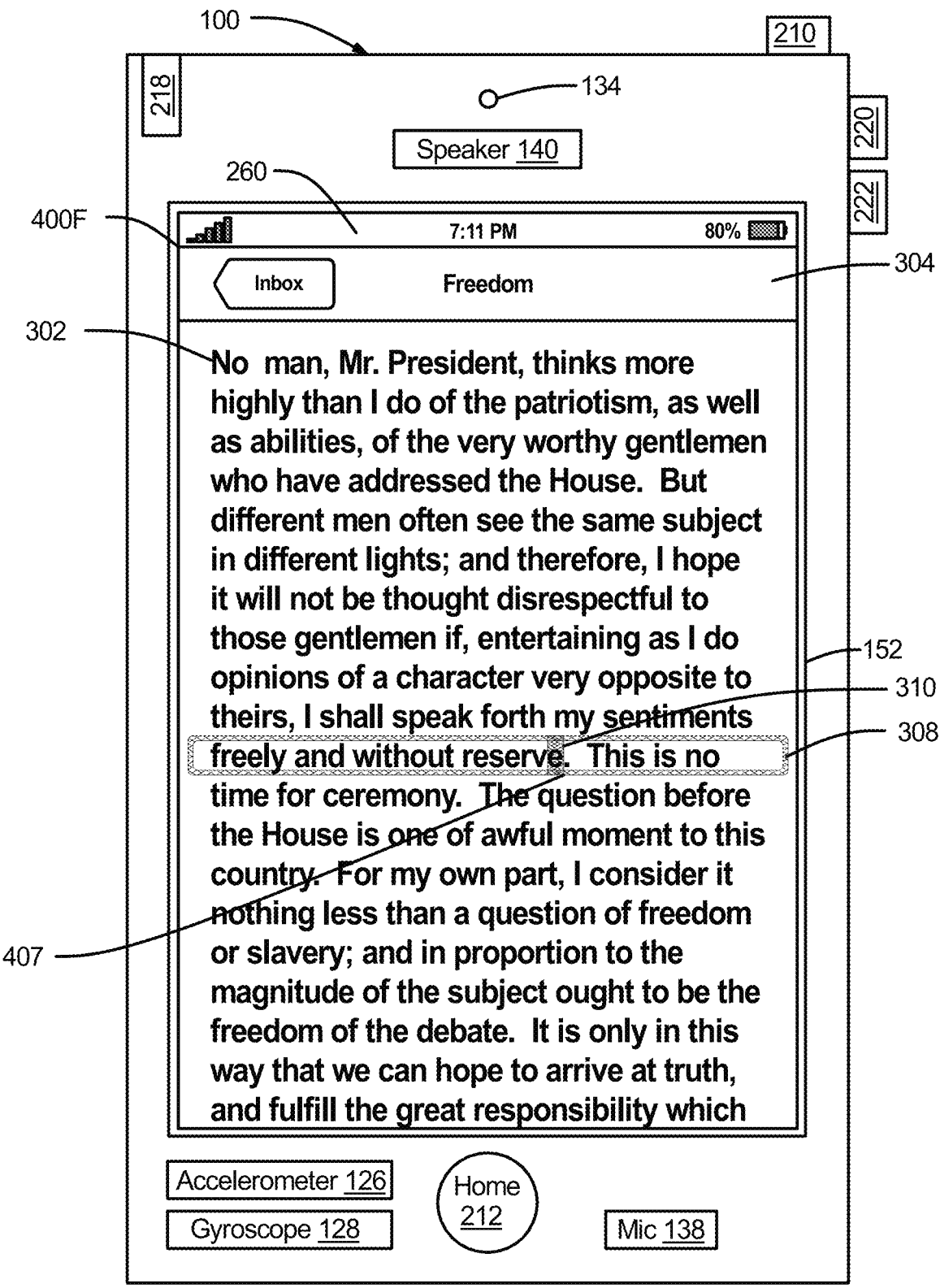
Figure 4G:
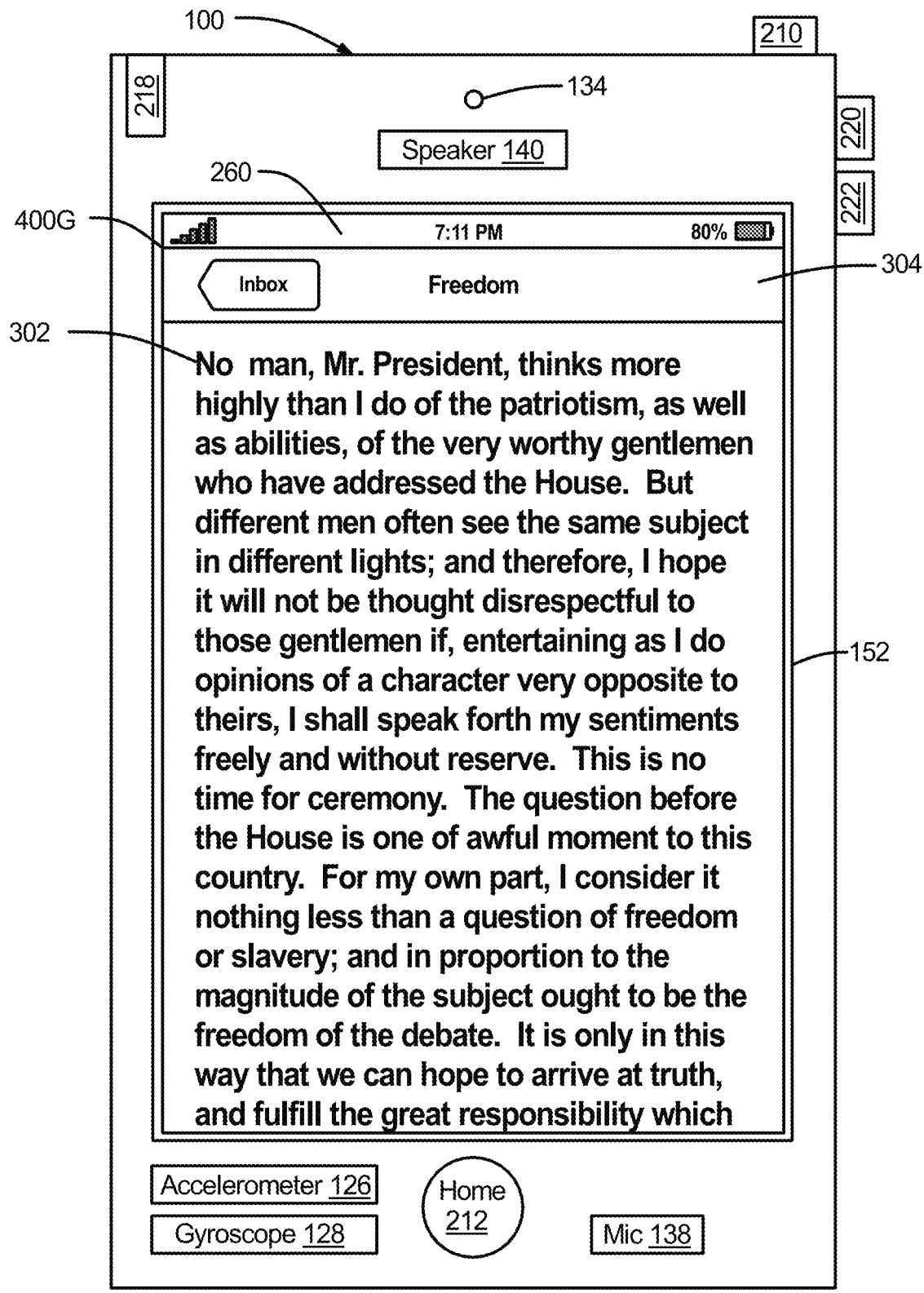
Figure 4H:
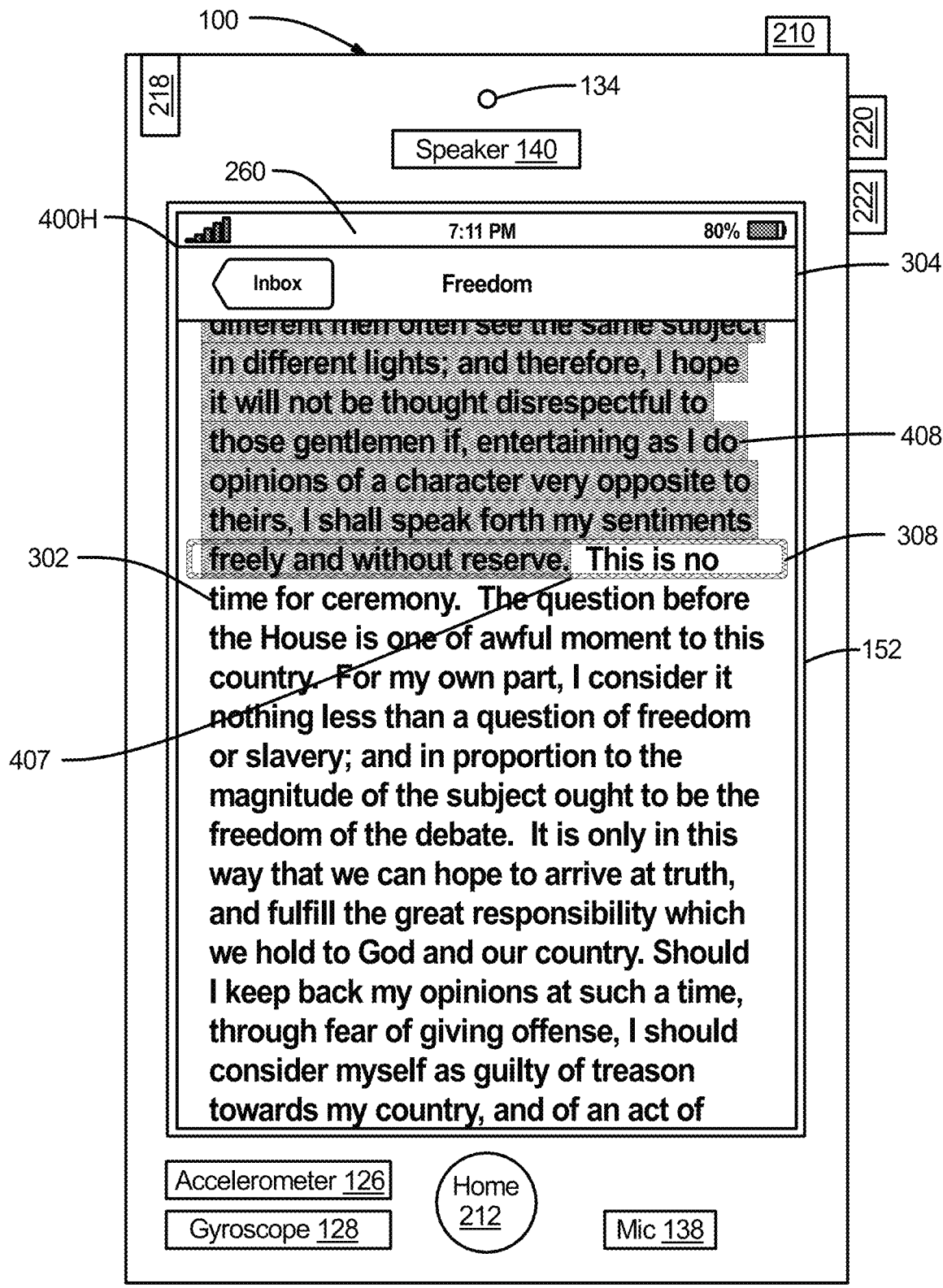

The device may also display toolbar 410 with "Copy" icon 412. A user may perform tap finger gesture 414 on "Copy" icon 412 as shown in FIG. 4D. In response, the device displays UI 400E (FIG. 4E). In another exemplary user interface and method, the selection is displayed, and the SPC icon 308 is not displayed after the initiation of an operation with respect to a selection. In that exemplary user interface and method, SPC icon 308 would not be displayed in FIG. 4E following the initiation of a copy operation with respect to the selection in FIG. 4D. Upon detection of tap finger gesture 416 on SPC icon 308 in UI 400E (FIG. 4E), the device displays UI 400F (FIG. 4F) with selected text 408 cancelled and no longer displayed and with selection 310 of one character length positioned at the selection second position. Upon detection of tap finger gesture 418 at a location not on SPC icon 308 on UI 400E (FIG. 4E), the device displays UI 400G (FIG. 4G), with text selection 408 cancelled and no longer displayed and with SPC icon 308 no longer displayed. Upon detection of a page-scroll-up slide finger gesture 420 on content 302 on UI 400E (FIG. 4E), the device displays UI 400H (FIG. 4H) with both content 302 and selected text 408 and SPC icon 308 scrolled up by an amount equal to the length of page-scroll-up slide finger gesture 420.

Figure 5A:
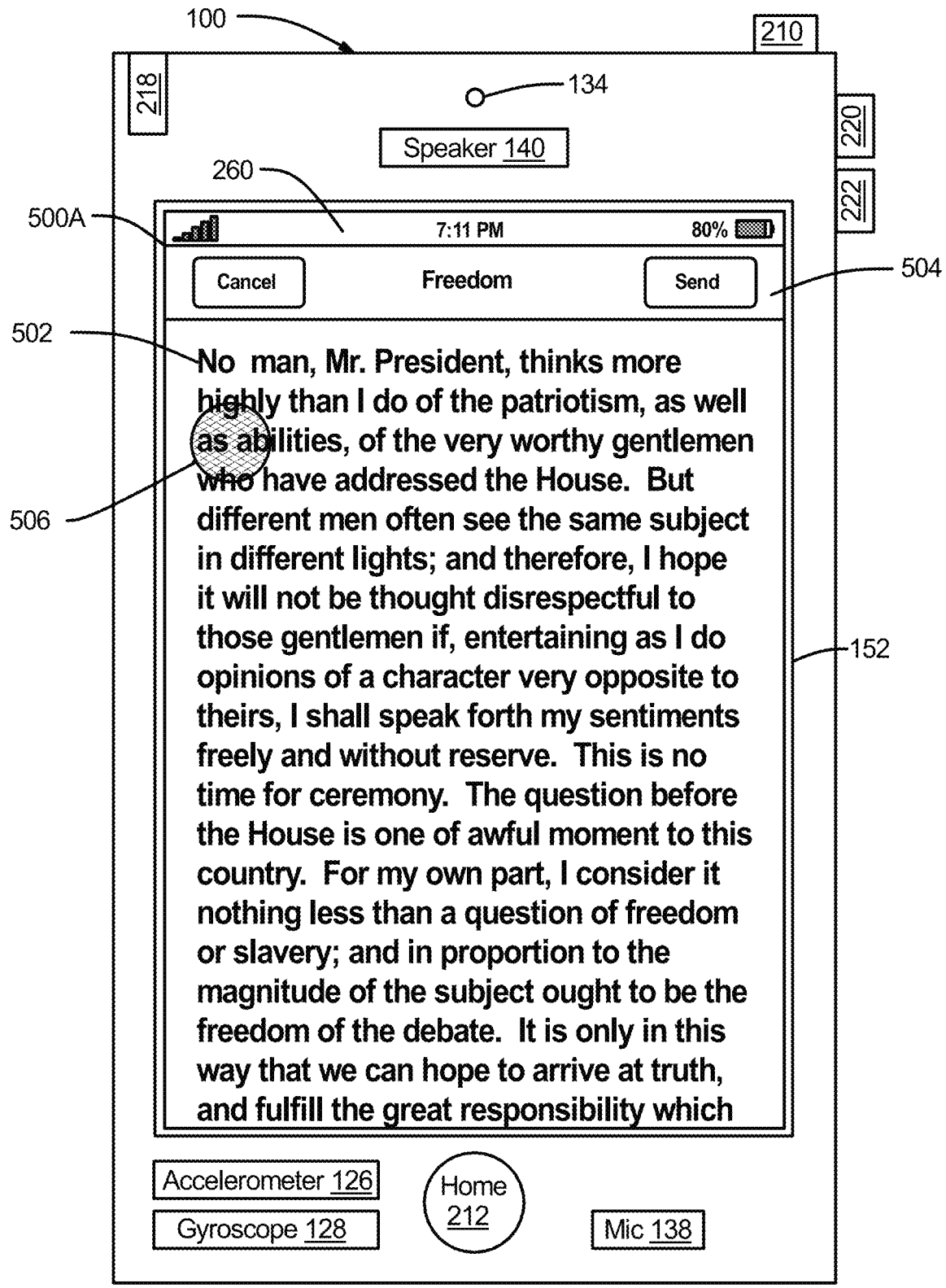
FIGS. 5A-5F illustrate an exemplary user interface and method for positioning a cursor (a selection of zero length) within editable content on a handheld mobile computing device with a touch-sensitive display in accordance with a first exemplary embodiment.
Figure 5B:
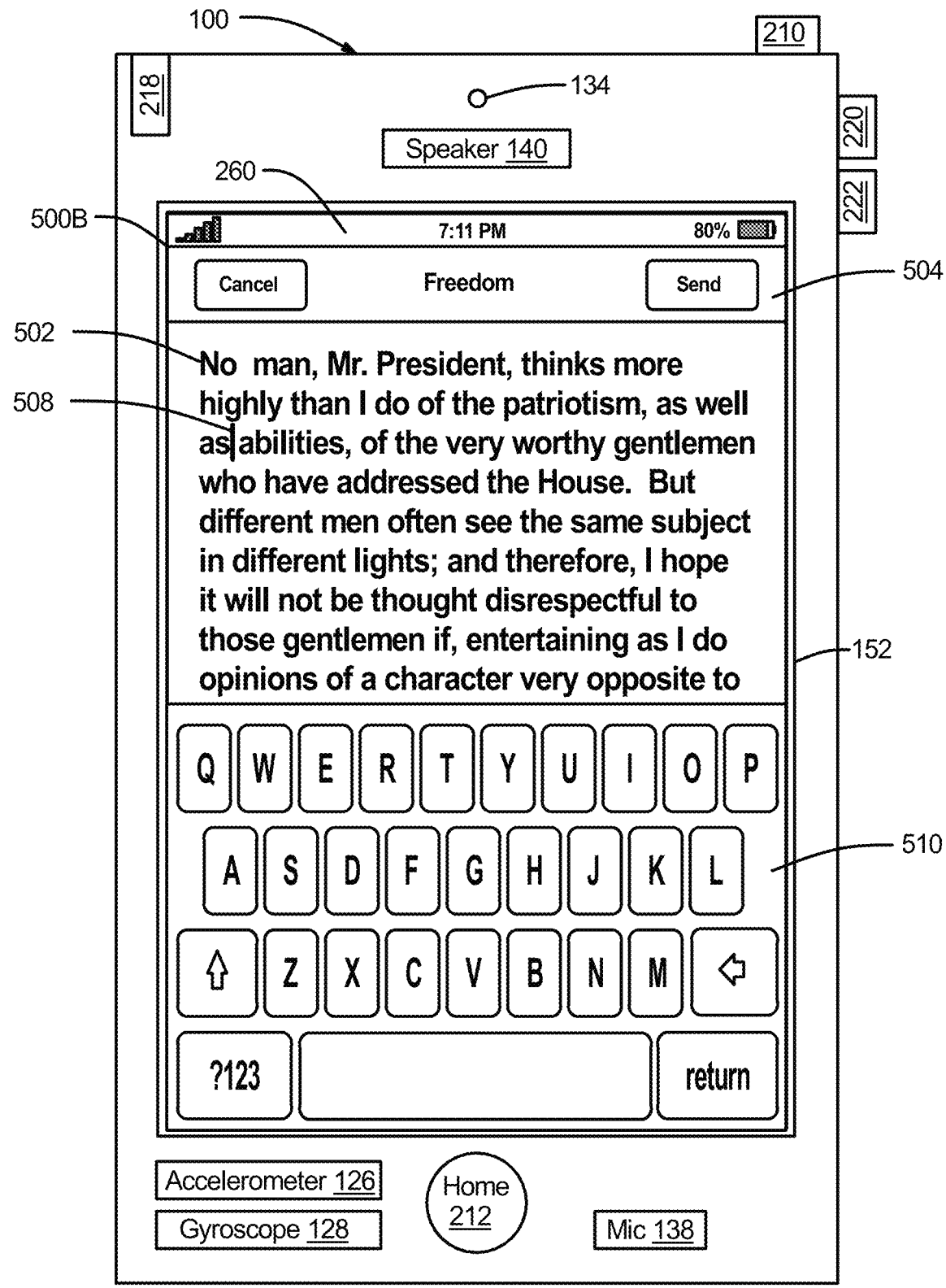
Figure 5C:
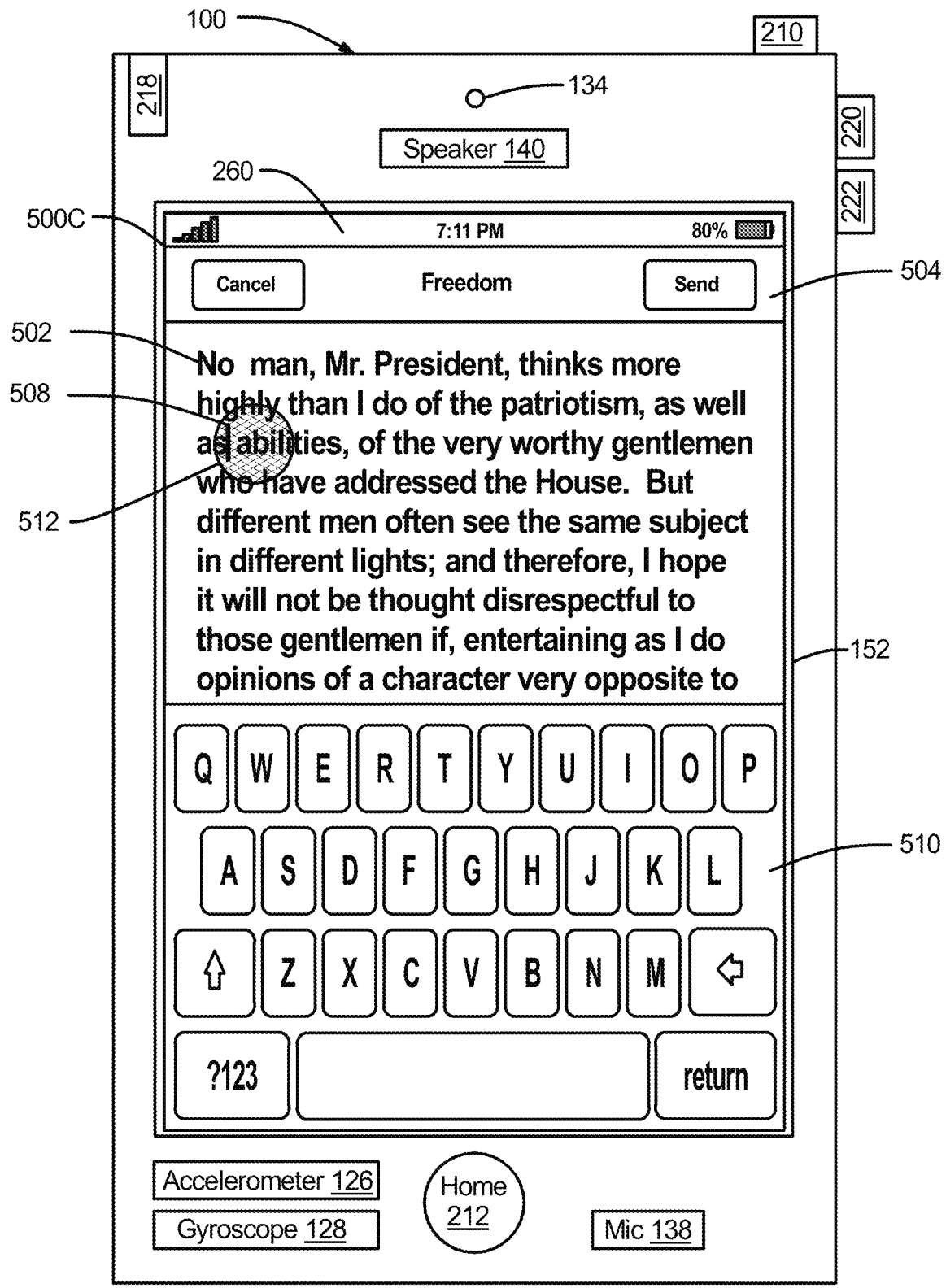
Figure 5D:
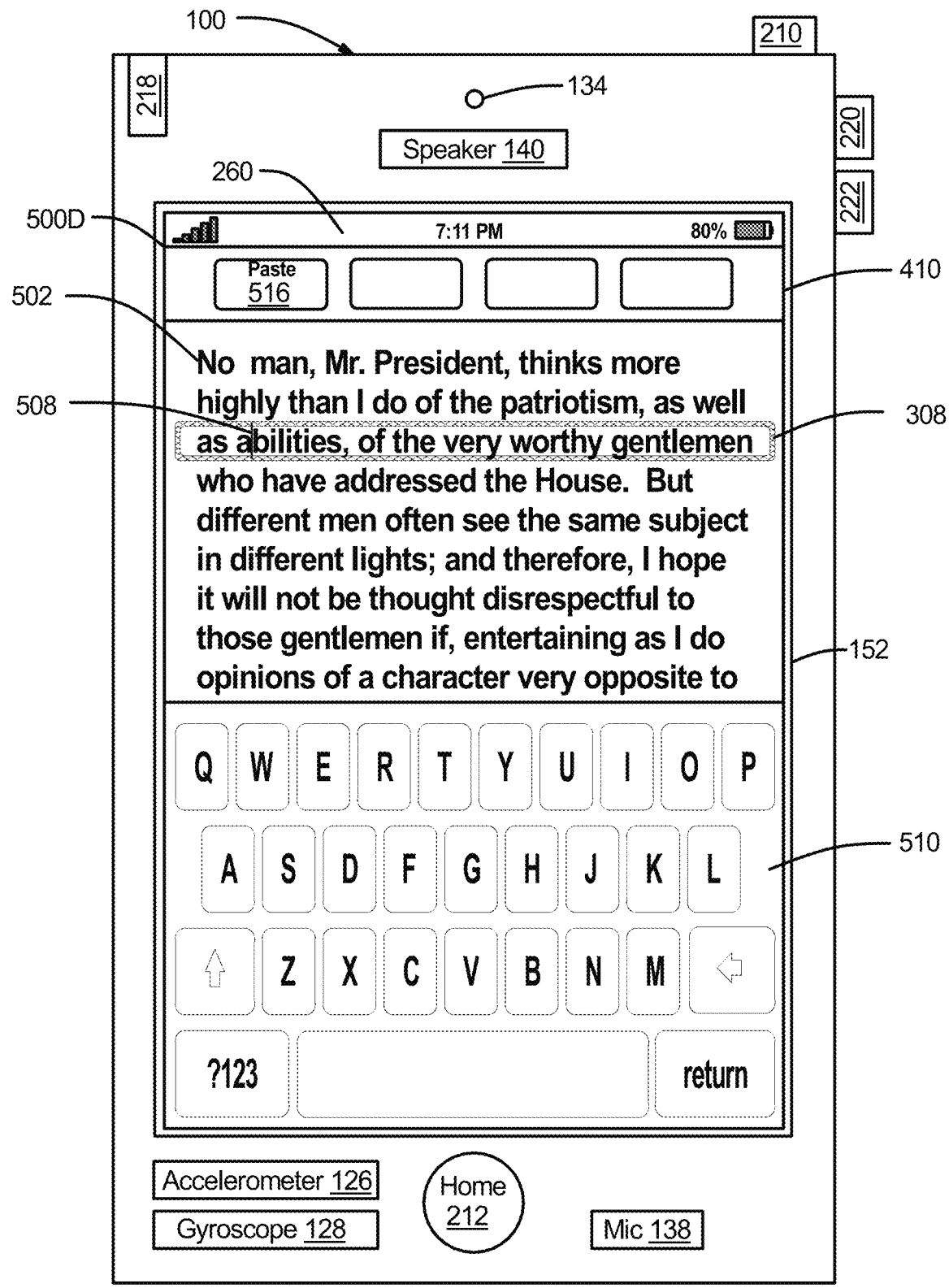

FIGS. 5A-5F illustrate an exemplary user interface and method for positioning a cursor (a selection of zero length) within editable content on a handheld mobile computing device with a touch-sensitive display in accordance with a first exemplary embodiment. In the figures, the cursor (a selection of zero length) appears as a vertical bar. The device displays editable content 502 in UI 500A (FIG. 5A). The device may also display application navigation bar 504. A user may perform tap finger gesture 506 on editable content 502 in UI 500A. In response, the device displays UI 500B (FIG. 5B) with cursor (a selection of zero length) 508 at the location of tap finger gesture 506. In the case of devices having a soft keyboard in lieu of, or in addition to, a physical keyboard, the device may also display soft keyboard 510. A user may perform finger gesture 512 on the editable content in UI 500C (FIG. 5C). In one example embodiment, finger gesture 512 is a long-press finger gesture. In response to detecting the finger gesture on the content, the device displays UI 500D (FIG. 5D) with selection positioning & control (SPC) icon 308 at a first position and cursor (a selection of zero length) 508 at a first position. In one exemplary embodiment, the cursor first position is the location of finger gesture 512. In another exemplary embodiment, if the finger gesture 512 is on the same text line as finger gesture 506, then the cursor first position may be permitted to remain at the location of finger gesture 506 instead of being moved to the location of finger gesture 512. In any case, the device may also display toolbar 410 with "Paste" icon 516.

Figure 5E:
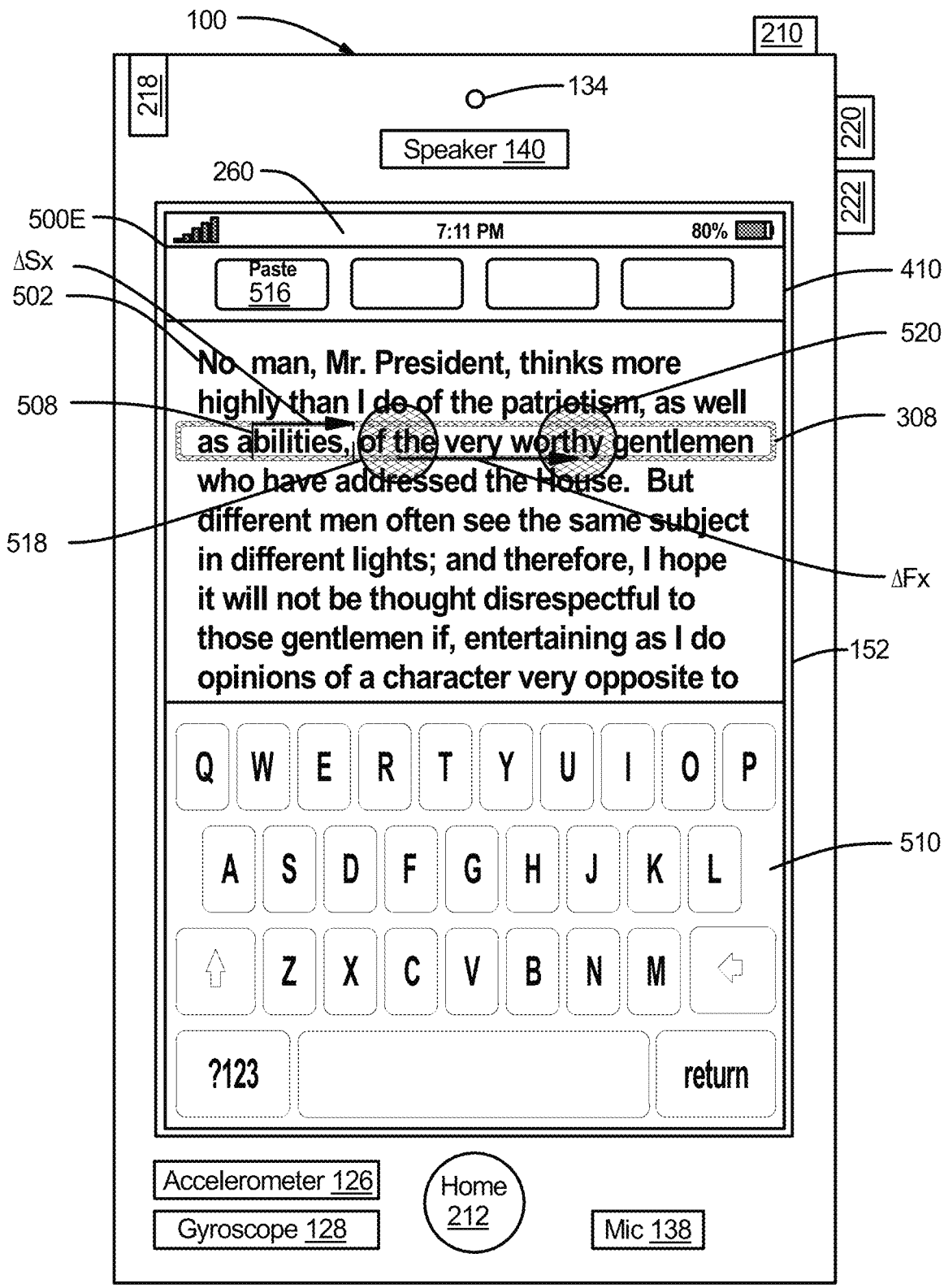
Figure 5F:
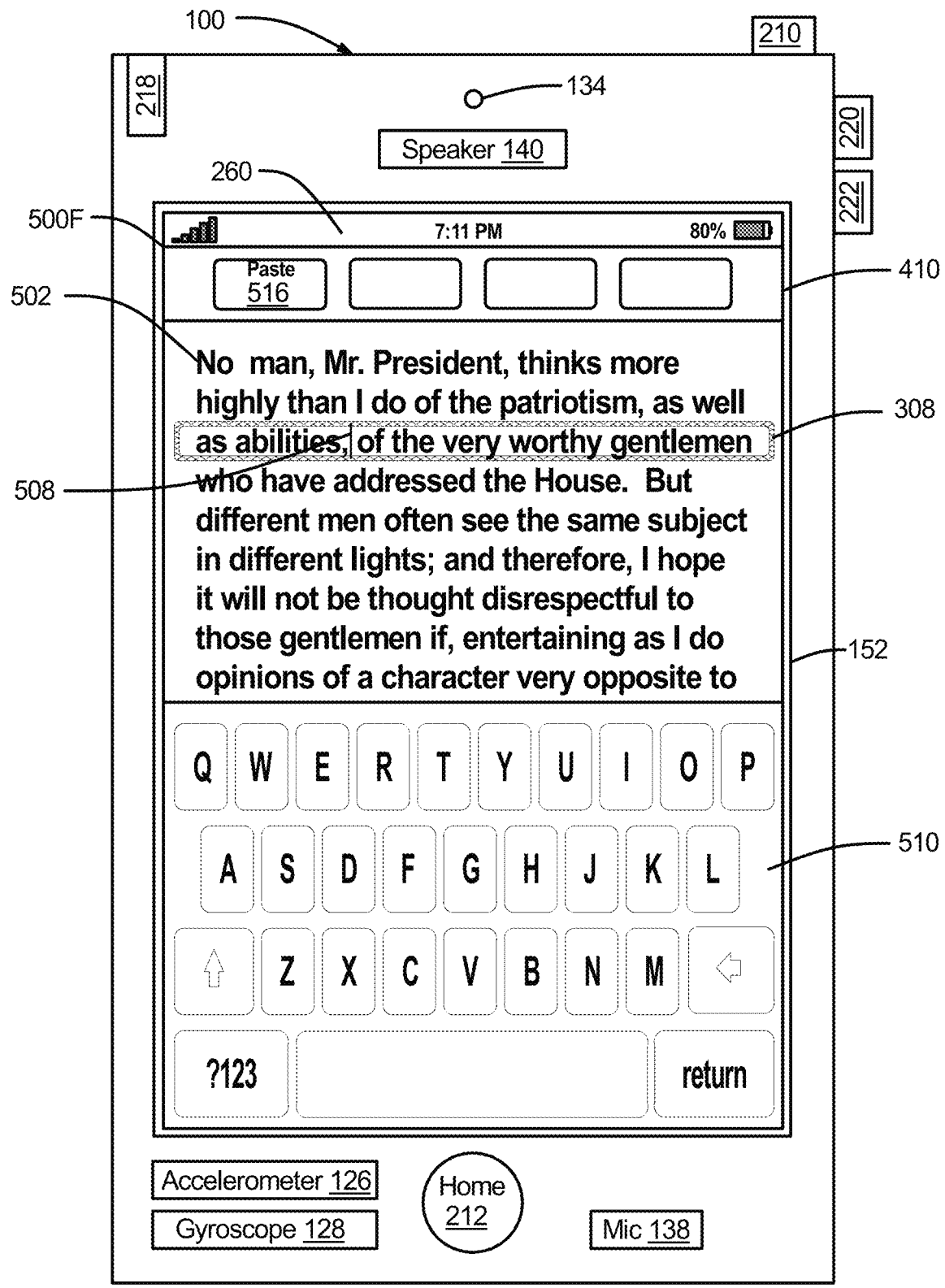

With cursor (a selection of zero length) 508 at a first position, a user may perform a slide finger gesture 518 to 520 on SPC icon 308 as shown in UI 500E (FIG. 5E). In response to detecting $\Delta F_x$ (a change in the horizontal position) and $\Delta F_y$ (a change in the vertical position) of an uninterrupted finger contact on the SPC icon, the device changes the position of the cursor 508 on the display from a first position to a second position such that $\Delta Sx$ (the change in the horizontal position of cursor 508) is proportional to $\Delta F_x$, and such that $\Delta Sy$ (the change in the vertical position of cursor 508) and $\Delta SPCy$ (the change in the vertical position of SPC icon 308) are equal and are proportional $\Delta F_y$ as illustrated in FIG. 5E. This can be written as $\Delta Sx=K_x \Delta F_x$ where $K_x$ is a proportionality constant and $\Delta Sy=\Delta SPCy=K_y \Delta F_y$ where $K_y$ is a proportionality constant. Again, in this exemplary embodiment $K_y=1$. In this example, slide finger gesture 518 to 520 is a horizontal-slide finger gesture and $\Delta F_y$ is equal to zero (0). The device displays UI 500F (FIG. 5F) with cursor 508 at a second position. The positioning of cursor 508 on editable content is similar to that described above for positioning a selection of one character length on read-only content.

Figure 6A:
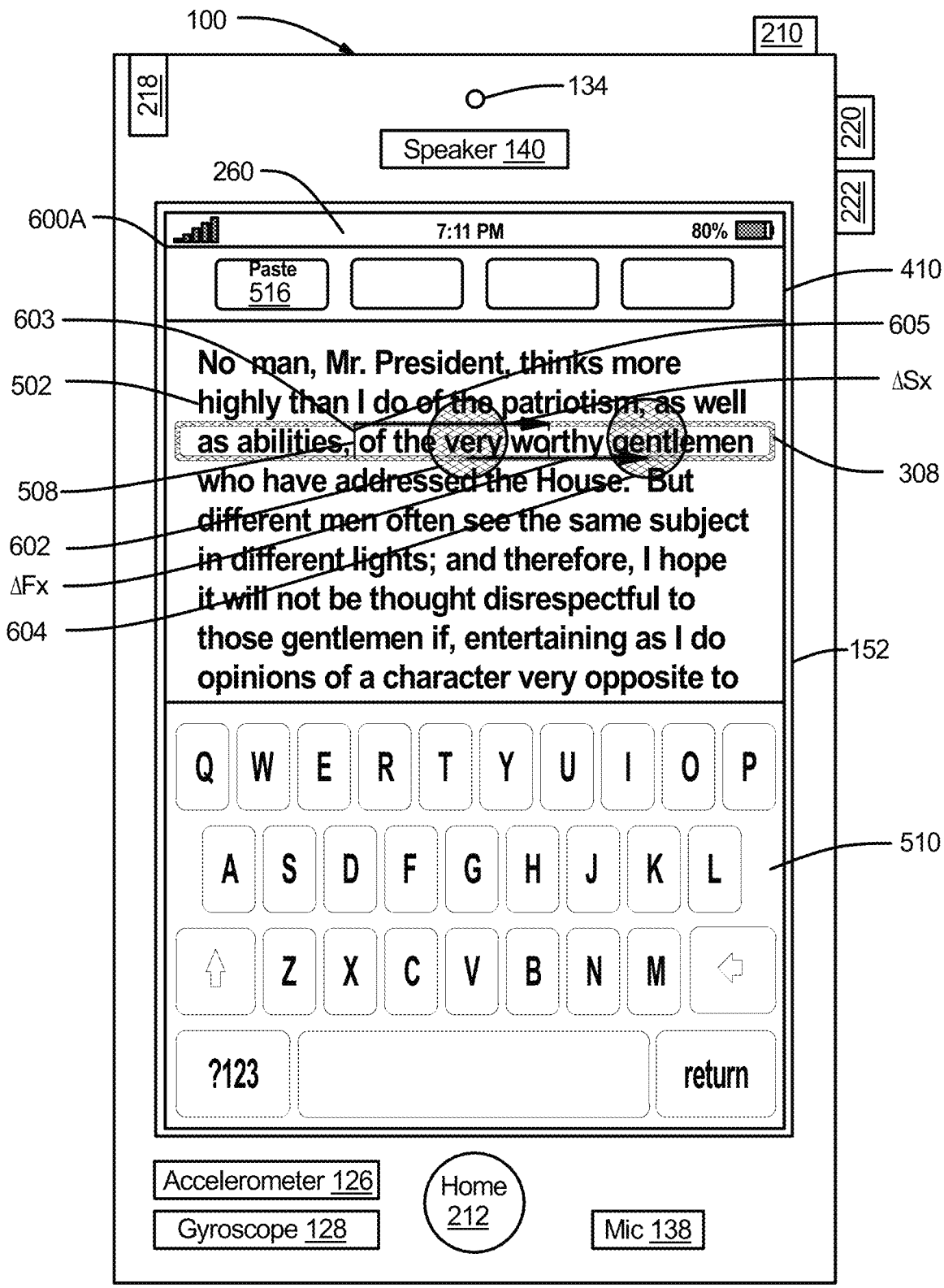
FIGS. 6A-6F illustrate an exemplary user interface and method for positioning a cursor (a selection of zero length) and selecting text within editable content on a handheld mobile computing device with a touch-sensitive display in accordance with a first exemplary embodiment.
Figure 6B:
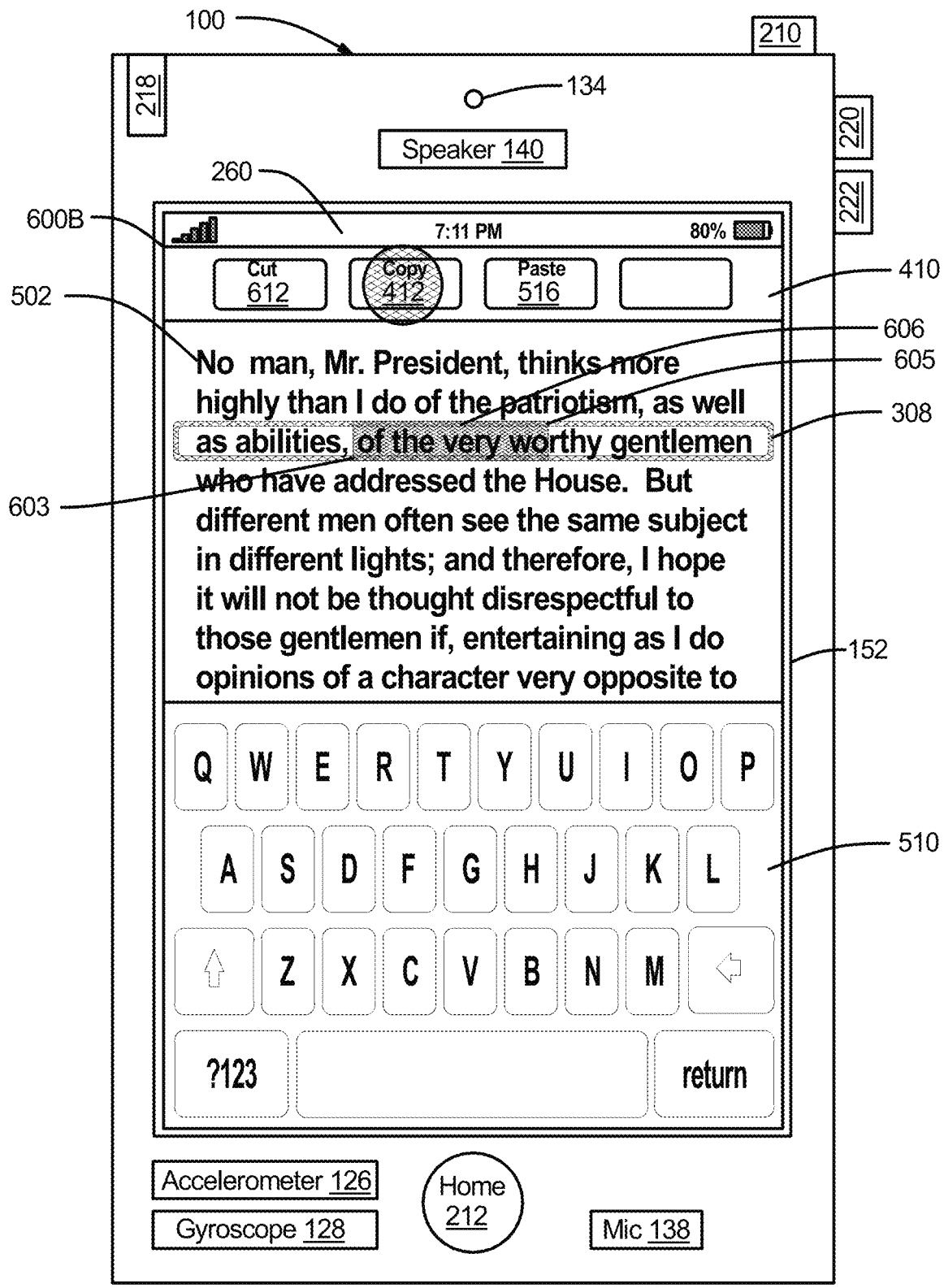
Figure 6C:
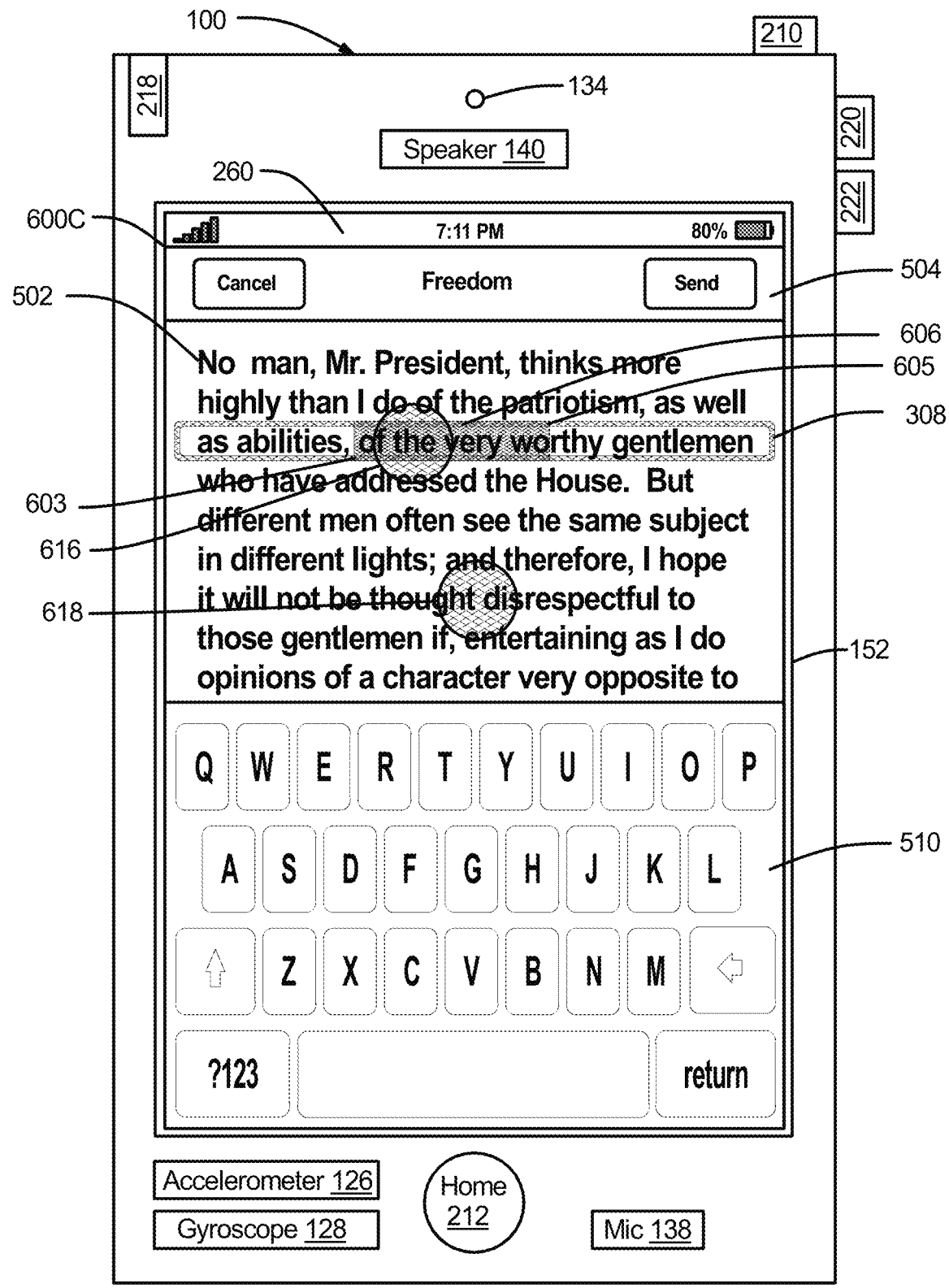
Figure 6D:
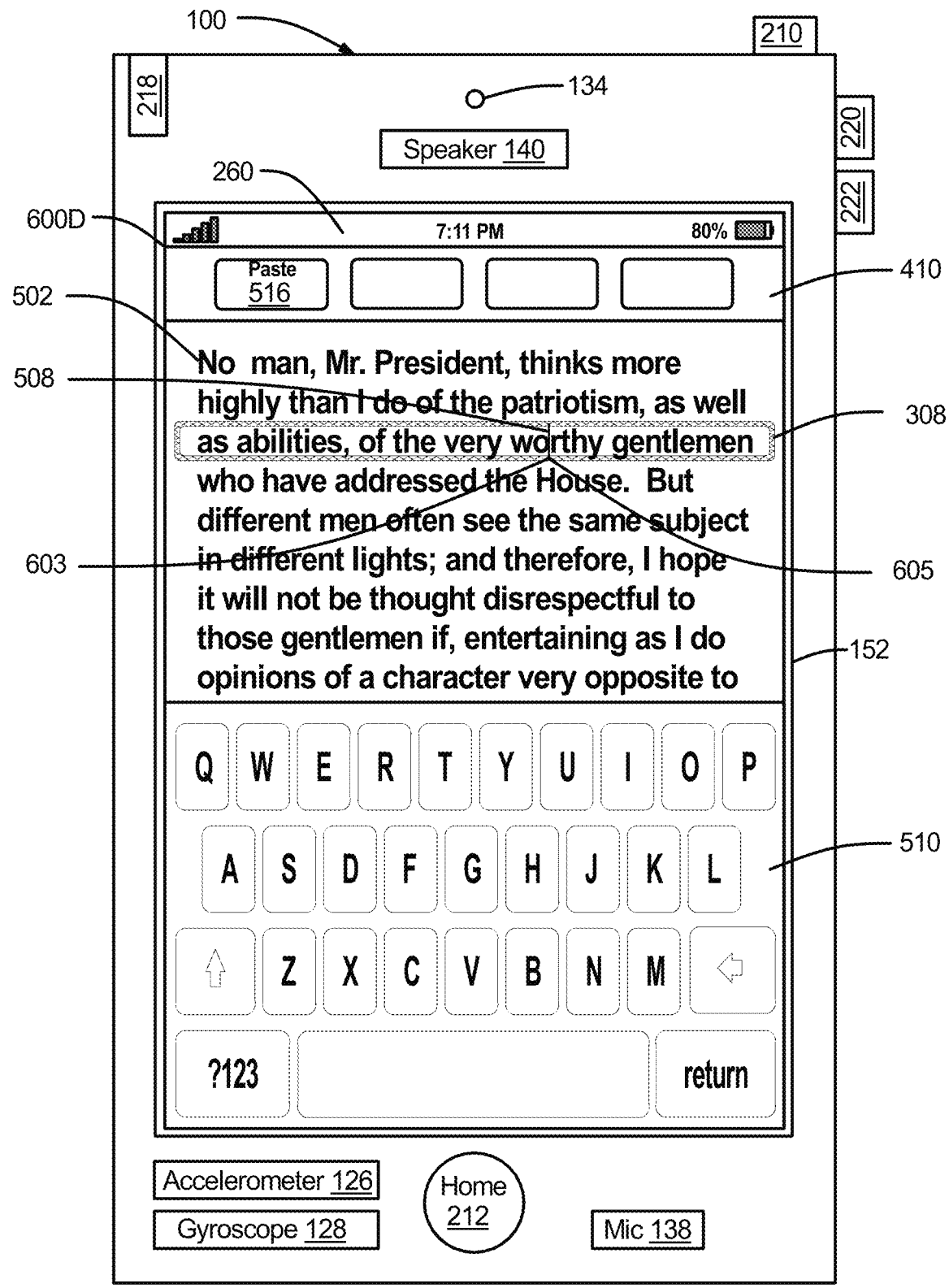
Figure 6E:
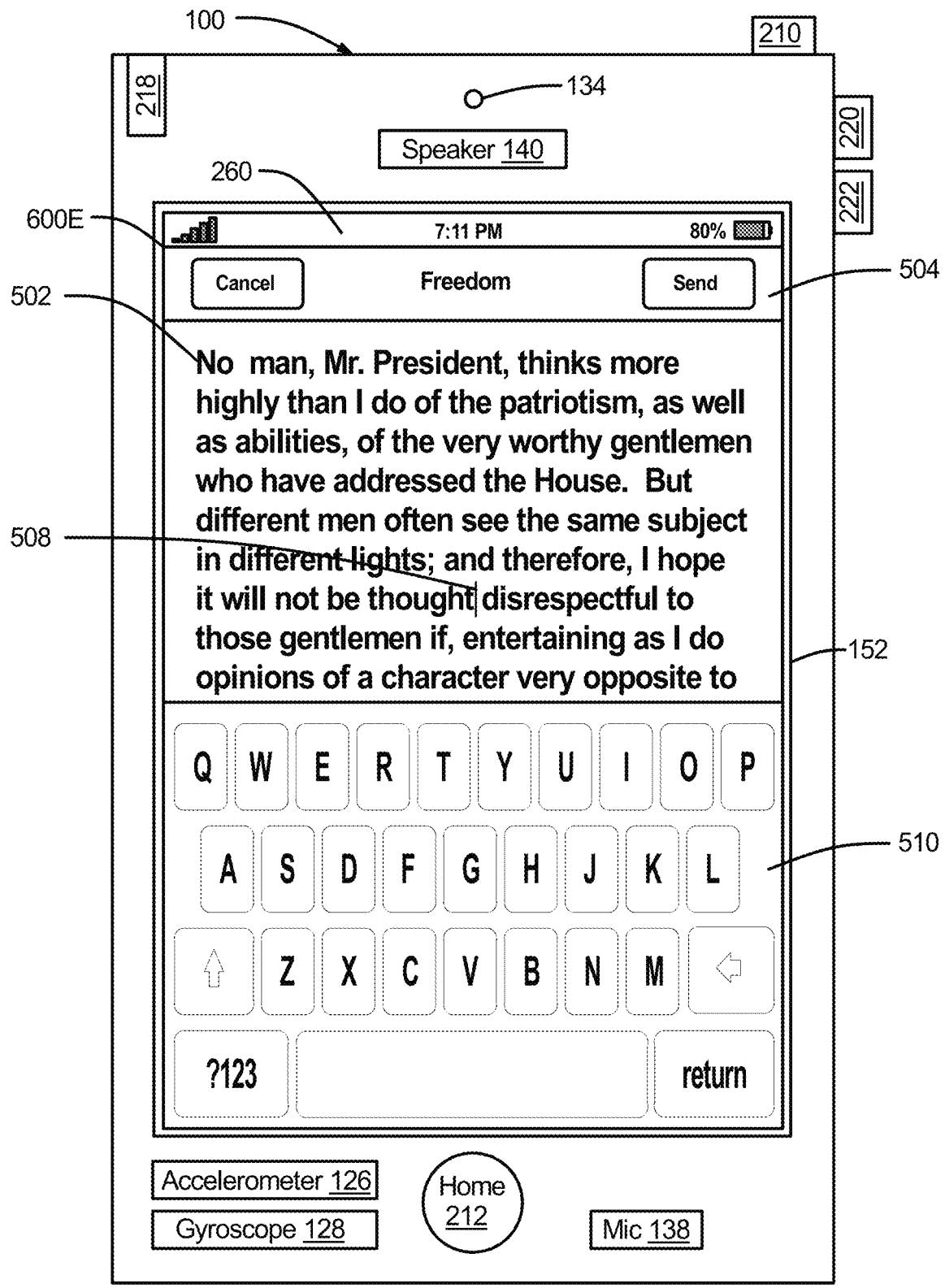

FIGS. 6A-6F illustrate an exemplary user interface and method for positioning a cursor (a selection of zero length) and selecting text within editable content on a handheld mobile computing device with a touch-sensitive display in accordance with a first exemplary embodiment. The device displays UI 600A (FIG. 6A) with selection positioning & control (SPC) icon 308 at a first position, and cursor (a selection of zero length) 508 at a first position. The device may also display keyboard 510. The device may also display toolbar 410 with "Paste" icon 516. A user may perform tap-and-slide finger gesture 602 to 604 on SPC icon 308, as shown in FIG. 6A. In response to detecting a tap finger gesture followed by a change in the horizontal position of an uninterrupted finger contact on the SPC icon, the device changes the horizontal position of selection end point 605 on the display from a first position to a second position such that the change in the horizontal position of the selection end point $\Delta Sx$ is proportional to the change in the horizontal position of the finger contact $\Delta F_x$ as illustrated in FIG. 6A. This can be written as $\Delta Sx=K_x \Delta F_x$ where $K_x$ is a proportionality constant. The device displays UI 600B (FIG. 6B) with selected text 606 displayed from the selection start point 603 to the selection end point 605. The device may also display toolbar 410 with "Cut" icon 612, "Copy" icon 412, and "Paste" icon 516. A user may tap "Copy" icon 412. In response", the device displays UI 600C (FIG. 6C) with toolbar 410 no longer displayed. In another exemplary user interface and method, the selection is displayed, and SPC icon 308 is not displayed after the initiation of an operation with respect to a selection. In that exemplary user interface and method, SPC icon 308 would not be displayed in FIG. 6C following the initiation of a copy operation with respect to the selection in FIG. 6B. A user may perform tap finger gesture 616 on SPC icon 308 on UI 600C (FIG. 6C). In response, the device displays UI 600D (FIG. 6D) with the selected text 606 cancelled and no longer displayed and with cursor 508 positioned at selection end point 605. In another embodiment, cursor 508 can be positioned at the location of the tap finger gesture 616. A user may perform tap finger gesture 618 at a location not on SPC icon 308 on the content on UI 600C (FIG. 6C). In response, the device displays UI 600E (FIG. 6E), with cursor (a selection of zero length) 508 displayed at the location of tap finger gesture 618, and with SPC icon 308 and selection 310 no longer displayed.

Figure 6F:
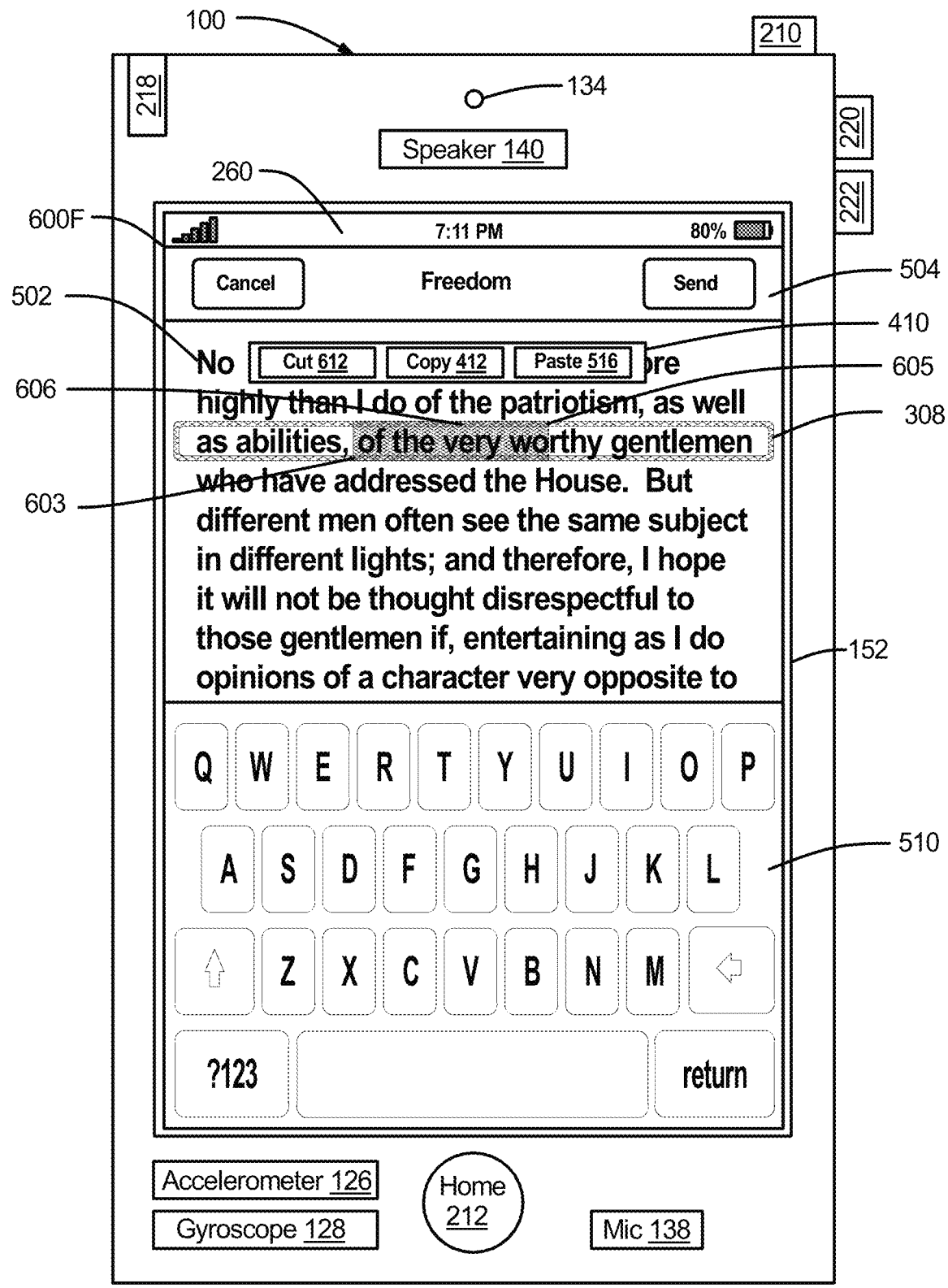

Toolbar 410 comprising "Cut", "Copy", and "Paste" icons may be displayed at the top of the UI as illustrated in prior figures. However, a toolbar comprising "Cut", "Copy", and "Paste" icons may be displayed in the content area adjacent to the selected text in lieu of being displayed at the top of the UI. This is illustrated in UI 600F (FIG. 6F). A toolbar comprising, for example, a single copy icon or paste icon may also be similarly displayed in the content area in lieu of being displayed at the top of the UI.

Figure 7A:
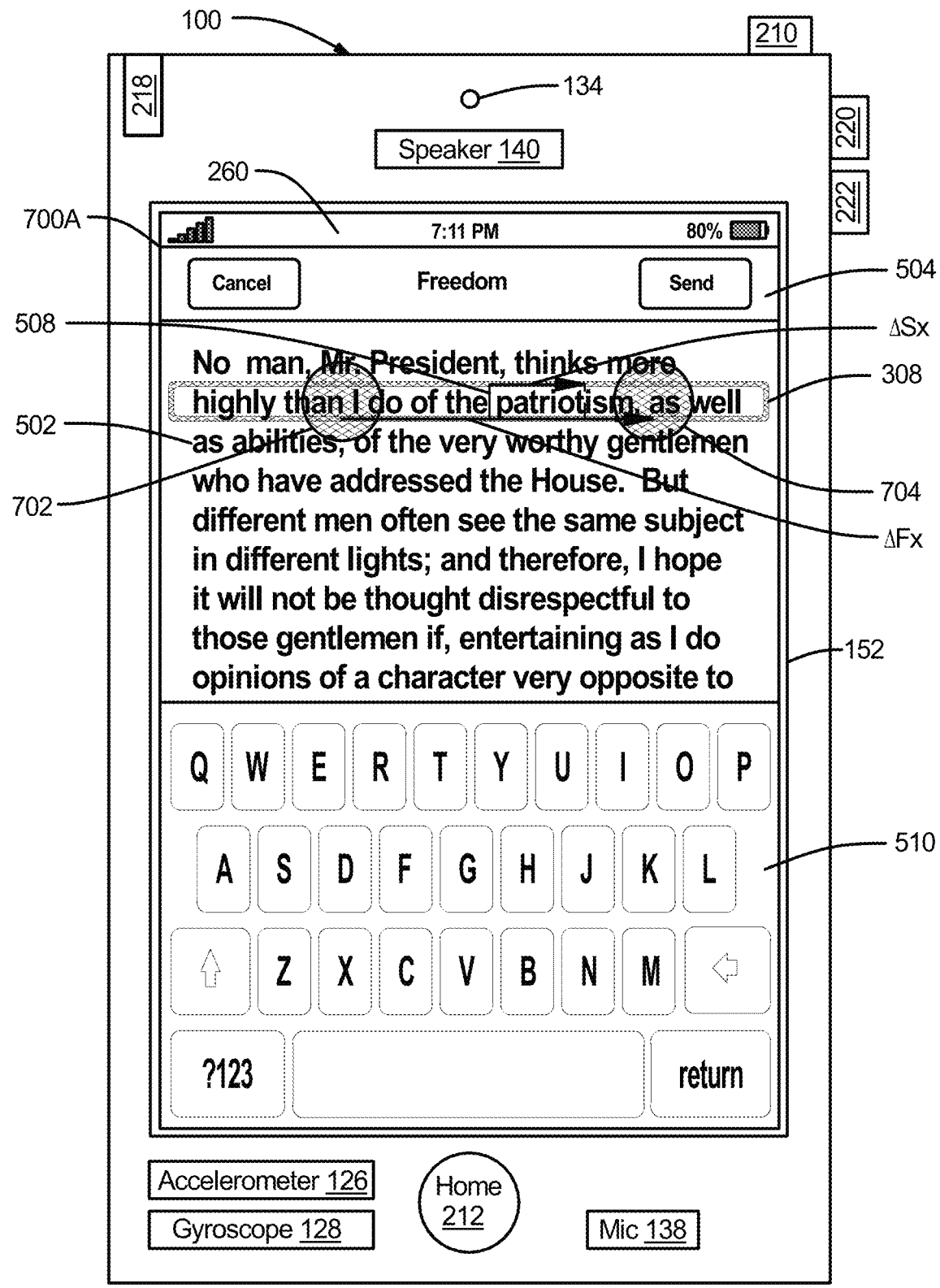
FIGS. 7A-7E illustrate an exemplary user interface and method for precisely positioning a cursor (a selection of zero length) horizontally within content on a handheld mobile computing device with a touch-sensitive display for Kx<1, Kx~1, and Kx>1 in accordance with a first exemplary embodiment.
Figure 7B:
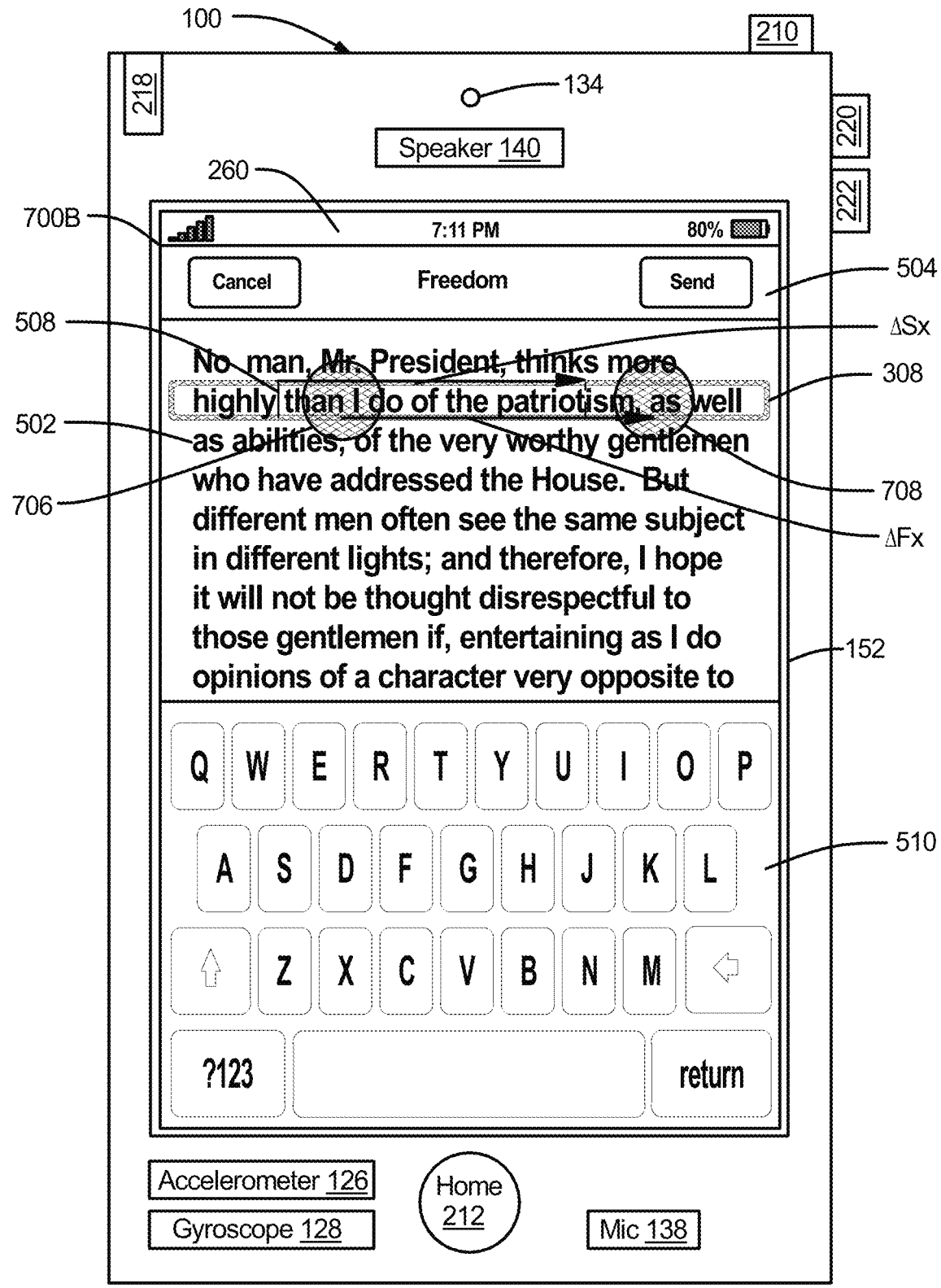
Figure 7C:
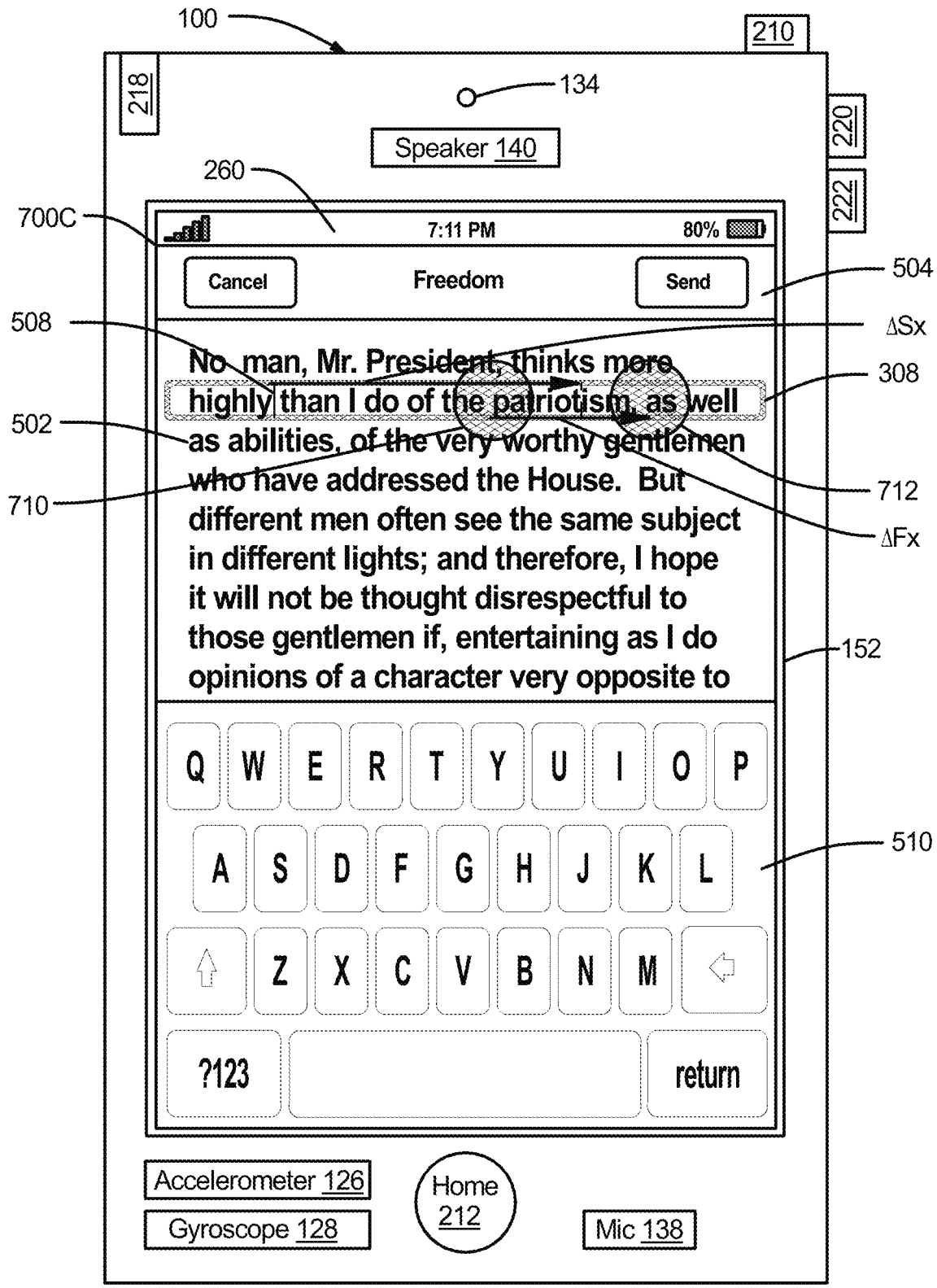
Figure 7D:
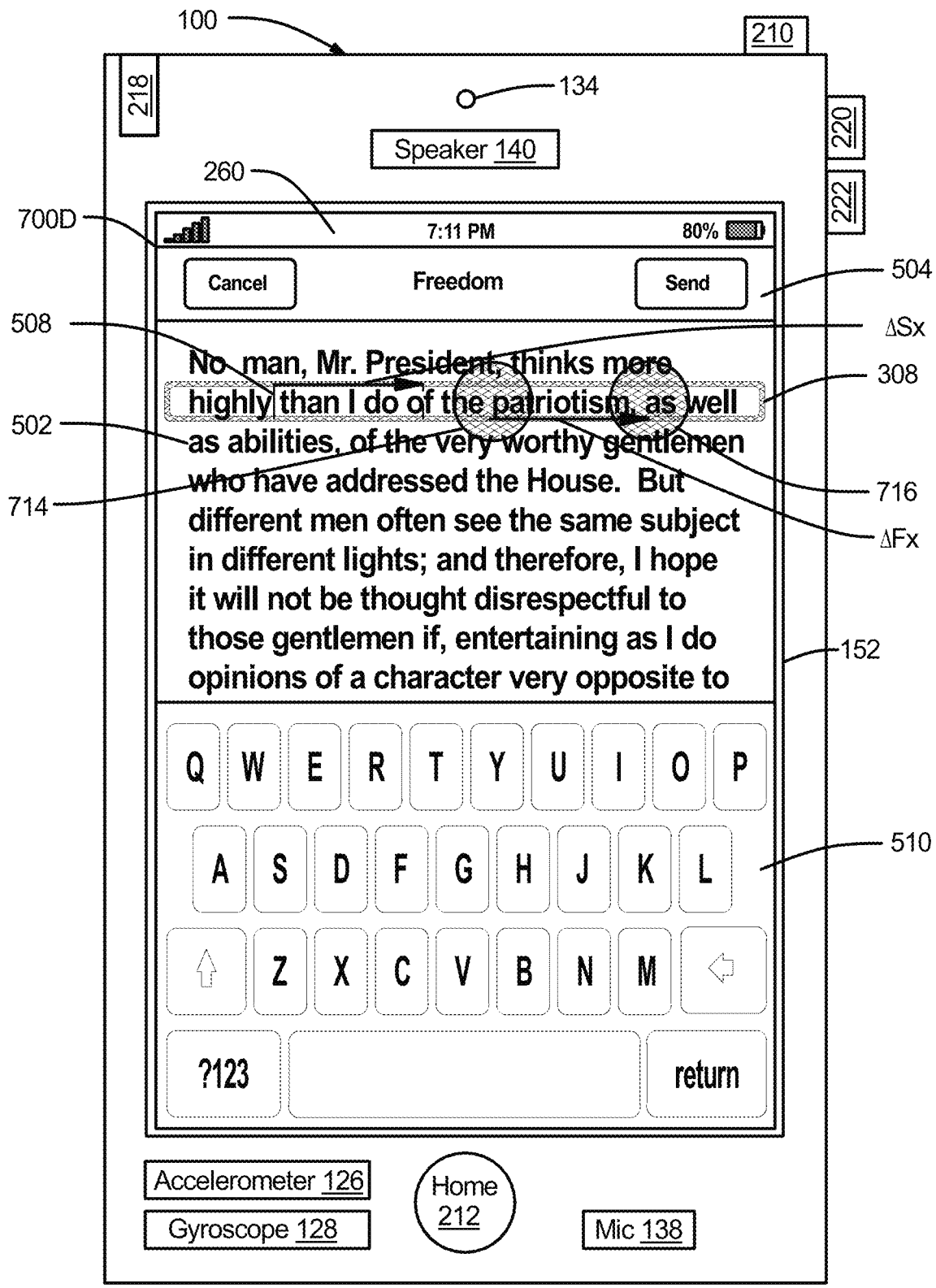
Figure 7E:
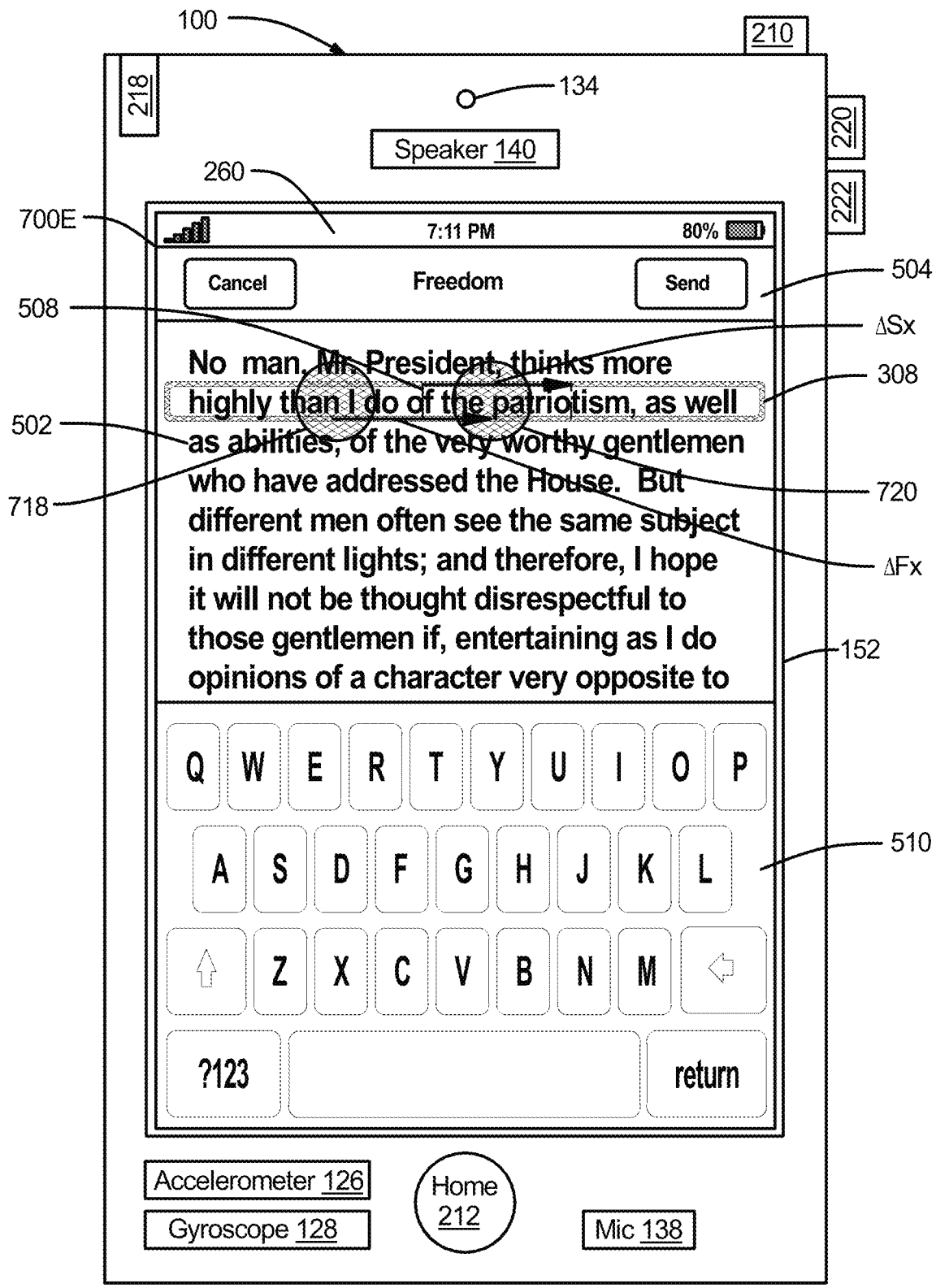

FIGS. 7A-7E illustrate an exemplary user interface and method for precisely positioning a cursor (a selection of zero length) horizontally within content on a handheld mobile computing device with a touch-sensitive display for Kx<1, Kx~1, and Kx>1 in accordance with a first exemplary embodiment. FIGS. 7A-7C illustrate positioning cursor 508 within editable text for the cases of $K_x<1$, $K_x=1$, and $K_x>1$. FIGS. 7D-7E, illustrate an example of positioning cursor 508 with two successive slide finger gestures. In the example shown in FIG. 7A, a user positions cursor 508 with Kx<1. The device displays UI 700A (FIG. 7A) with editable content 502, selection positioning & control (SPC) icon 308 at a first position and cursor 508 at a first position. A user may perform horizontal-slide finger gesture 702 to 704 on SPC icon 308. In response to detecting $\Delta F_x$ (a change in the horizontal position of an uninterrupted finger contact on the SPC icon), the device changes the horizontal position of cursor 508 on the display from a first position to a second position such that $\Delta Sx$ (the change in the horizontal position of cursor 508) is proportional to $\Delta F_x$ as illustrated in FIG. 7A. (The cursor second position is shown with a dashed line in FIG. 7A.) This can be written as $\Delta Sx=K_x \Delta F_x$ where $K_x$ is a proportionality constant and where $K_x<1$ for this example.

In the example shown in FIG. 7B, a user positions cursor 508 with $K_x$~1. The device displays UI 700B (FIG. 7B) with editable content 502, selection positioning & control (SPC) icon 308 at a first position and cursor 508 at a first position. A user may perform horizontal-slide finger gesture 706 to 708 on SPC icon 308. In response to detecting $\Delta F_x$ (a change in the horizontal position of an uninterrupted finger contact on the SPC icon), the device changes the horizontal position of cursor 508 on the display from a first position to a second position such that $\Delta Sx$ (the change in the horizontal position of cursor 508) is proportional to $\Delta F_x$ as illustrated in FIG. 7B. (The cursor second position is shown with a dashed line in FIG. 7B.) This can be written as $\Delta Sx=K_x \Delta F_x$ where $K_x$ is a proportionality constant and where $K_x$~1 for this example.

In the example shown in FIG. 7C, a user positions cursor 508 with $K_x>1$. The device displays UI 700C (FIG. 7C) with editable content 502, selection positioning & control (SPC) icon 308 at a first position and cursor 508 at a first position. A user may perform horizontal-slide finger gesture 710 to 712 on SPC icon 308. In response to detecting $\Delta F_x$ (a change in the horizontal position of an uninterrupted finger contact on the SPC icon), the device changes the horizontal position of cursor 508 on the display from a first position to a second position such that $\Delta Sx$ (the change in the horizontal position of cursor 508) is proportional to $\Delta F_x$ as illustrated in FIG. 7C. (The cursor second position is shown with a dashed line in FIG. 7C.) This can be written as $\Delta Sx = K_x \Delta Fx$ where $K_x$ is a proportionality constant and where $K_x > 1$ for this example.

In the example shown in FIGS. 7D-7E, a user positions cursor 508 using two successive slide finger gestures on the SPC. The device displays UI 700D (FIG. 7D) with editable content 502, selection positioning & control (SPC) icon 308 at a first position and cursor 508 at a first position. A user may perform a first horizontal-slide finger gesture 714 to 716 on SPC icon 308. In response to detecting $\Delta F_x$ (a change in the horizontal position of an uninterrupted finger contact on the SPC icon), the device changes the horizontal position of cursor 508 on the display from a first position to a second position such that $\Delta Sx$ (the change in the horizontal position of cursor 508) is proportional to $\Delta F_x$ as illustrated in FIG. 7D. This can be written as $\Delta Sx = K_x \Delta F_x$ where $K_x$ is a proportionality constant. (The cursor second position is shown with a dashed line in FIG. 7D). The device displays UI 700E (FIG. 7E) with cursor 508 at a second position. A user may perform a second horizontal-slide finger gesture 718 to 720 on SPC icon 308. In response to detecting $\Delta F_x$ (a change in the horizontal position of an uninterrupted finger contact on the SPC icon), the device changes the horizontal position of cursor 508 on the display from a second position to a third position such that $\Delta Sx$ (the change in the horizontal position of cursor 508) is proportional to $\Delta F_x$ as illustrated in FIG. 7E. (The cursor third position is shown with a dashed line in FIG. 7E.) This can be written as $\Delta Sx = K_x \Delta F_x$ where $K_x$ is a proportionality constant.

Figure 13A:
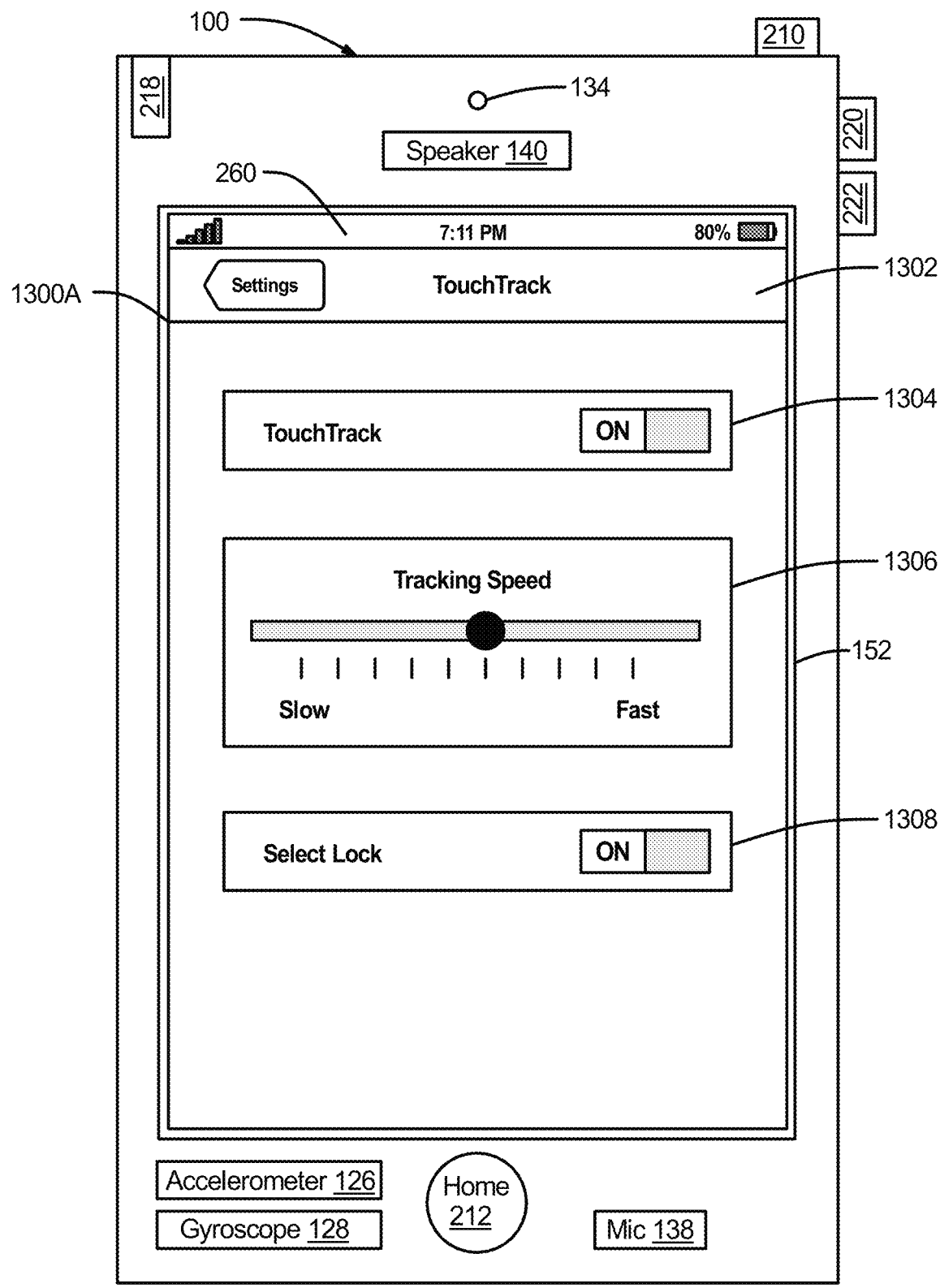
FIG. 13A illustrates an exemplary user interface for user selectable settings.
Figure 13B:
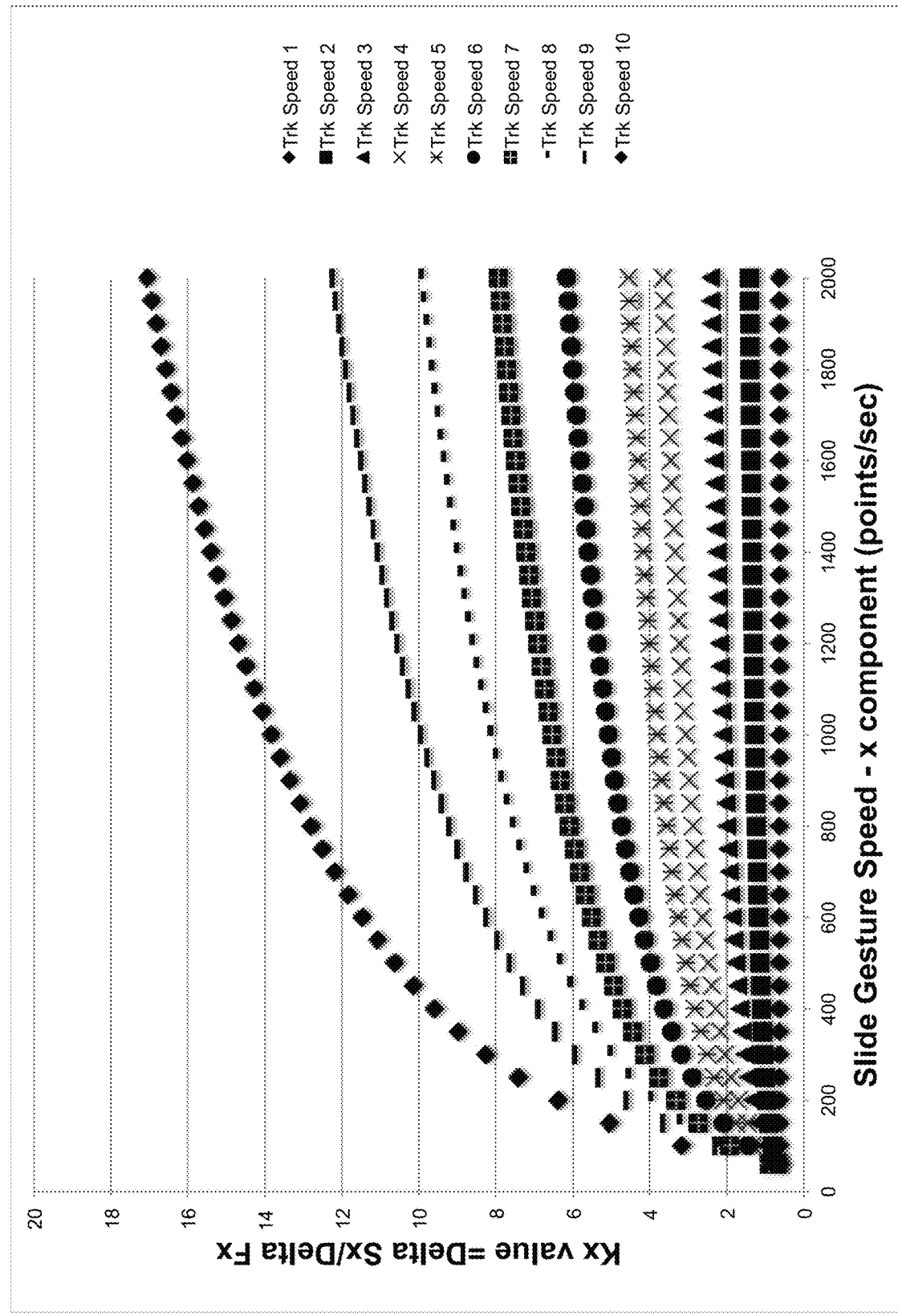
FIG. 13B illustrates an example functional dependence of Kx on the x-component of the slide gesture speed on the SPC icon for a given "tracking speed" setting ranging from a tracking speed setting of 1 to tracking speed setting of 10.

In one exemplary embodiment, the value of proportionality constant $K_x$ may be selected by a user in a settings user interface. (An exemplary UI for settings will be shown in FIG. 13A) In another exemplary embodiment, the value of proportionality constant $K_x$ may be a function of the rate of change in the horizontal position of an uninterrupted finger contact on the SPC icon. (An exemplary functional dependence is illustrated in FIG. 13B.) In another exemplary embodiment, the functional dependence of $K_x$ on the rate of change in the horizontal position of an uninterrupted contact on the SPC icon may be set by a user in such a settings user interface as illustrated in FIG. 13A.

Figure 8A:
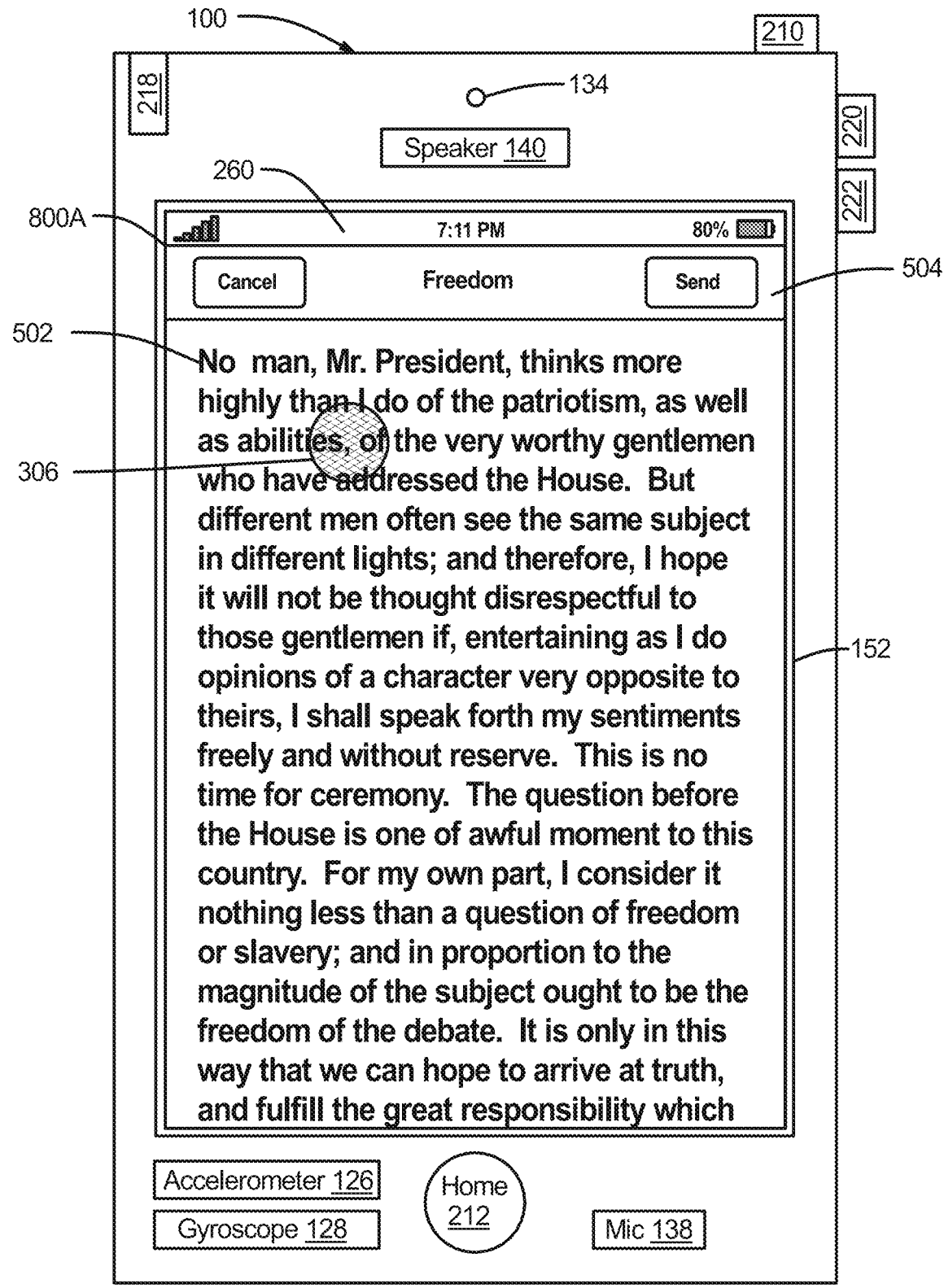
FIGS. 8A-8H illustrate an exemplary user interface and method for positioning a cursor (a selection of zero length) and selecting text within editable content on a handheld mobile computing device with a touch-sensitive display for Kx~1 in accordance with a first exemplary embodiment.
Figure 8B:
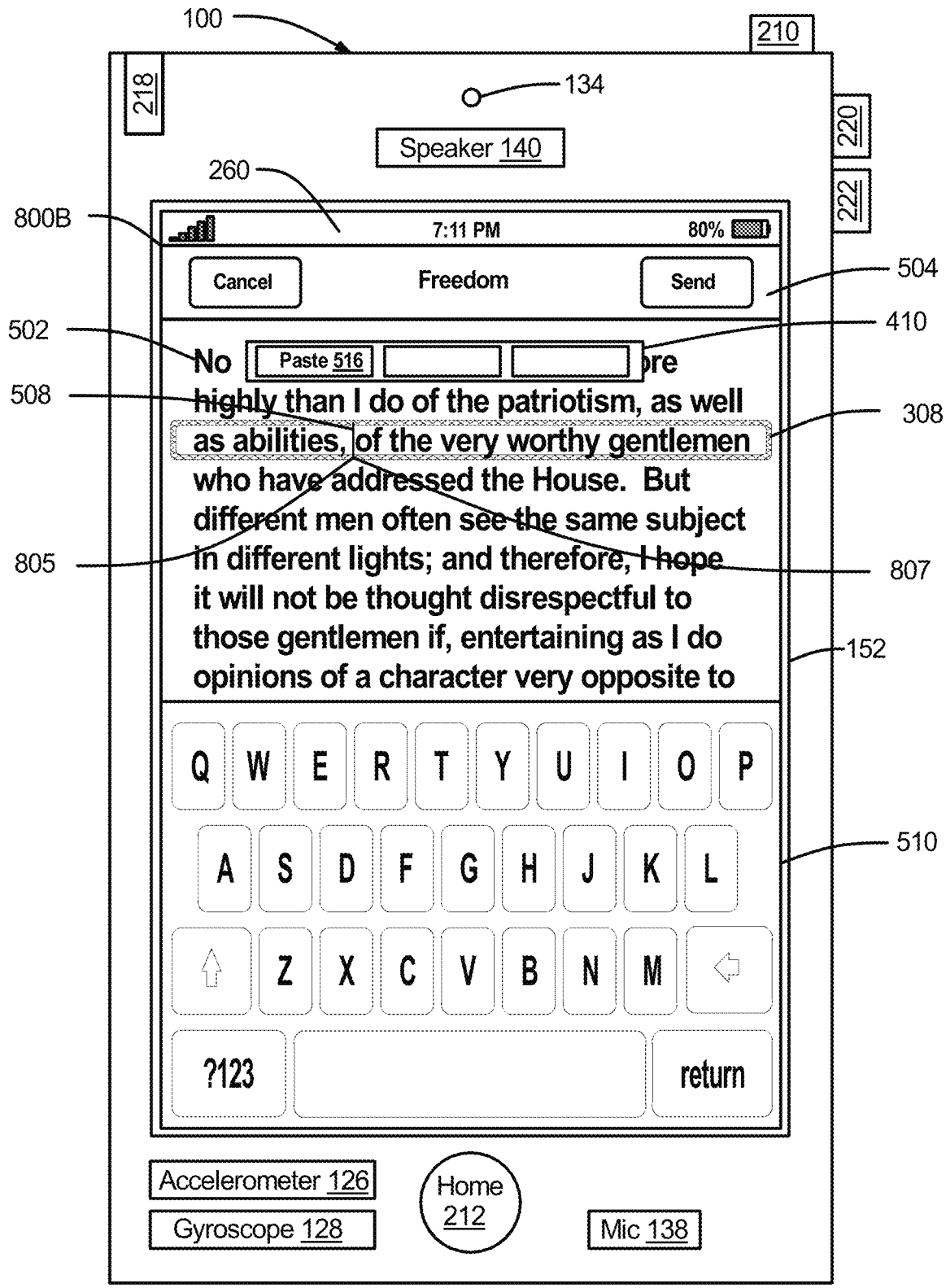
Figure 8C:
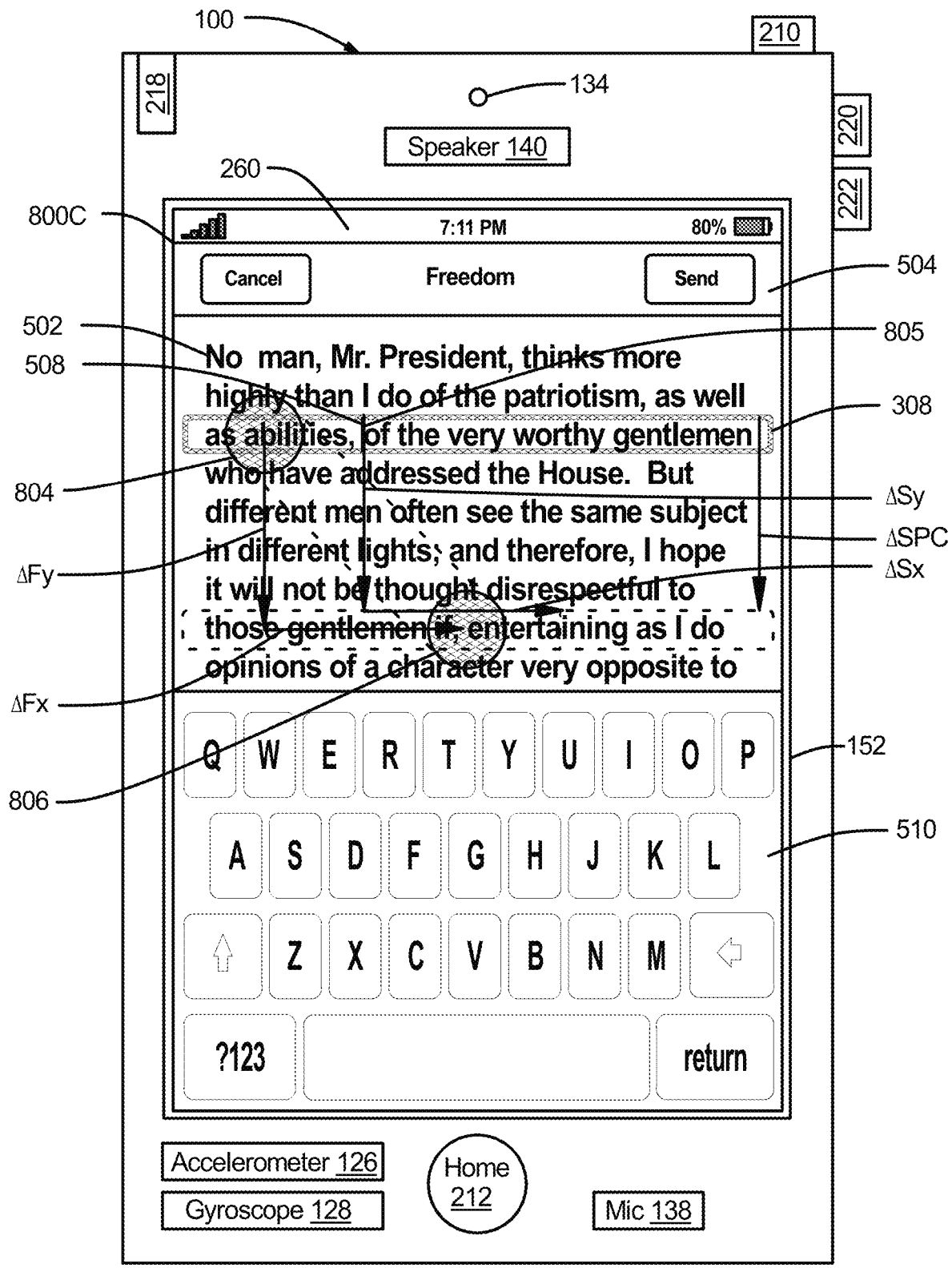
Figure 8D:
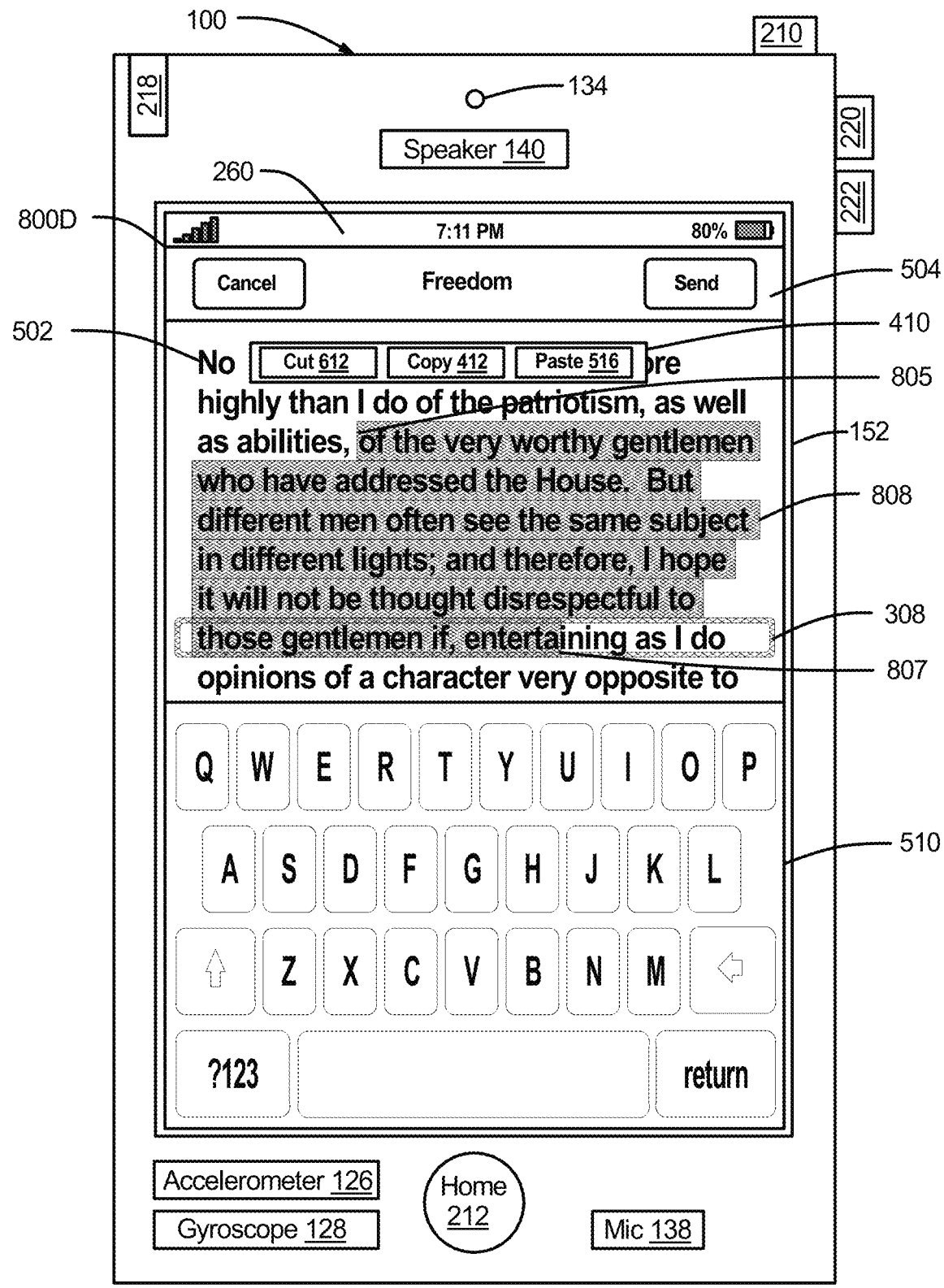
Figure 8E:
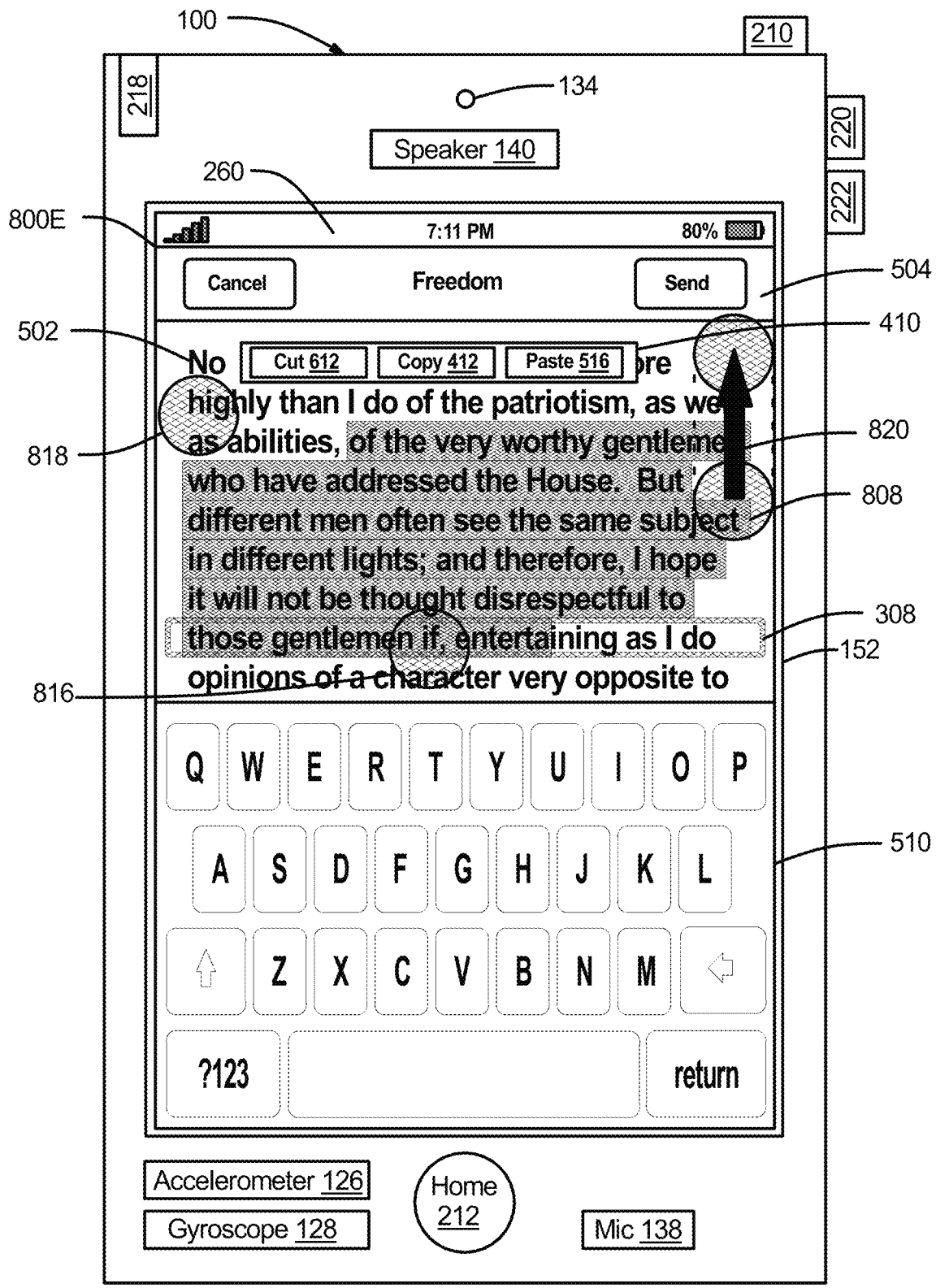
Figure 8F:
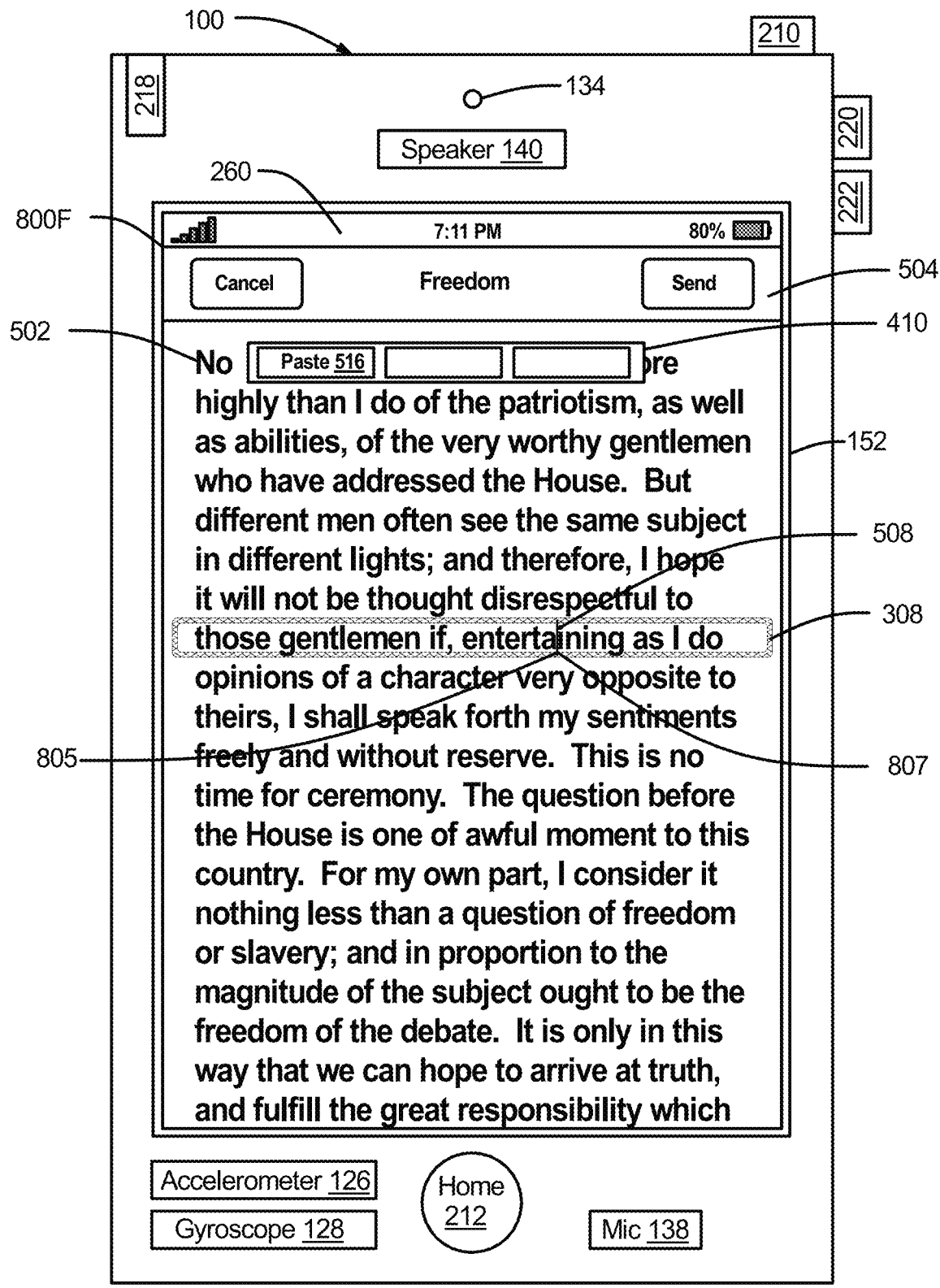
Figure 8G:
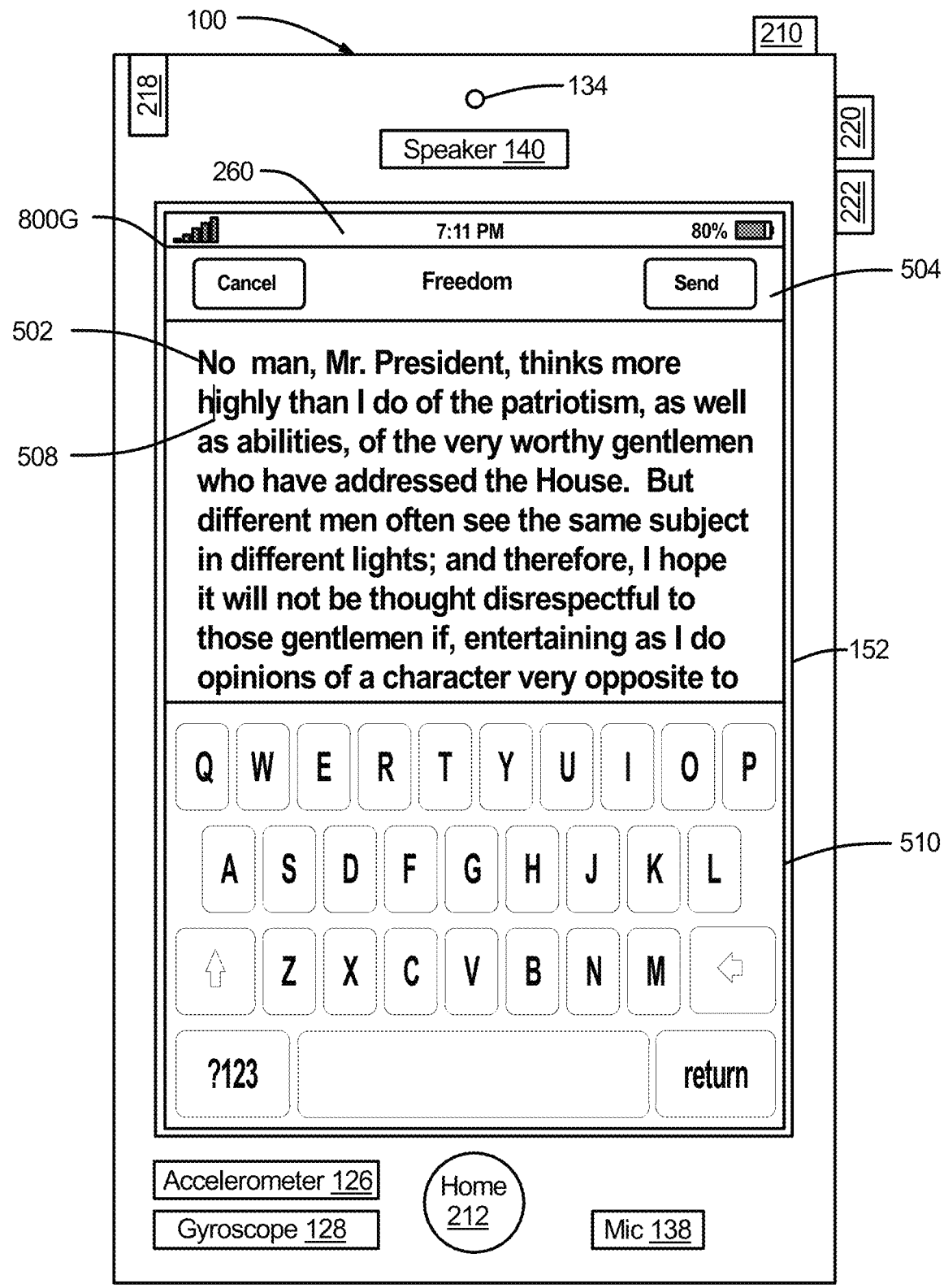
Figure 8H:
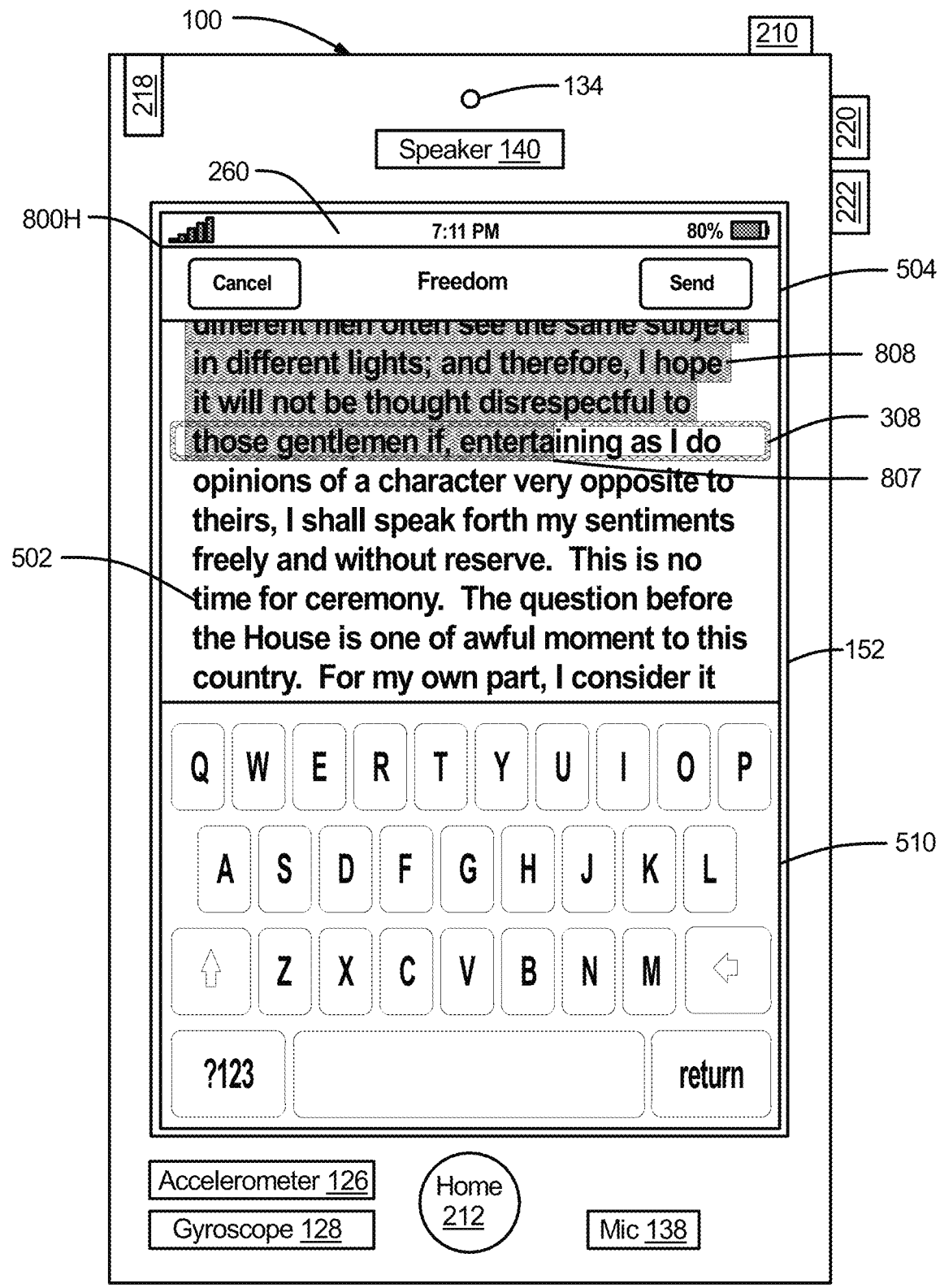
Figure 9A:
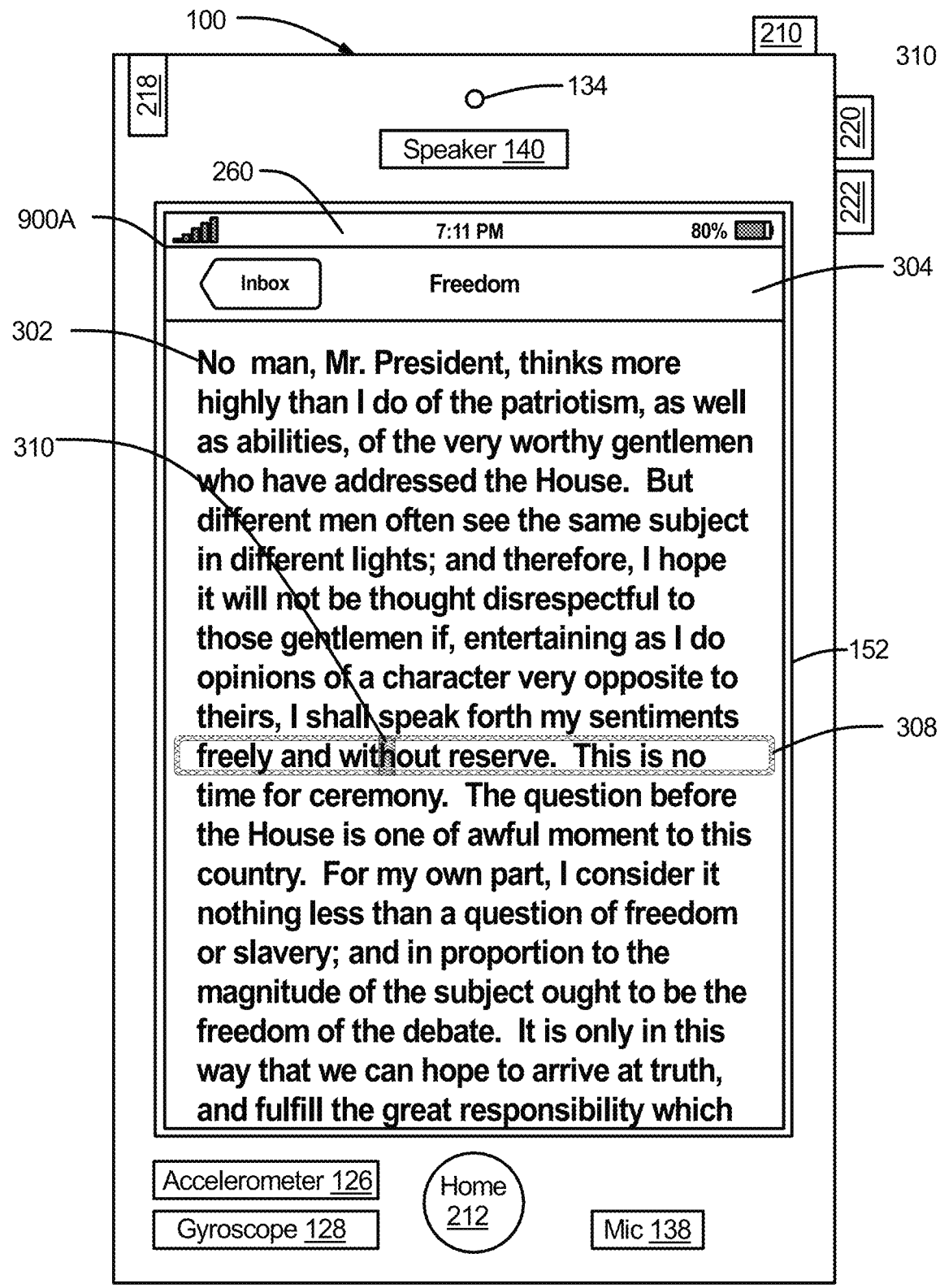
FIGS. 9A-9D illustrate positioning a selection of one character length and selecting text within read-only content on a handheld mobile computing device with a touch-sensitive display with the device in portrait and landscape orientation.
Figure 9B:
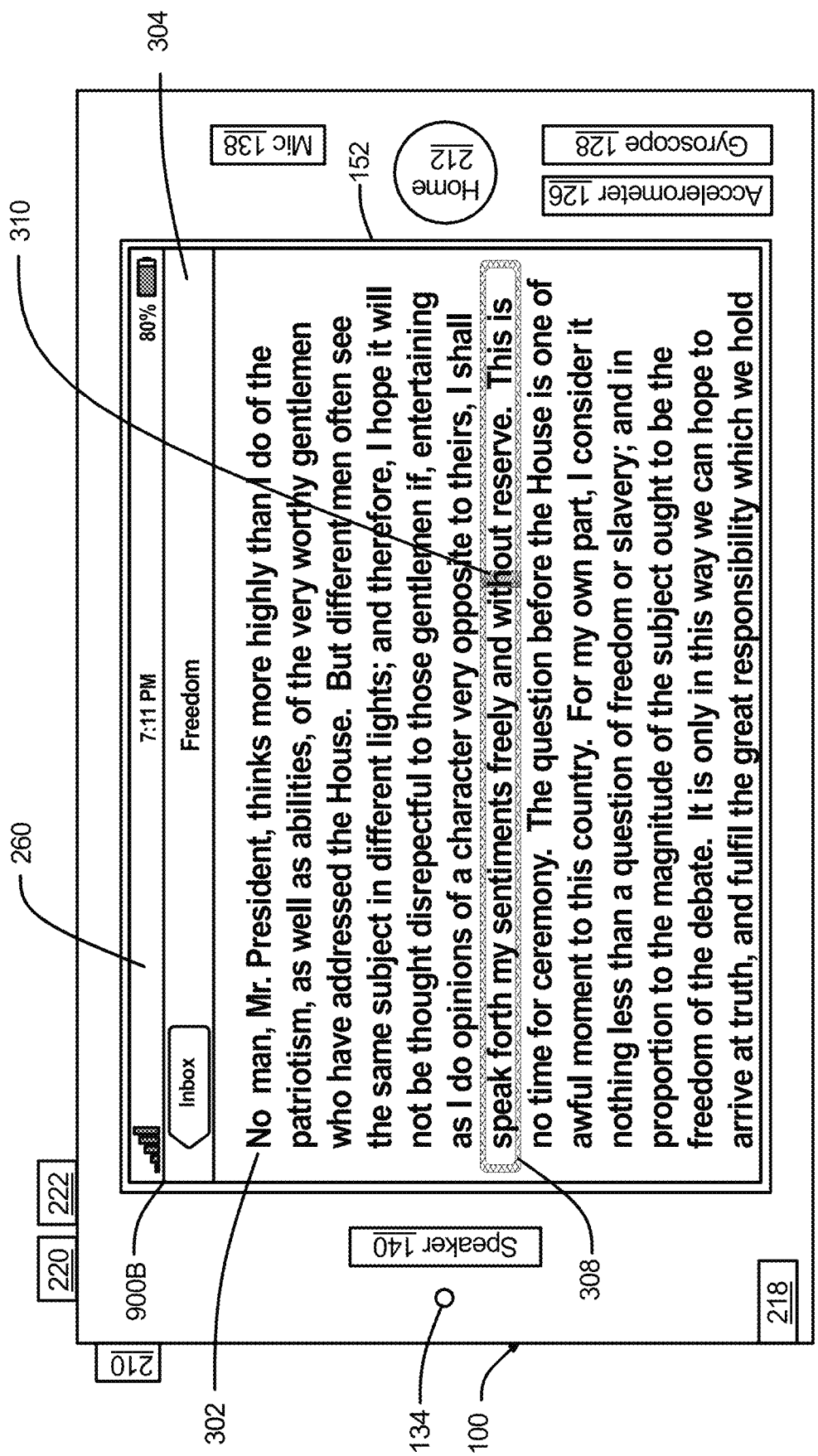
Figure 9C:
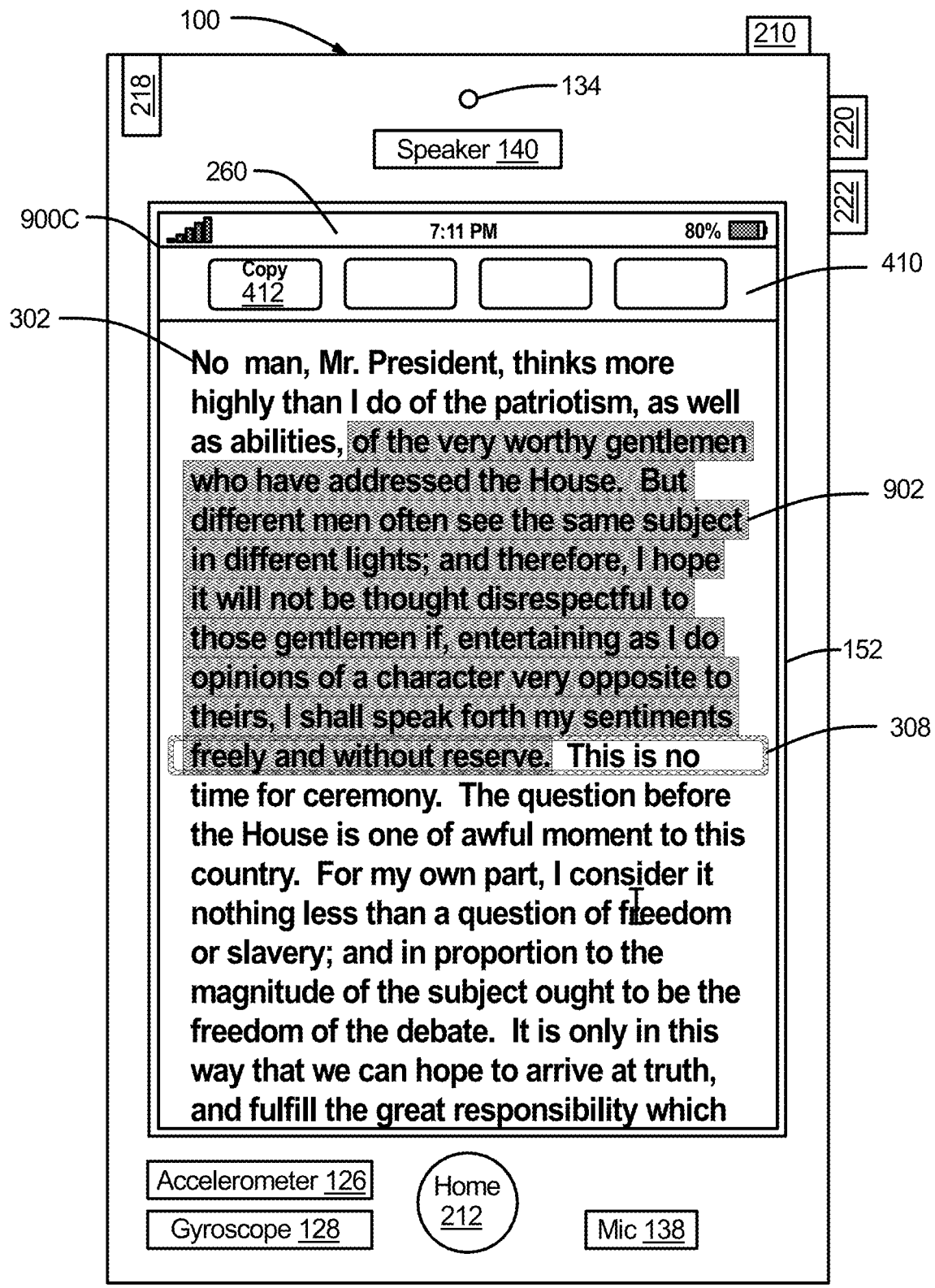
Figure 9D:
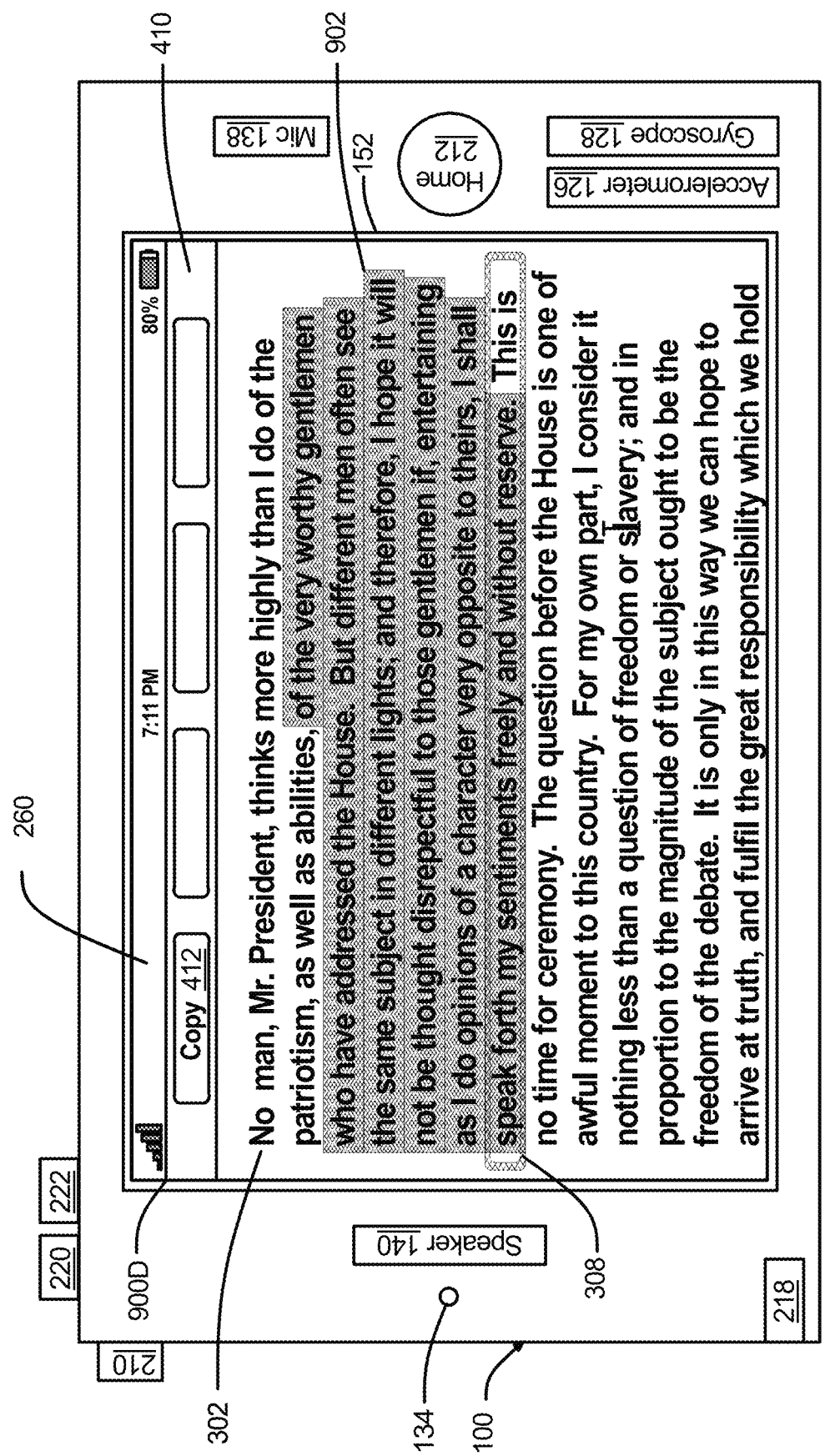

FIGS. 8A-8H illustrate an exemplary user interface and method for positioning a cursor (a selection of zero length) and selecting text within editable content on a handheld mobile computing device with a touch-sensitive display for Kx~1 in accordance with a first exemplary embodiment. The device displays editable content 502 in UI 800A (FIG. 8A). The device may also display application navigation bar 504. A user may perform long-press finger gesture 306 on the editable content in UI 800A (FIG. 8A). In response, the device displays UI 800B (FIG. 8B) with selection positioning & control (SPC) icon 308 at a first position and cursor 508 (a selection of zero length) at a first position with selection start point 805 and selection end point 807 initially at the same position. The device may also display soft keyboard 510. In one exemplary embodiment, the position of the cursor 508 is the location of the finger gesture on the content. In another exemplary embodiment, the position of the cursor 508 is offset from the location of the finger gesture on the content. A user may perform tap-and-slide finger gesture 804 to 806 on SPC icon 308, as shown in FIG. 8C.

In response, the device displays UI 800D (FIG. 8D) with selected text 808 displayed from a first position to a second position where the first position is located at selection start point 805 and the second position is located at selection end point 807. The device may also display toolbar 410 with "Copy" icon 412. Upon detection of tap finger gesture 816 on SPC icon 308 in UI 800E (FIG. 8E), the device displays UI 800F (FIG. 8F) with selected text 808 cancelled and no longer displayed and with cursor 508 positioned at selection end point 807. In another embodiment, cursor 508 can be positioned at the location of the tap finger gesture 816. Upon detection of tap finger gesture 818 at a location not on SPC icon 308 on UI 800E (FIG. 8E), the device displays UI 800G (FIG. 8G), with text selection 808 cancelled and no longer displayed, with SPC icon 308 no longer displayed, and with cursor 508 displayed at the tap location. Upon detection of a page-scroll-up slide finger gesture 820 on content 502 on UI 800E (FIG. 8E), the device displays UI 800H (FIG. 8H) with both content 502 and selected text 808 scrolled up by an amount equal to the length of page-scroll-up slide finger gesture 820.

FIGS. 9A-9D illustrate positioning a selection of one character length and selecting text within read-only content on a handheld mobile computing device with a touch-sensitive display with the device in portrait and landscape orientation in accordance with some embodiments. The device displays UI 900A (FIG. 9A) with read-only content 302, selection positioning & control (SPC) icon 308 and selection 310. A user may change the device orientation from portrait to landscape orientation. In one example embodiment the device detects the change in device orientation using data read from accelerometer 126 and displays UI 900B (FIG. 9B) with read-only content 302 in landscape orientation. The position of the selection 310 in the text content remains unchanged as the device orientation is changed from portrait to landscape. In addition, the vertical position of the selection positioning and control (SPC) icon 308 relative to the vertical position of selection 310 remains unchanged as the device orientation is changed from portrait to landscape as shown in this example.

The device displays UI 900C (FIG. 9C) with read-only content 302, selected text 902 displayed selected from a first position to a second position within the text. Again, a user may change the device orientation from portrait to landscape orientation. The device detects the change in device orientation using data read from accelerometer 126 in one example embodiment and displays UI 900D (FIG. 9D) with read-only content 302 in landscape orientation. The position of the selection 902 in the text content remains unchanged as the device orientation is changed from portrait to landscape. In addition, the vertical position of the selection positioning and control (SPC) icon 308 relative to the vertical position of selection 902 remains unchanged as the device is orientation is changed from portrait to landscape.

FIGS. 10A-10D illustrate positioning a selection and selecting within read-only content on a handheld mobile computing device with a touch-sensitive display when SPC icon 308 reaches the last line of displayed text and the text content scrolls.

Figure 10A:
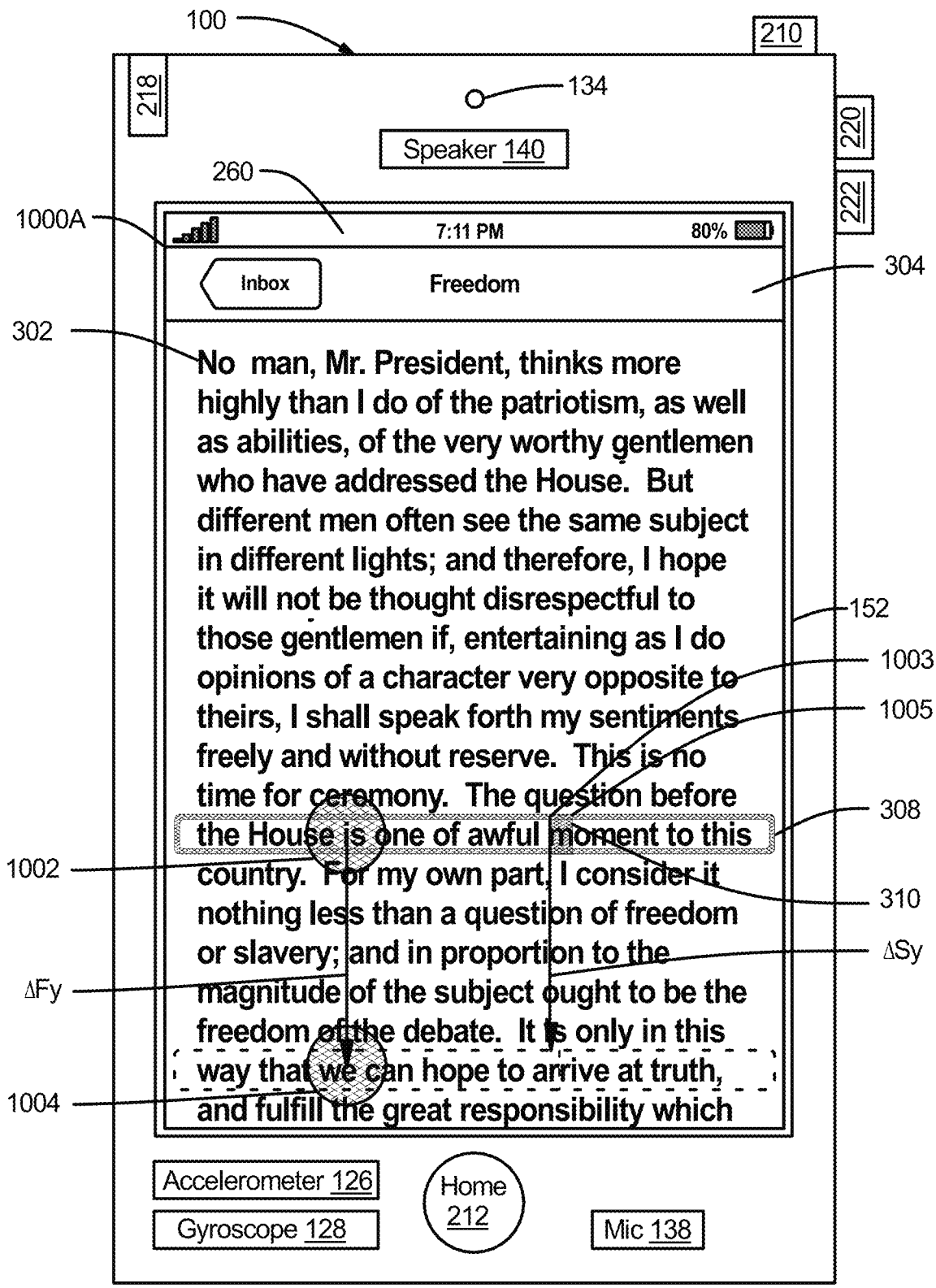
FIGS. 10A-10D illustrate positioning a selection of one character length and selecting text within read-only content on a handheld mobile computing device with a touch-sensitive display when SPC icon 308 reaches the last line of displayed text and the text content scrolls.
Figure 10B:
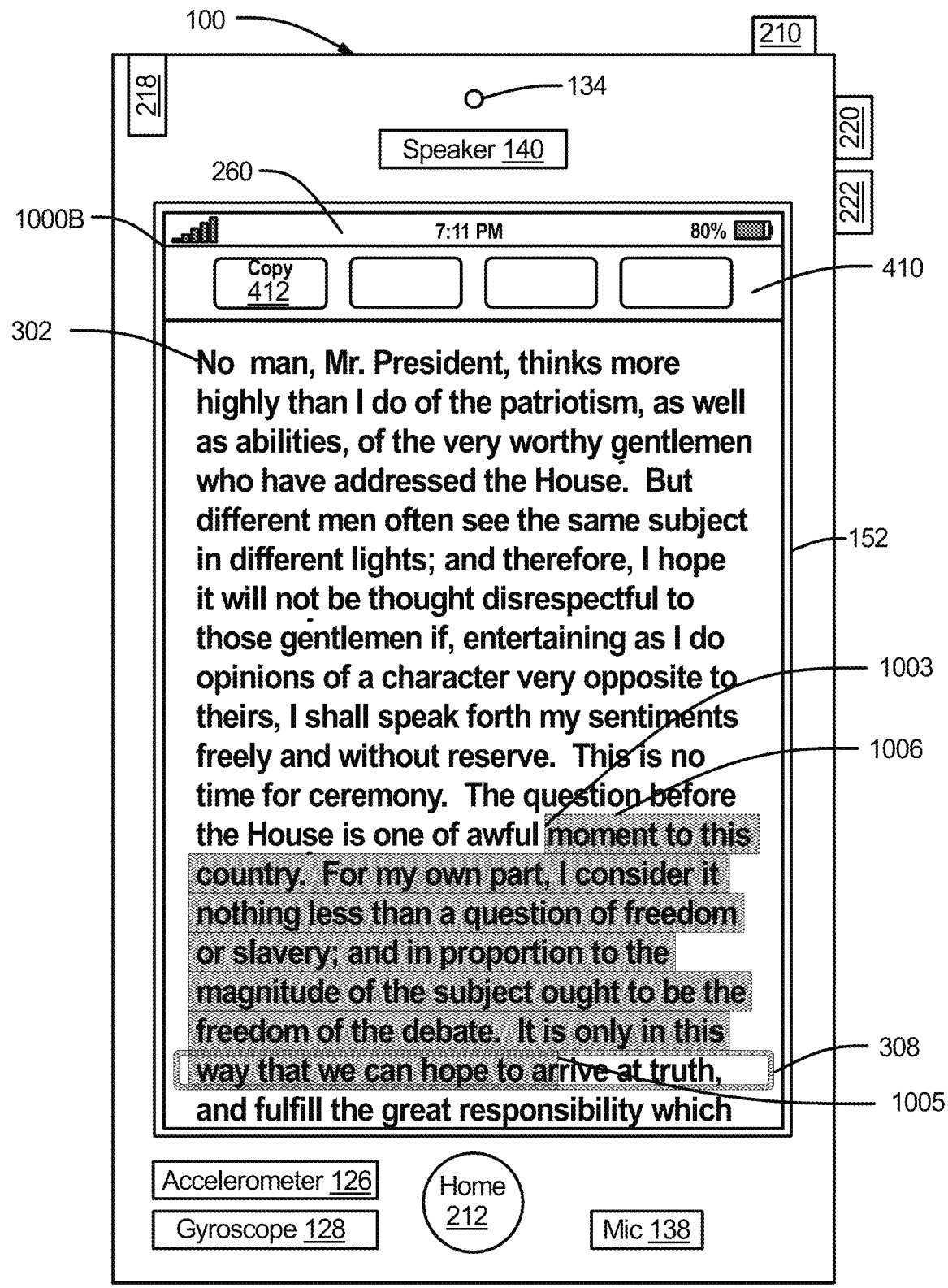
Figure 10C:
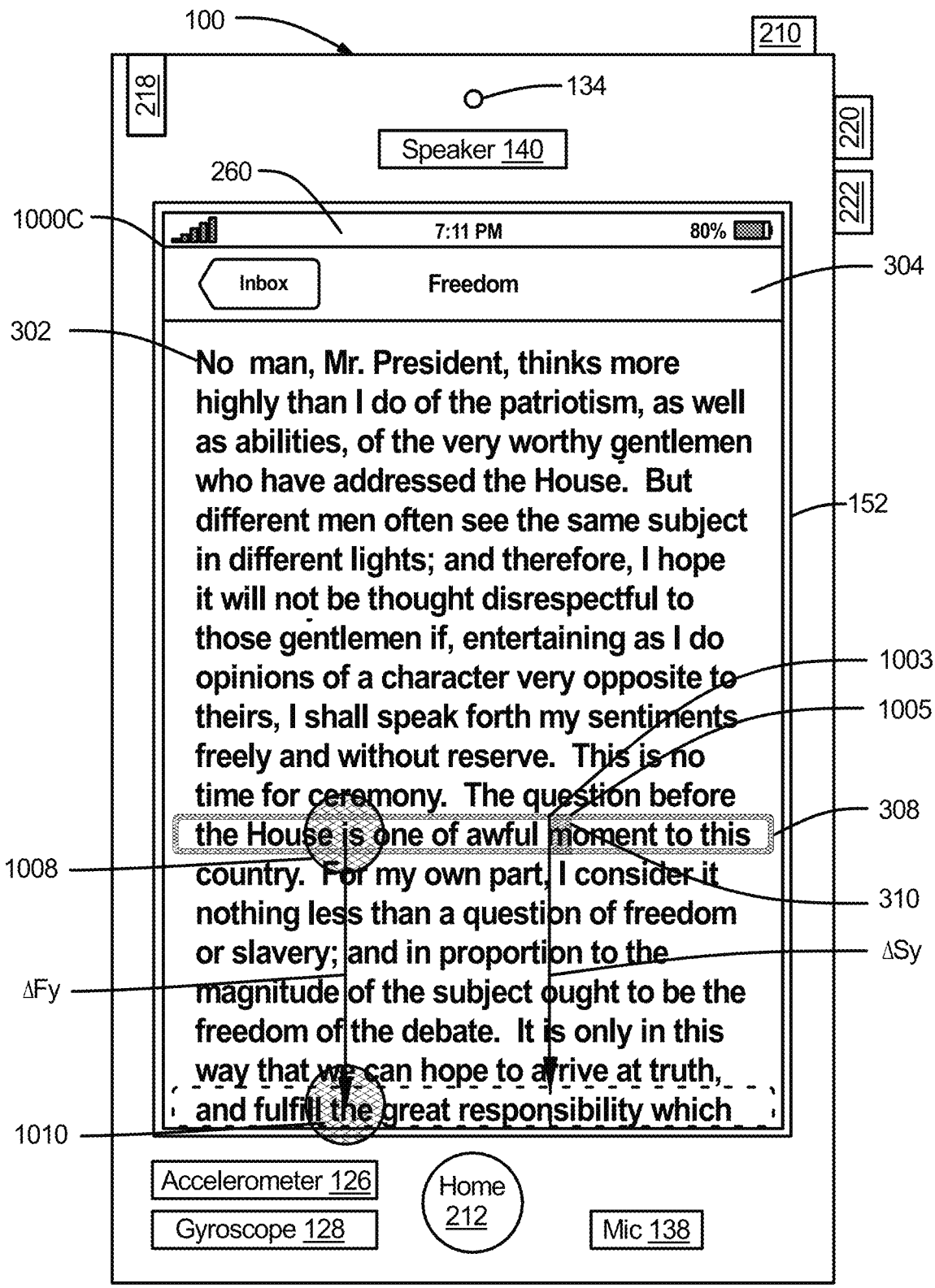
Figure 10D:
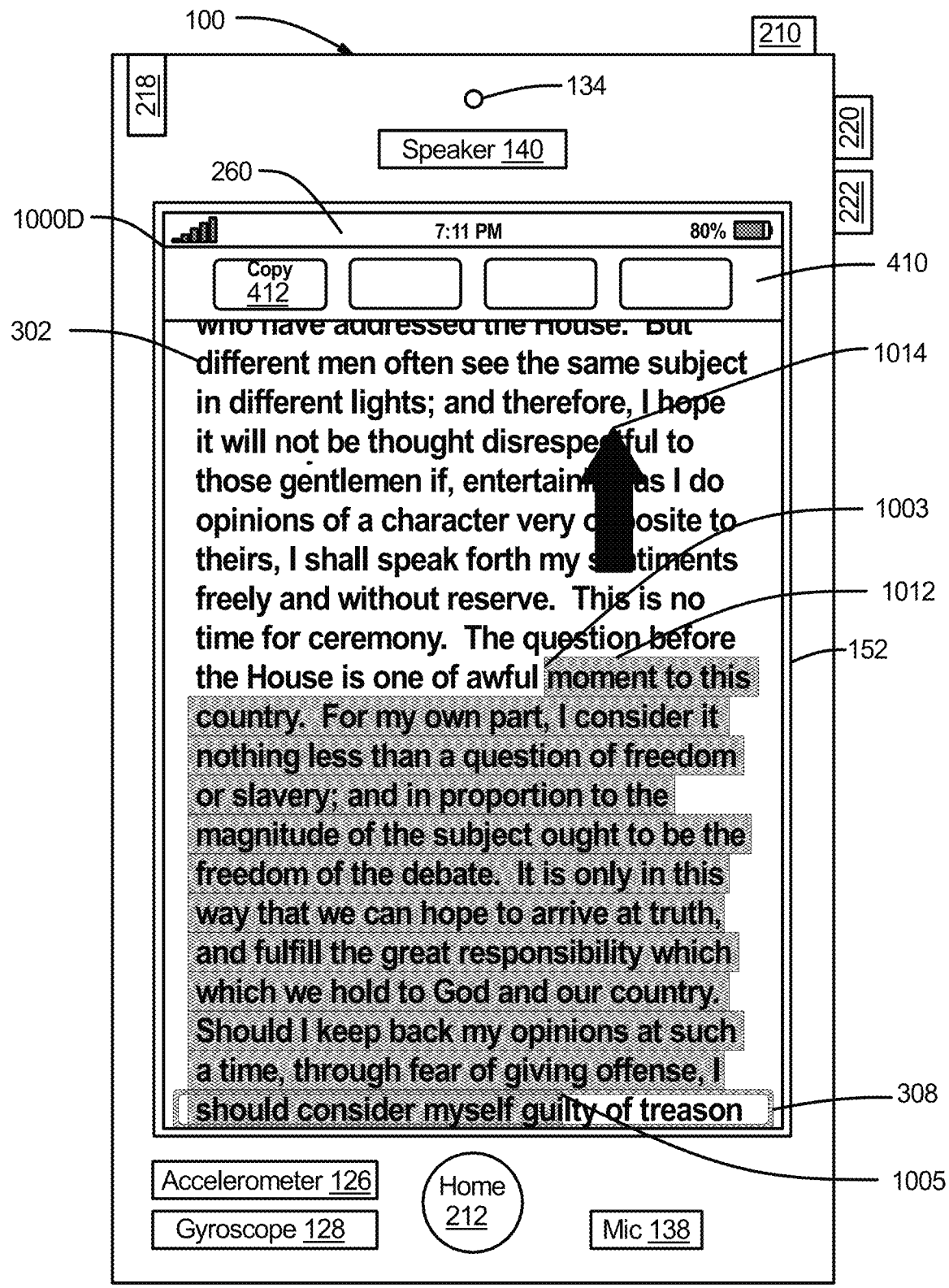

The device displays read-only content 302 in UI 1000A (FIG. 10A) with selection positioning & control (SPC) icon 308 at a first position and selection 310 of one character length at a first position with selection start point 1003 and selection end point 1005. The device may also display application navigation bar 304. In a first example, a user may perform tap-and-slide finger gesture 1002 to 1004 on SPC icon 308, as shown in FIG. 10A. In response, the device displays UI 1000B (FIG. 10B) with selected text 1006 displayed from a first position to a second position. In a second example, a user may perform tap-and-slide finger gesture 1008 to 1010 on SPC icon 308 that will move SPC icon 308 to a position on the last line of displayed text, as shown in UI 1000C (FIG. 10C). When SPC icon 308 is moved to the last line of displayed text, the device displays UI 1000D (FIG. 10D) and scrolls up content 302 as denoted by arrow 1014. This enables the content to be selected from a first position to a new second position farther down the content page. In the example shown in FIG. 10D, the content has scrolled up four lines. The device continues to scroll up the content, either until the user moves SPC icon 308 up from the last line of displayed text, or until the page has scrolled to last line of the text content. In an analogous manner, when SPC icon 308 is moved to a first line of displayed text content, the content scrolls down until the first line of content is visible.

Figure 10E:
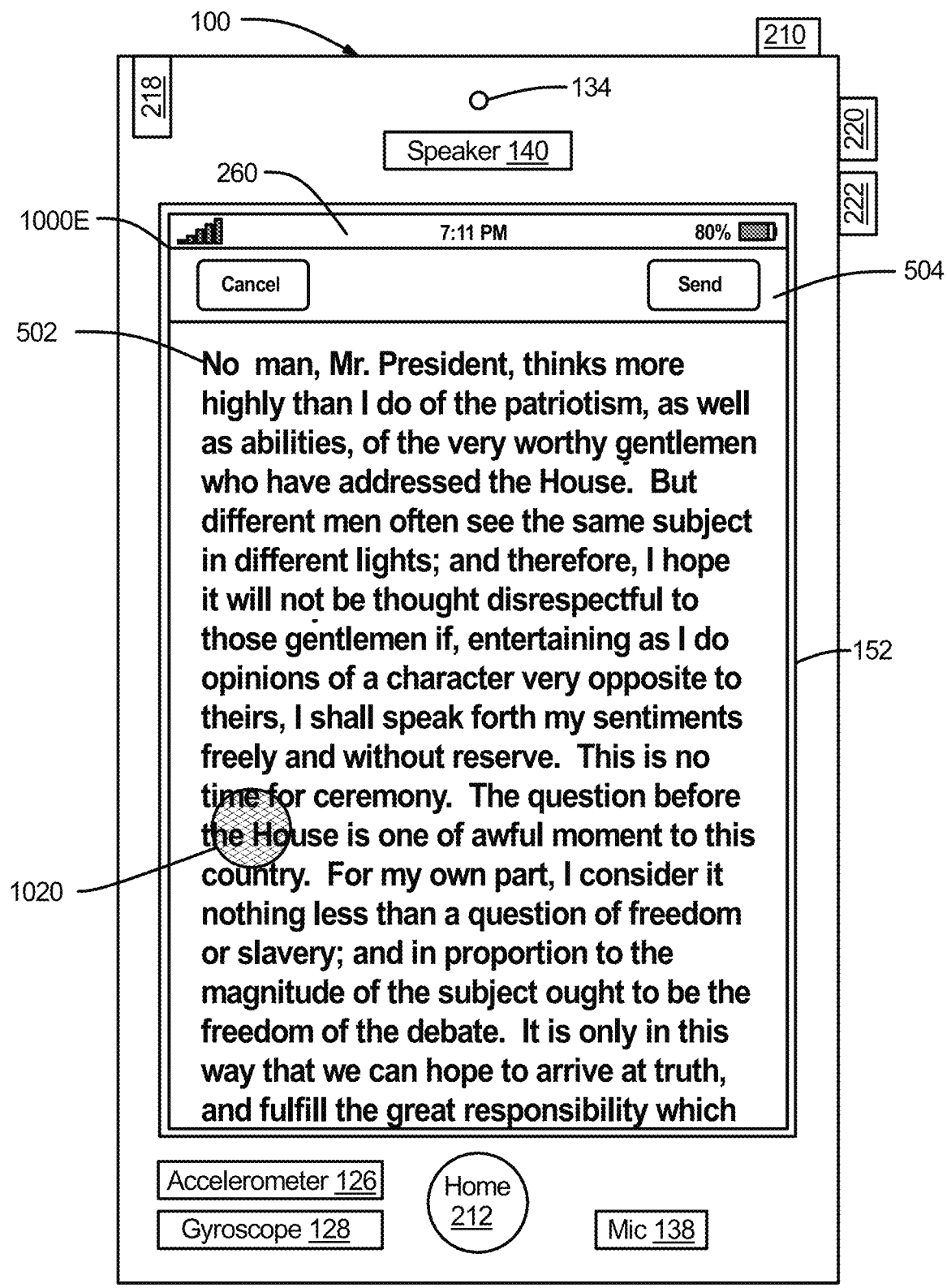
FIGS. 10E-10I illustrate positioning a cursor (a selection of zero length) and selecting text within editable content on a handheld mobile computing device with a touch-sensitive display when SPC icon 308 reaches the last line of displayed text and the text content scrolls.
Figure 10F:
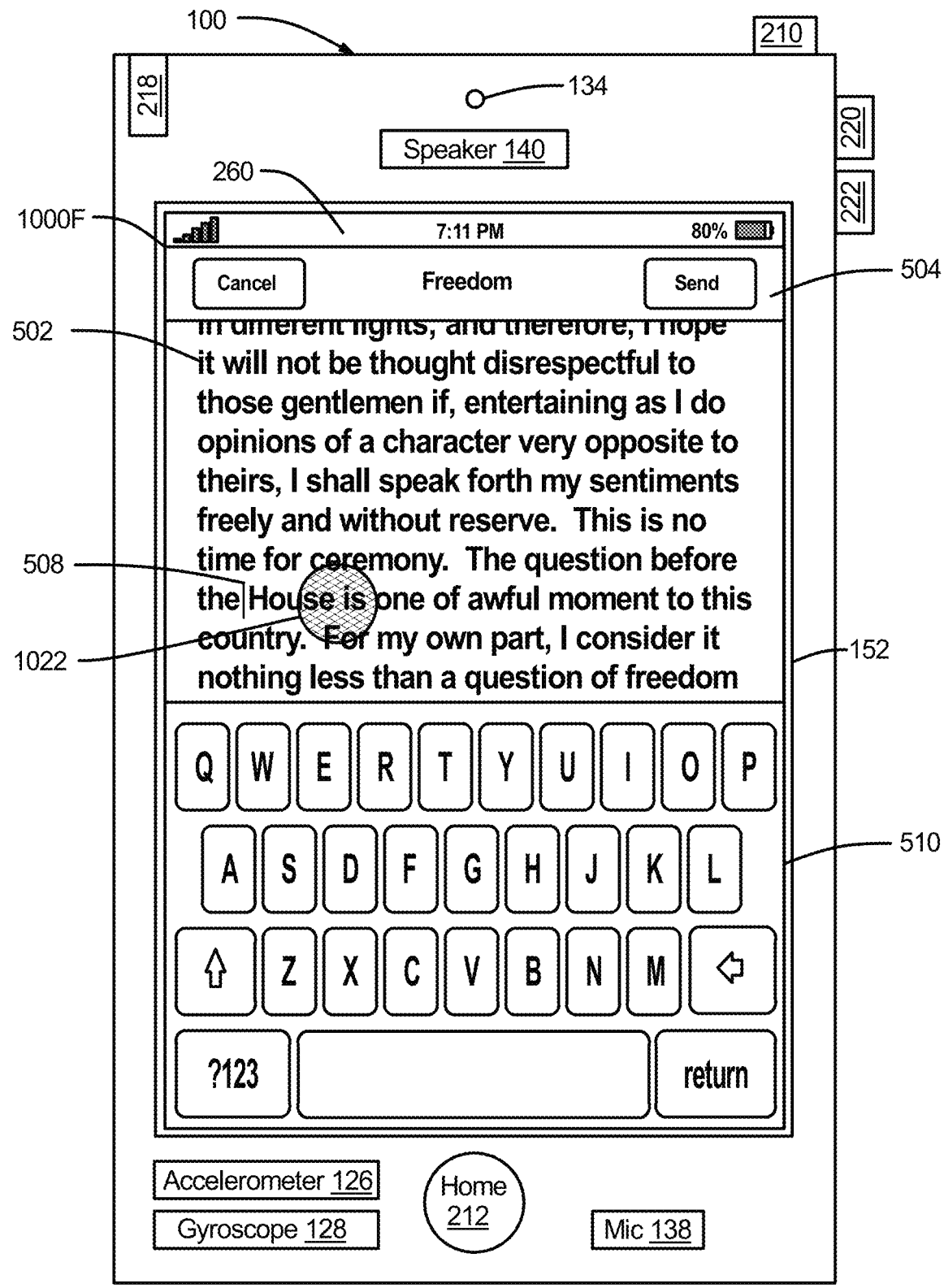
Figure 10G:
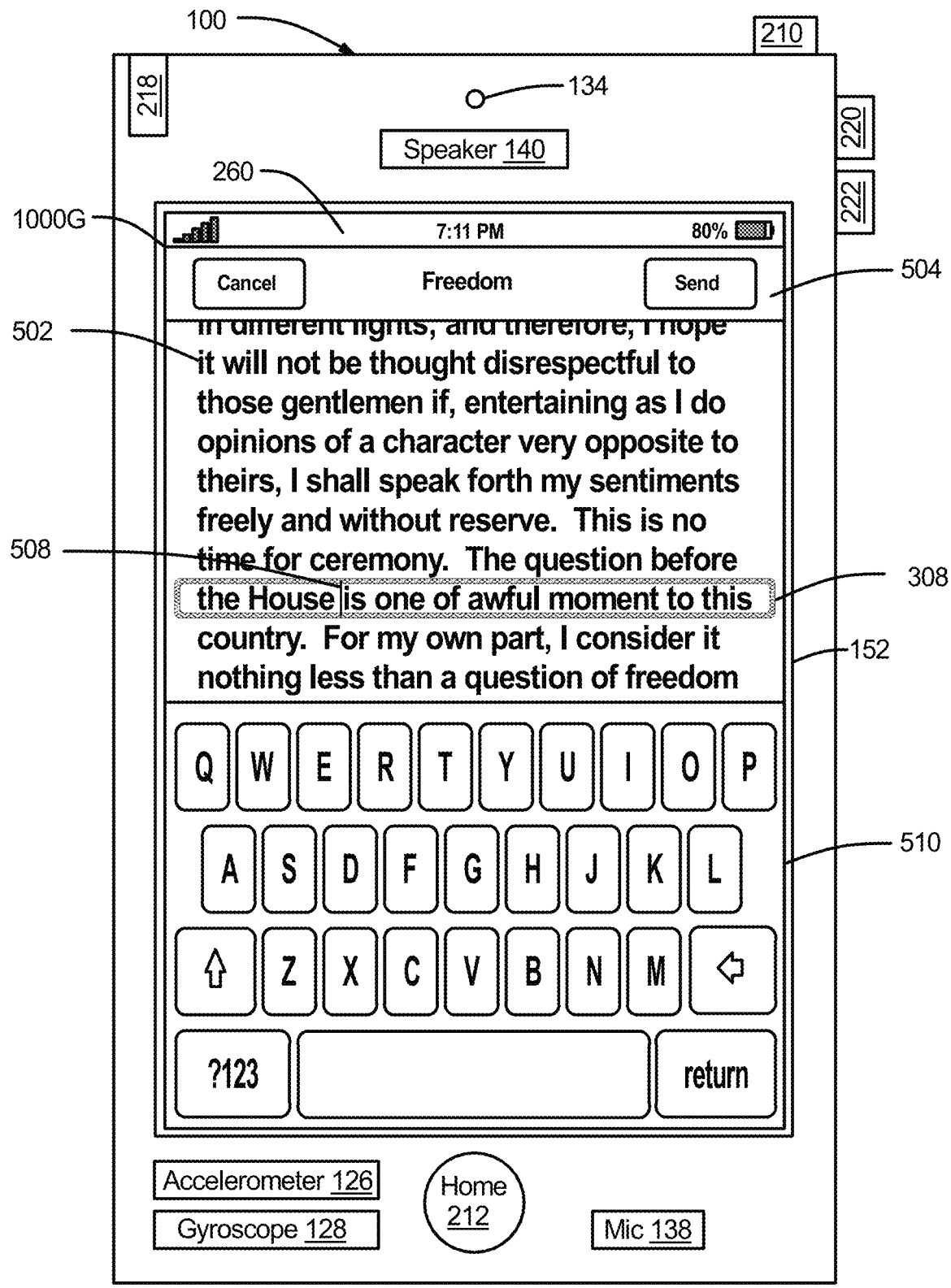
Figure 10H:
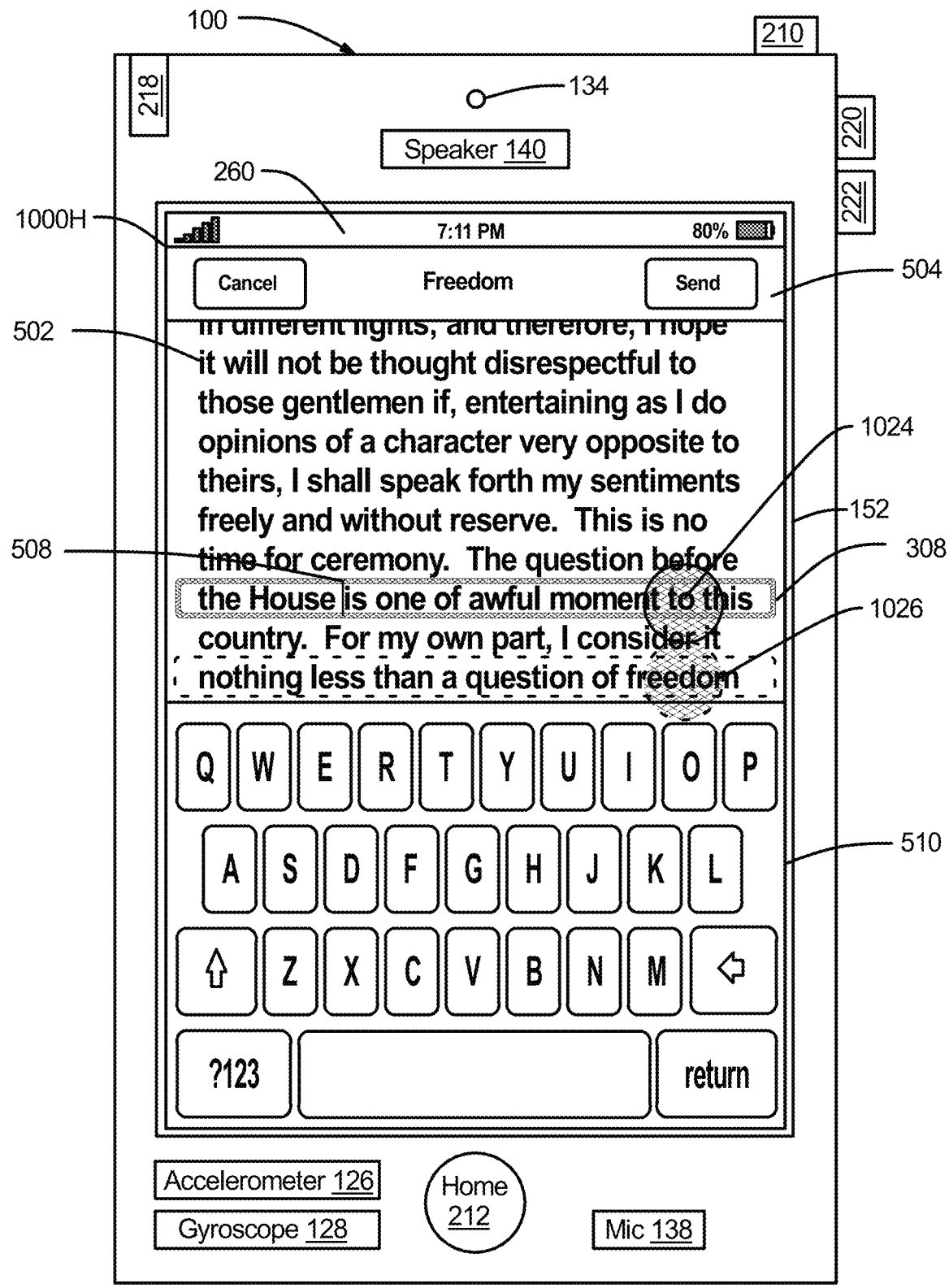
Figure 10I:
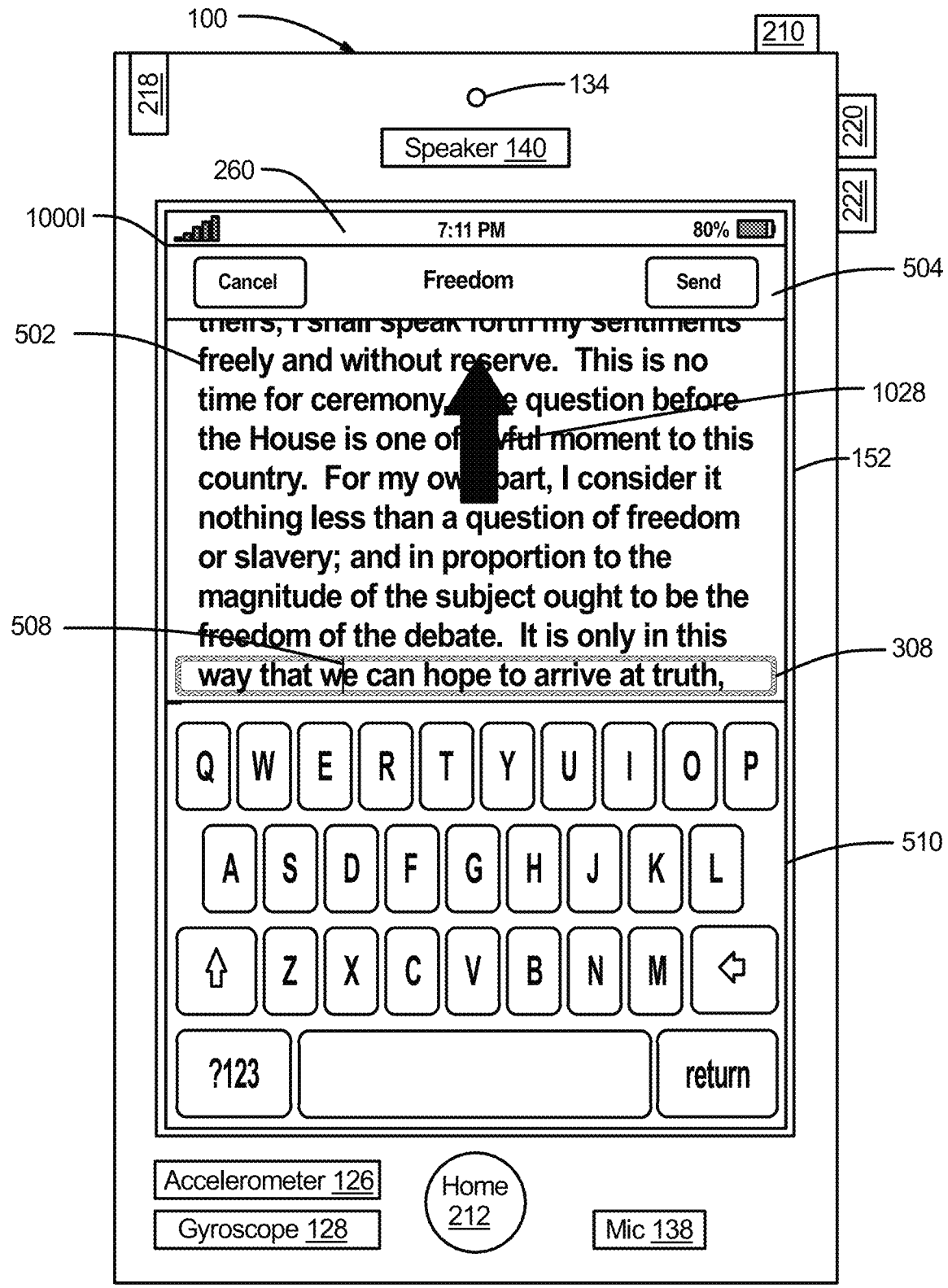

FIGS. 10E-10I illustrate positioning cursor 508 and selecting text within editable content 502 on a handheld mobile computing device with a touch-sensitive display when SPC icon 308 reaches the last line of displayed text and the text content scrolls. The device displays editable content 502 in UI 1000E (FIG. 10E). A user may perform tap finger gesture 1020 on editable content 502. In response, the device displays UI 1000F (FIG. 10F) with cursor (a selection of zero length) 508 displayed at the location of tap finger gesture 1020, and also displays soft keyboard 510. The device also scrolls up the content in UI 1000F so that the cursor (a selection of zero length) is not hidden by keyboard 510. A user may perform long-press finger gesture 1022 on the content as illustrated in FIG. 10F. In response, the device displays UI 1000G (FIG. 10G) with SPC icon 308 at a first position and cursor 508 at a first position. A user may perform a vertical-slide finger gesture 1024 to 1026 on SPC icon 308 as illustrated in FIG. 10H. This finger gesture moves SPC icon 308 and cursor 508 from the first position down the page to the last line of displayed text at the lower extent of the displayed content. The device displays UI 1000I (FIG. 10I) and scrolls up content 502 as denoted by arrow 1028. This enables moving cursor 508 from a first position to a new second position further down the content page. In the example shown in FIG. 10I, the content has scrolled up four lines. The device continues to scroll up the content, either until the user moves SPC icon 308 off the last line of text to stop the scrolling, or until the page has scrolled to the end of the content. In an analogous manner, when SPC icon 308 is moved to the first line of displayed text, the content scrolls down until the first line of content is visible.

Figure 11A:
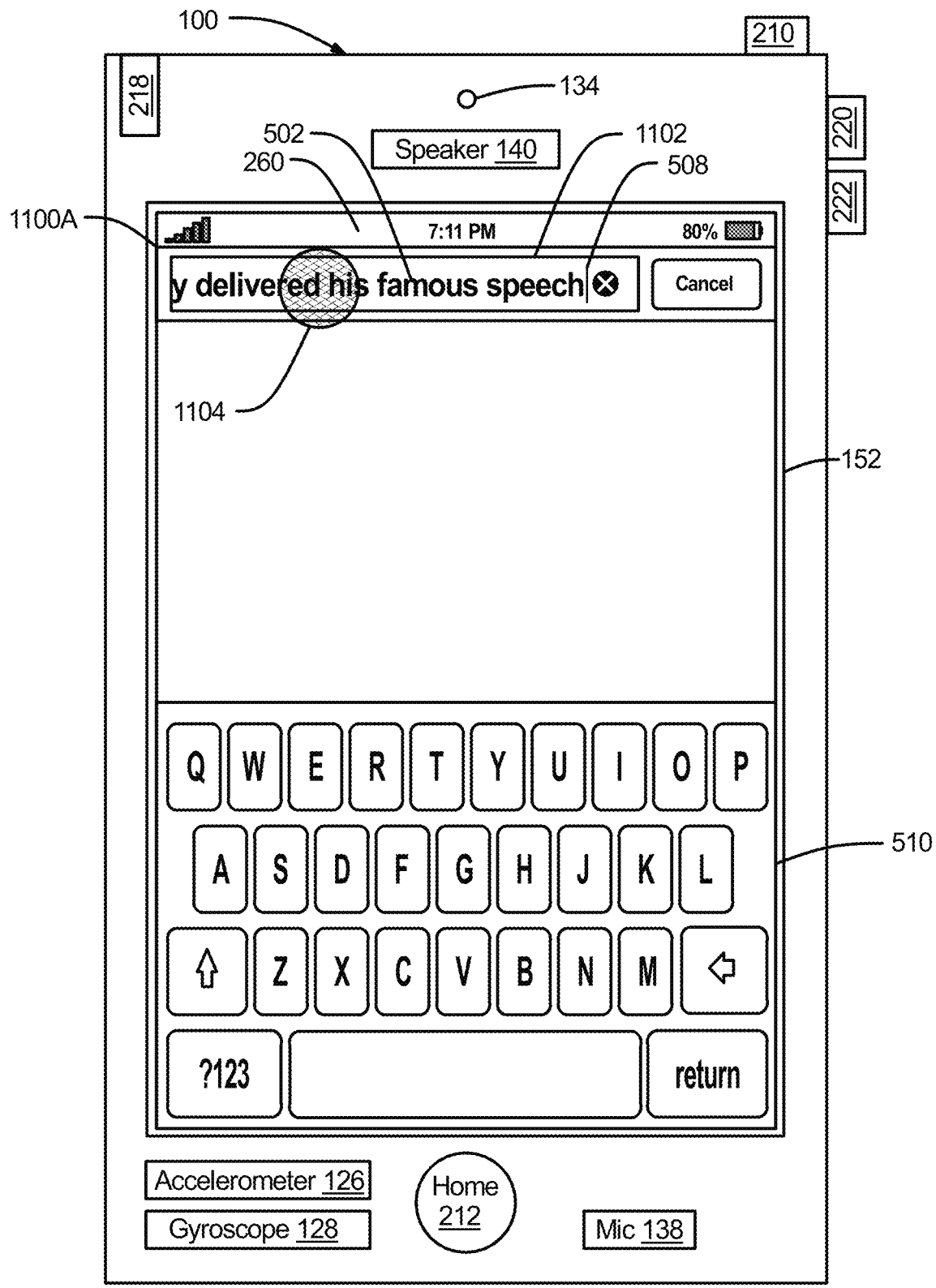
FIGS. 11A-11H illustrate positioning a cursor (a selection of zero length) within editable content on a handheld mobile computing device with a touch-sensitive display when the cursor reaches the first character at the left boundary of displayed text and the text content scrolls.
Figure 11B:
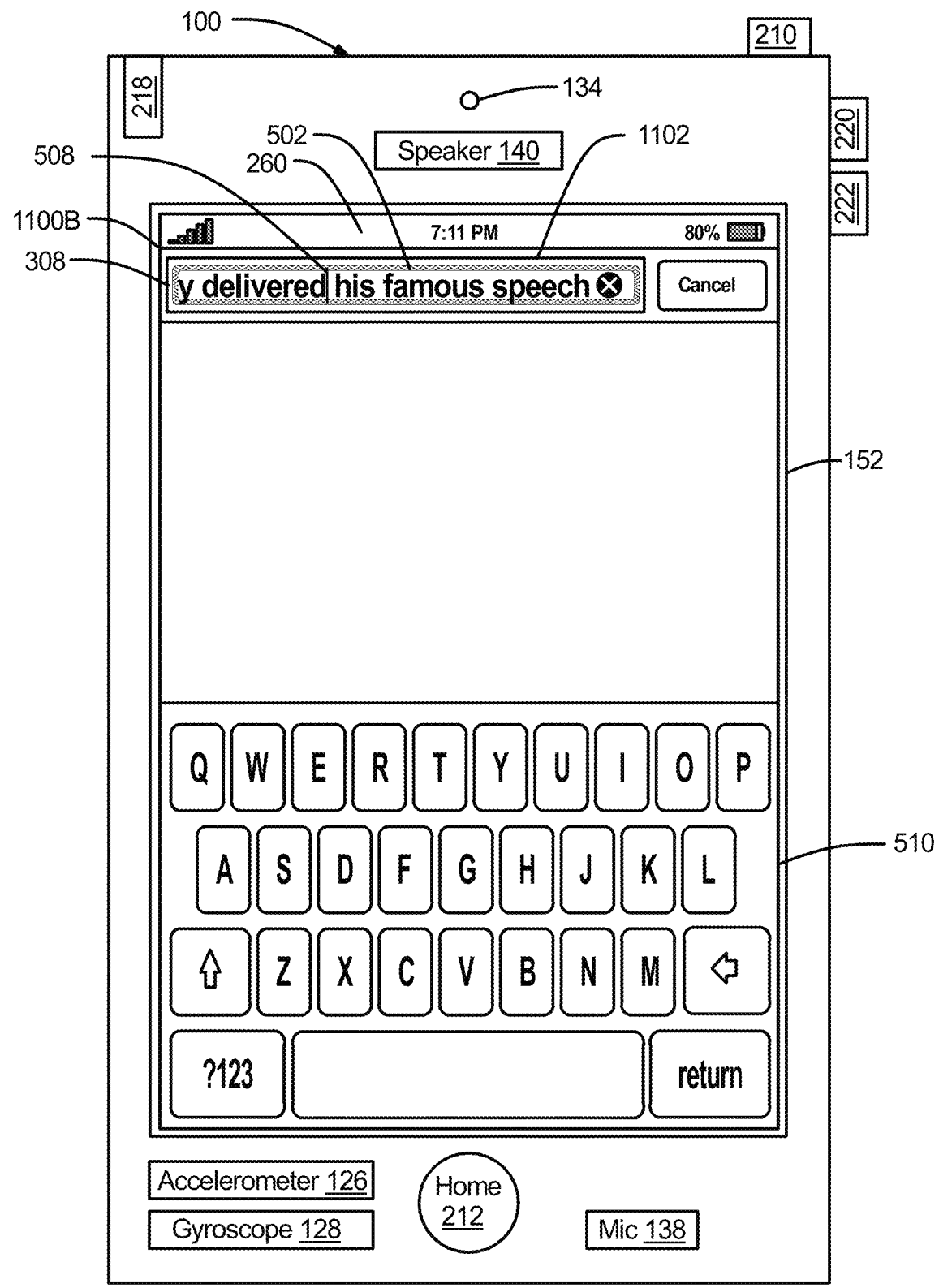
Figure 11C:
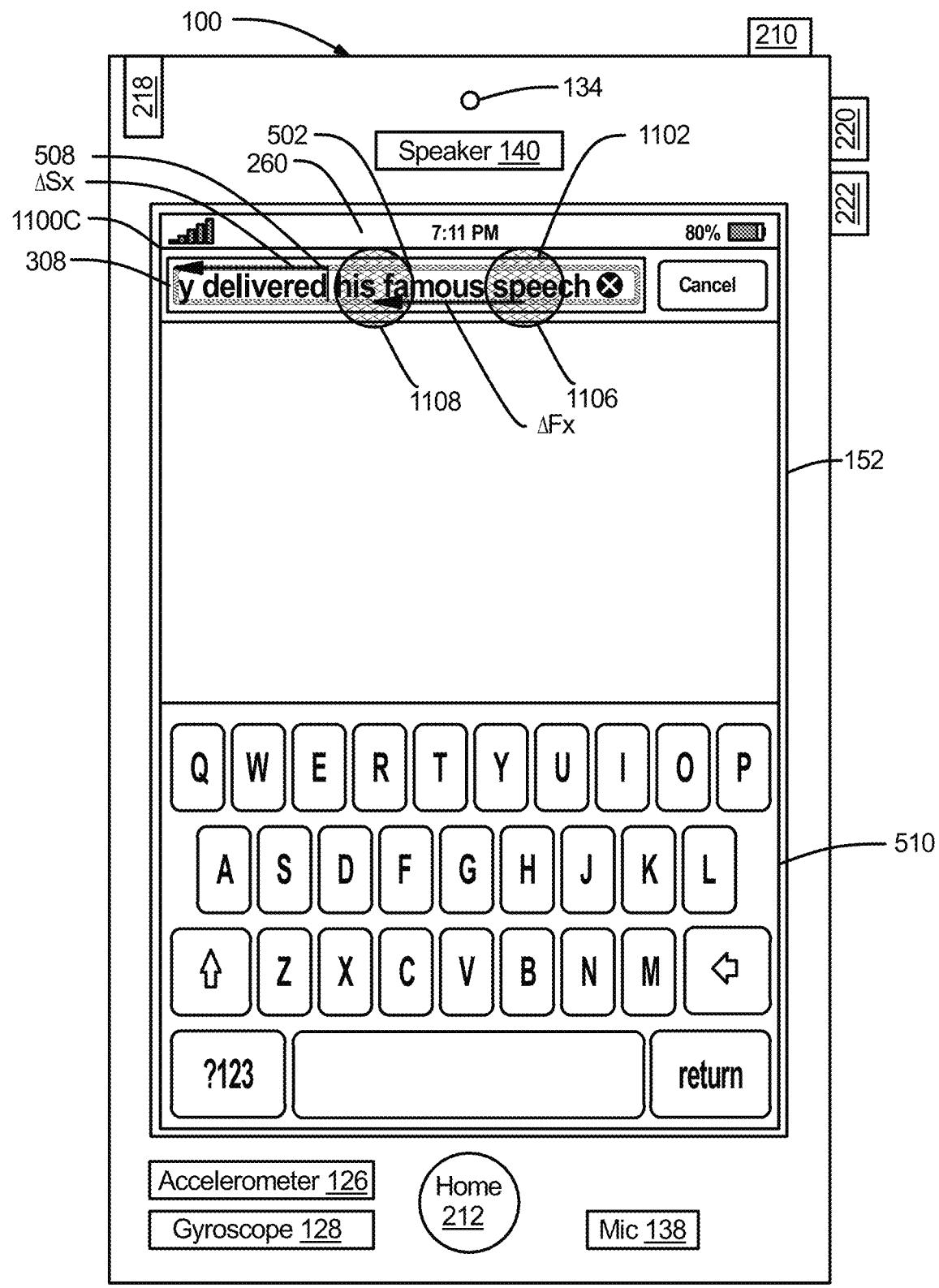
Figure 11D:
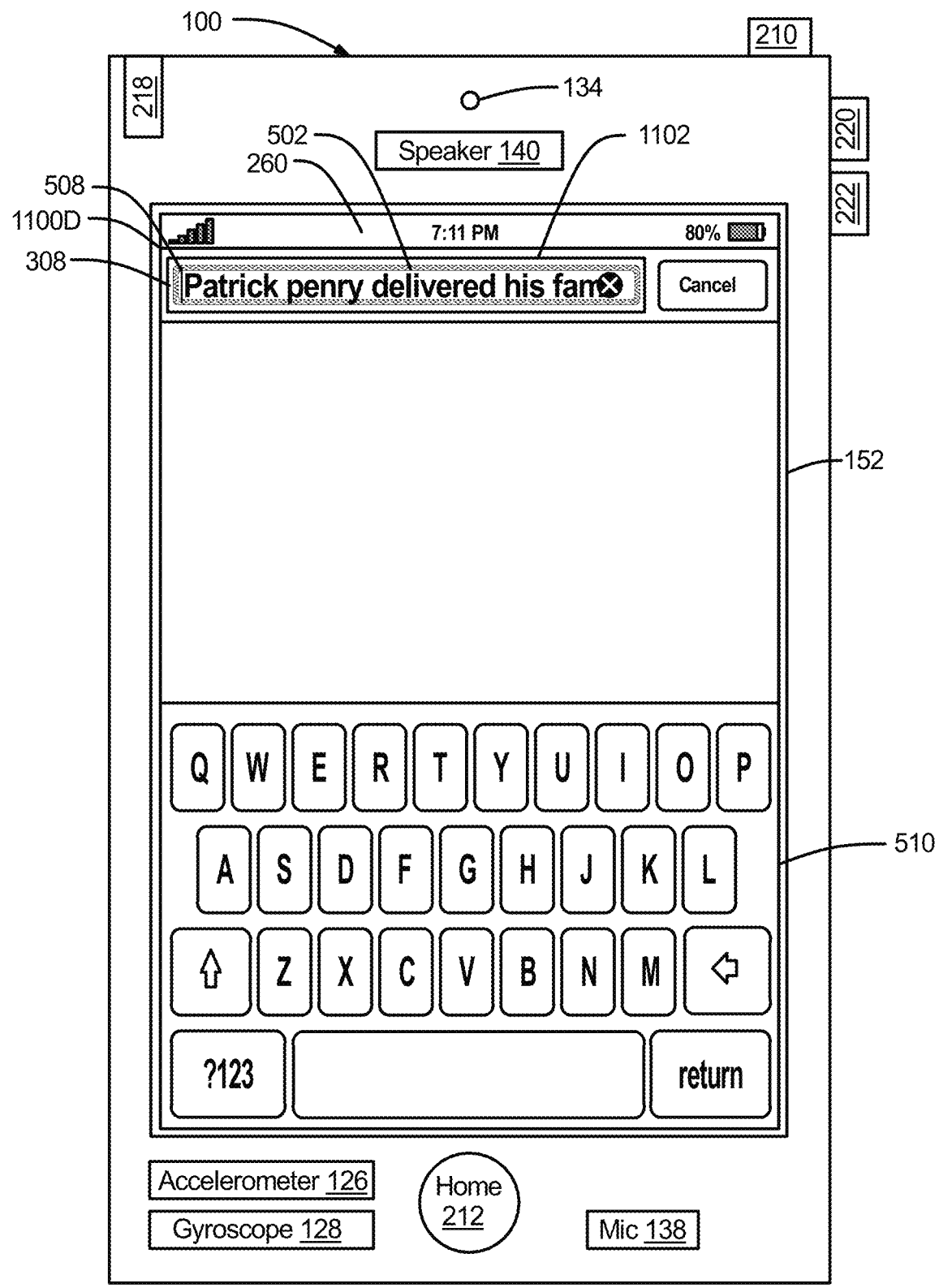

FIGS. 11A-11H illustrate positioning a cursor (a selection of zero length) within editable content on a handheld mobile computing device with a touch-sensitive display when cursor 508 reaches the first or last displayed character near the left or right edge of the displayed text and the text content scrolls. The device displays UI 1100A (FIG. 11A) with editable content 502 in text box 1102 with cursor (a selection of zero length) 508 positioned at the rightmost end of the content and soft keyboard 510 displayed below. A user may perform long-press finger gesture 1104 on the content. In response, the device displays UI 1100B (FIG. 11B) with SPC icon 308 at a first position and cursor 508 at a first position. In one example, cursor 508 is displayed at the position of long pressure gesture 1102. A user may perform left-slide finger gesture 1106 to 1108 on SPC icon 308 as illustrated in FIG. 11C.

Figure 11E:
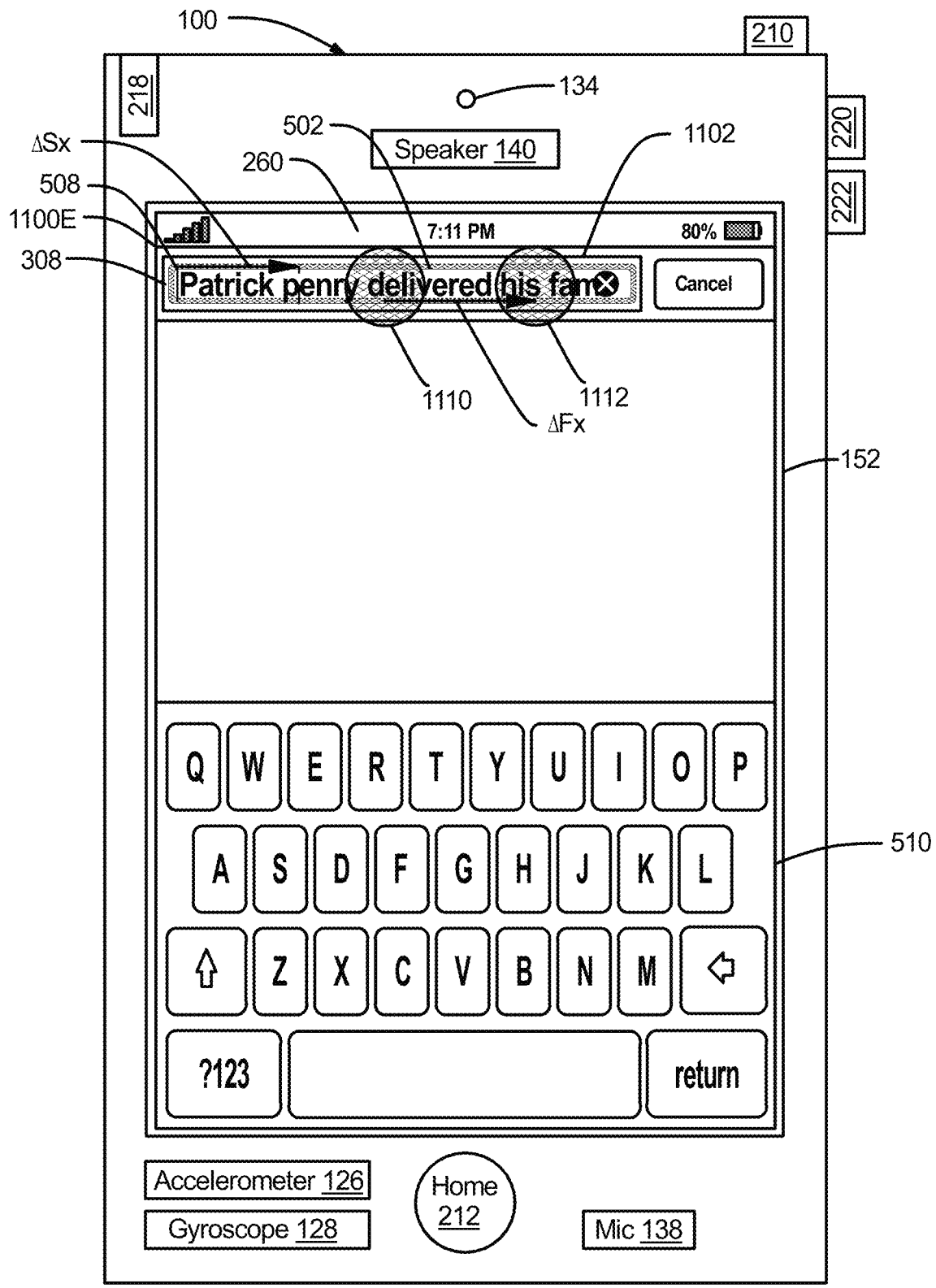
Figure 11F:
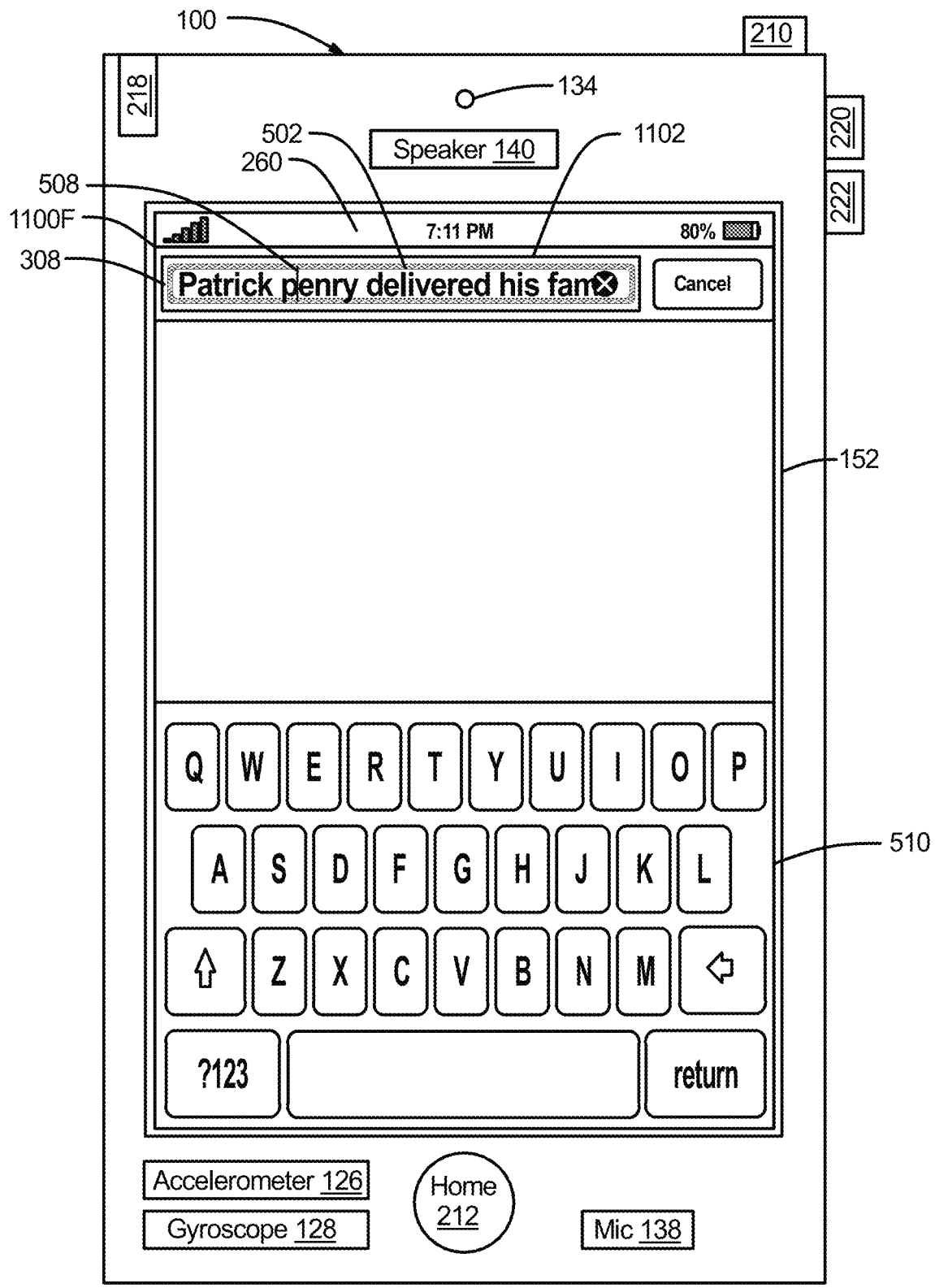
Figure 11G:
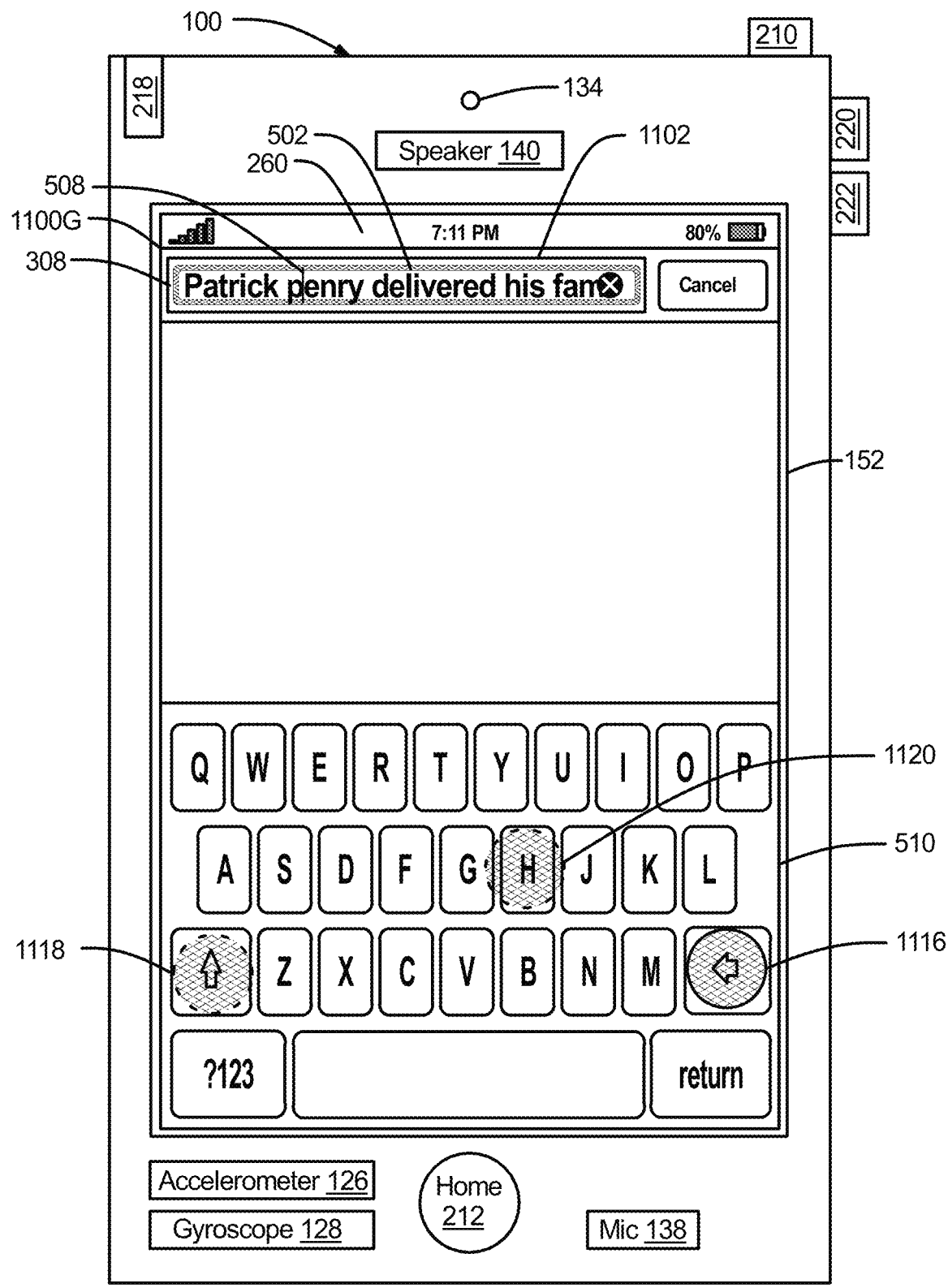
Figure 11H:
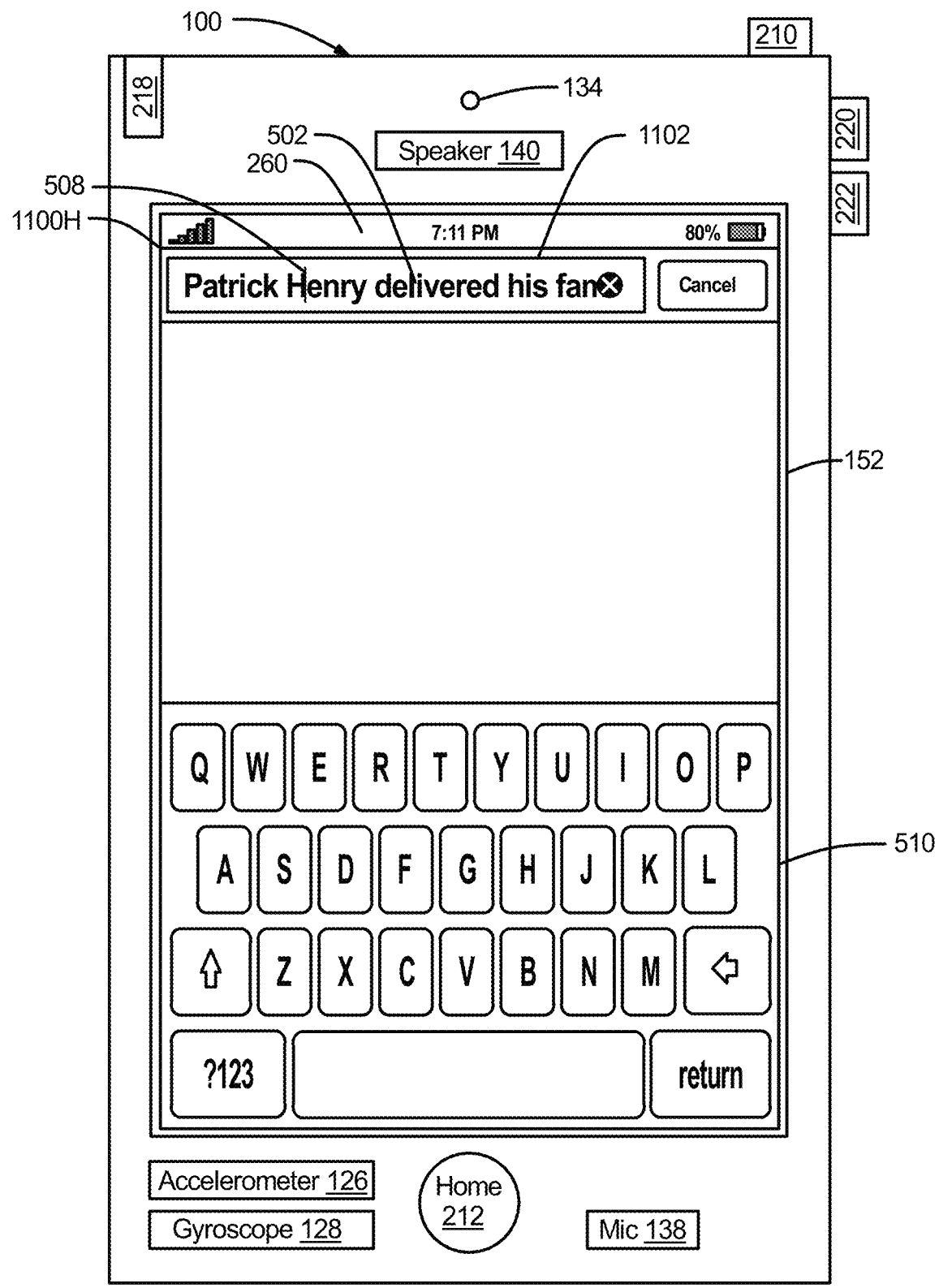

In response to detecting $\Delta F_x$ (a change in the horizontal position of an uninterrupted finger contact on the SPC icon), the device changes the horizontal position of cursor 508 on the display from a first position to a second position such that $\Delta Sx$ (the change in the horizontal position of cursor 508 is proportional to the change in the horizontal position of the finger contact on SPC icon 308. When cursor 508 reaches the first displayed character near the left boundary of the displayed text, the content scrolls to the right, either until the user moves the cursor off the first displayed character to stop the scrolling, or until the first character in the line of text is visible, and the device displays UI 1100D (FIG. 11D) with cursor positioned at a first position. A user may then perform right-slide finger gesture 1110 to 1112 on SPC icon 308 as illustrated in FIG. 11E to move cursor 508 from a first position to a second position just to the right of the letter "p" in the word "penry" as illustrated in UI 1100F (FIG. 11F). A user may then correct the typo error "penry" to "Henry" by tapping backspace key 1116, shift key 1118, and "H" key 1120 as illustrated in FIG. 11G. Once the correction is completed, the device displays UI 1100H (FIG. 11H). In this example embodiment, once the text entry is initiated we see that SPC icon 308 is no longer displayed as illustrated in FIG. 11H. In this example, the selection is displayed, but SPC icon 308 is not displayed after the initiation of an operation with respect to a selection. In this example, SPC icon 308 is not displayed in FIG. 11H following the initiation of an edit operation with respect to the selection in FIG. 11G. In this example, cursor 508 is positioned in a text content area that is one line high, whereas in the examples illustrated in FIG. 5, FIG. 6, FIG. 7, and FIG. 8, cursor 508 is positioned in a text content area that is multiple lines high.

FIGS. 12A-12G illustrate positioning a cursor (a selection of zero length) and selecting text within editable content on a handheld mobile computing device with a touch-sensitive display when the when SPC icon 308 reaches the last line of displayed text and the text content scrolls.

Figure 12A:
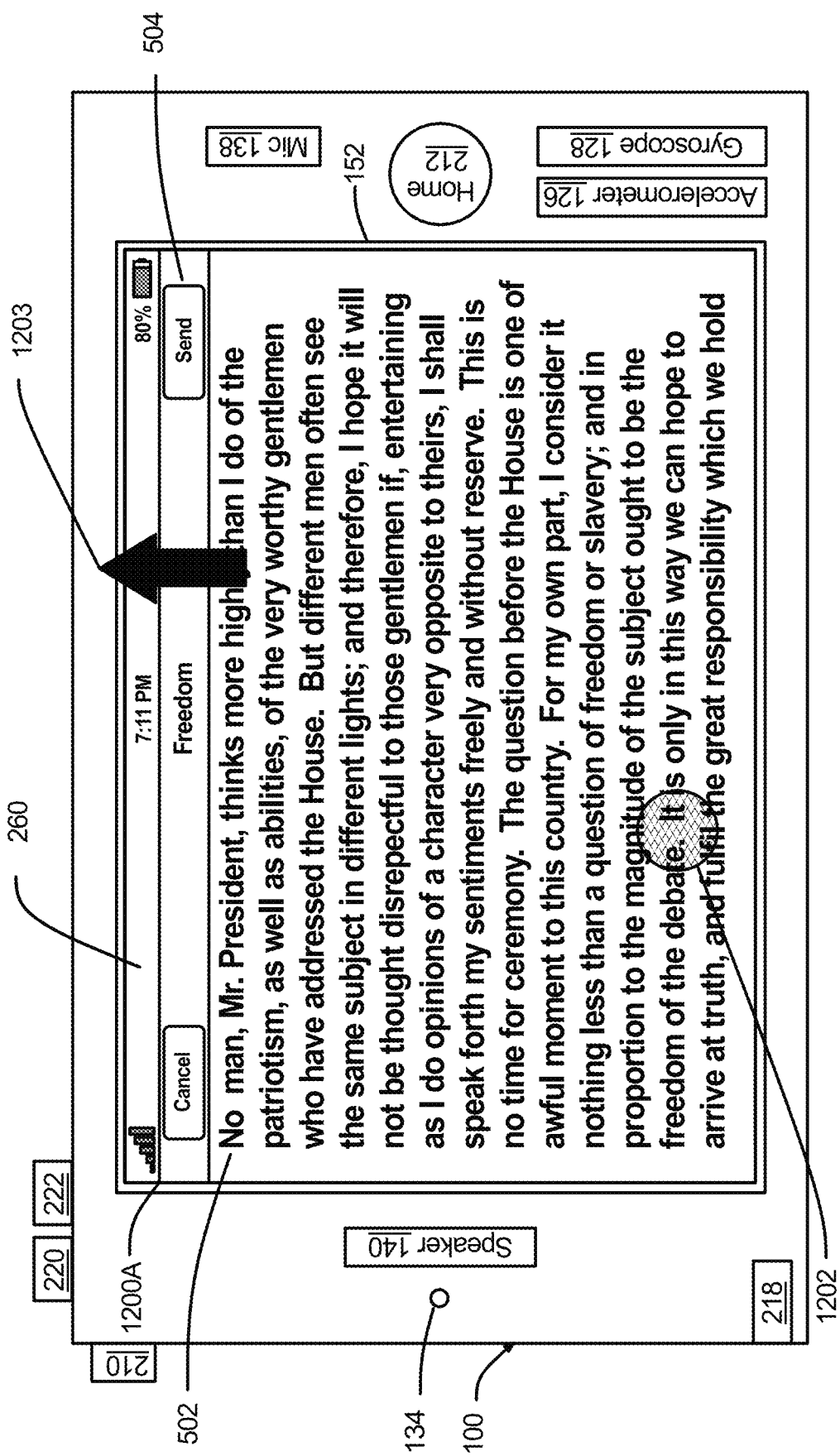
FIGS. 12A-12G illustrate positioning a cursor (a selection of zero length) and selecting text within editable content on a handheld mobile computing device with a touch-sensitive display when SPC icon 308 reaches the last line of displayed text and the text content scrolls.
Figure 12B:
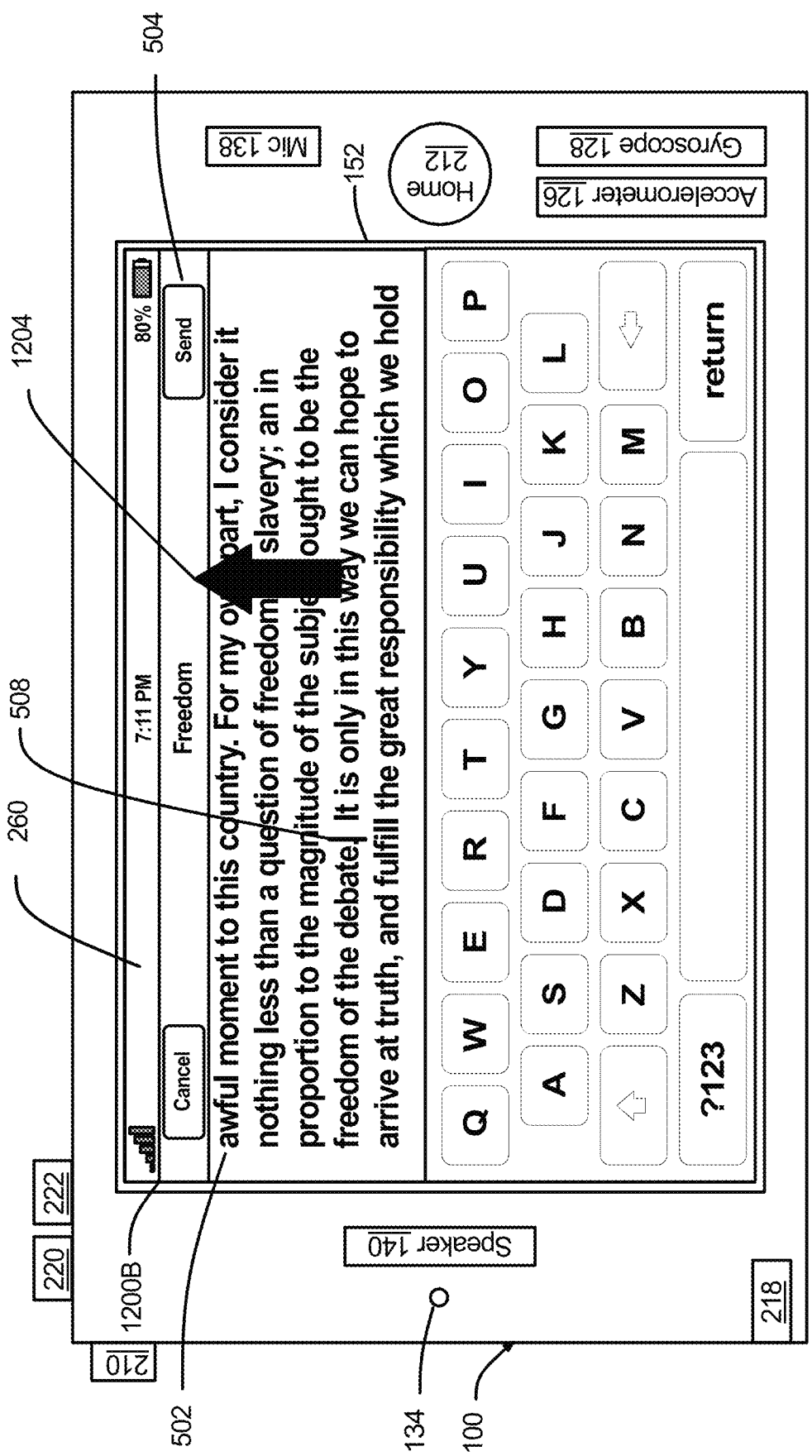
Figure 12C:
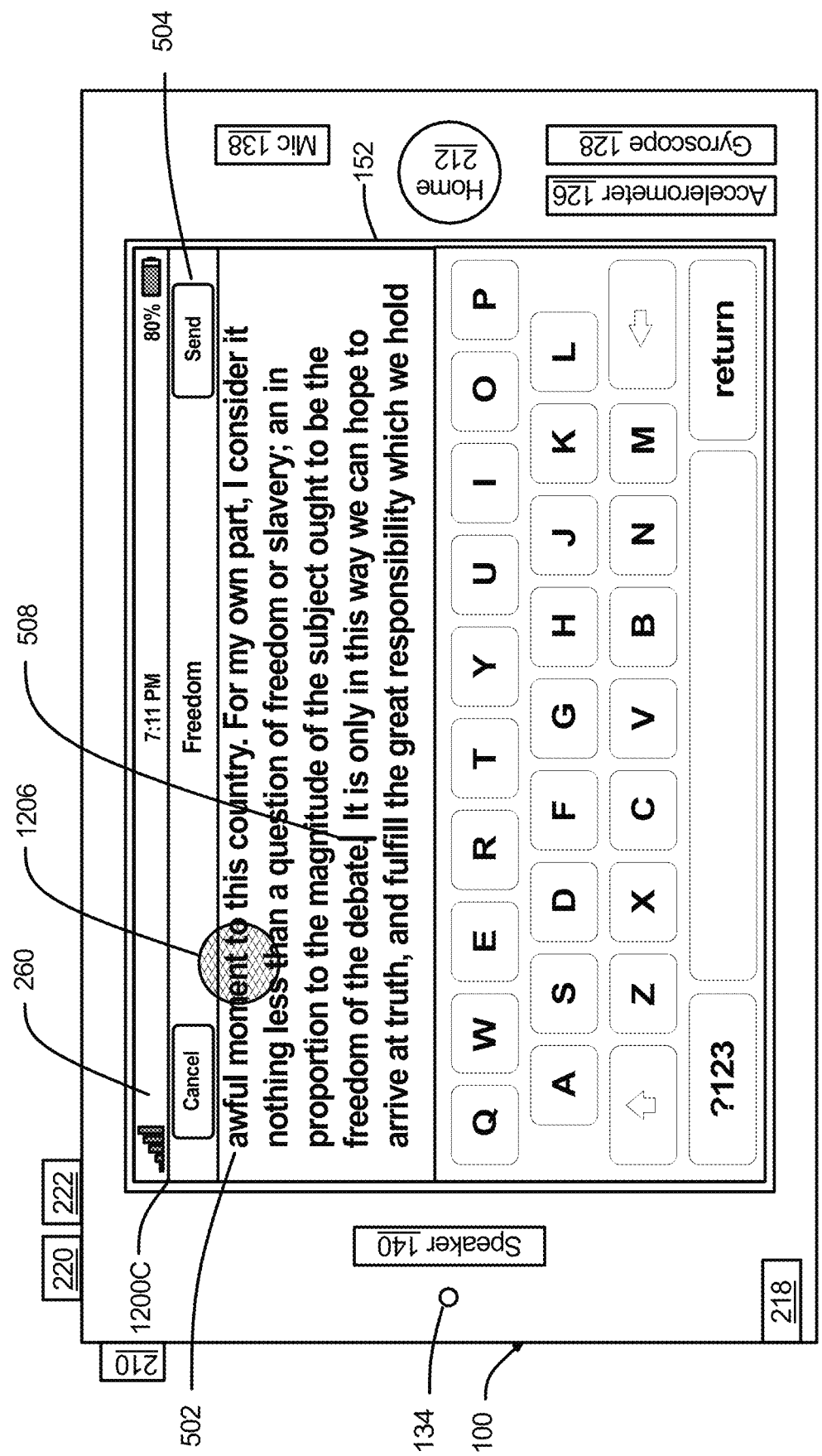
Figure 12D:
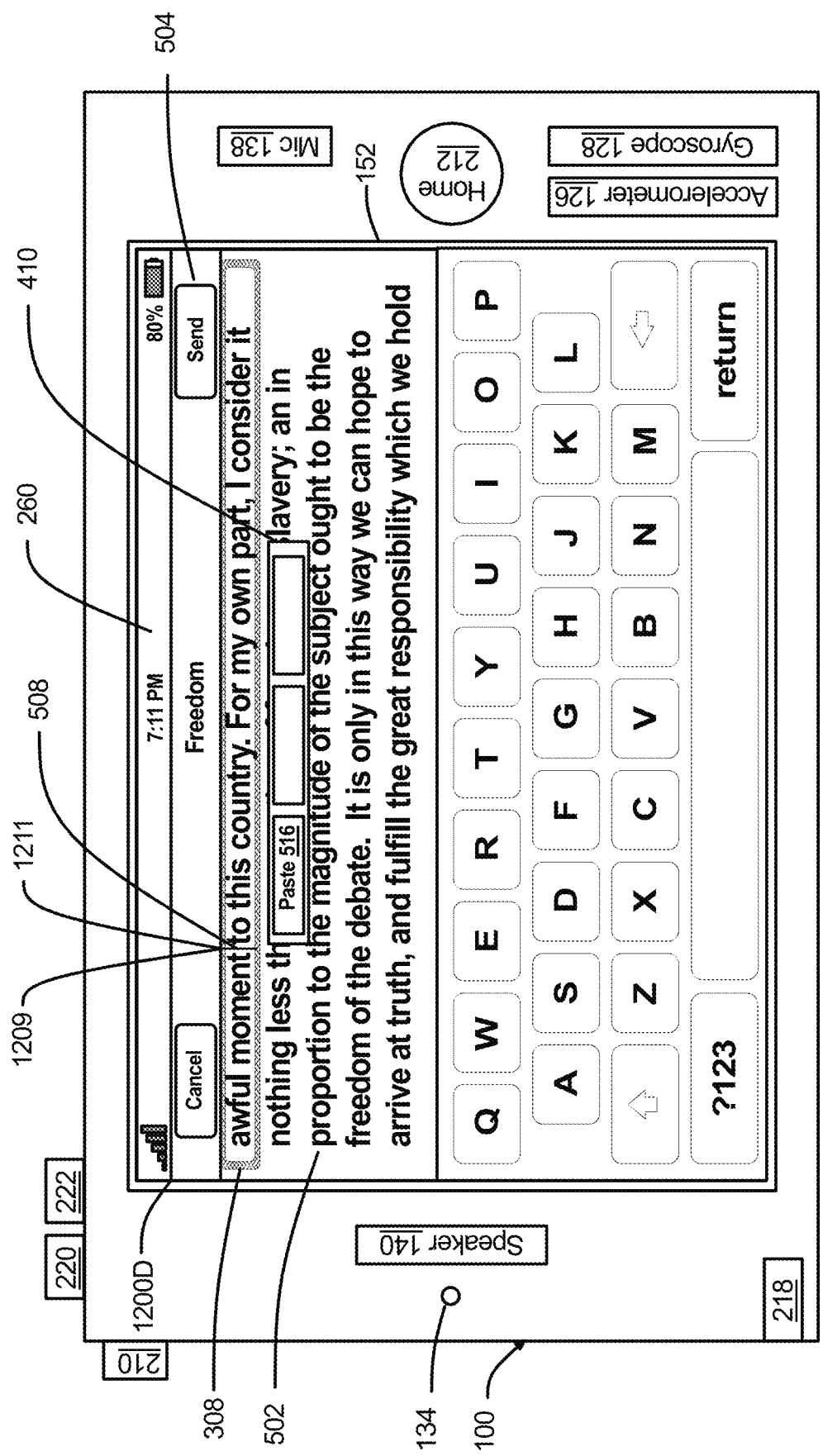
Figure 12E:
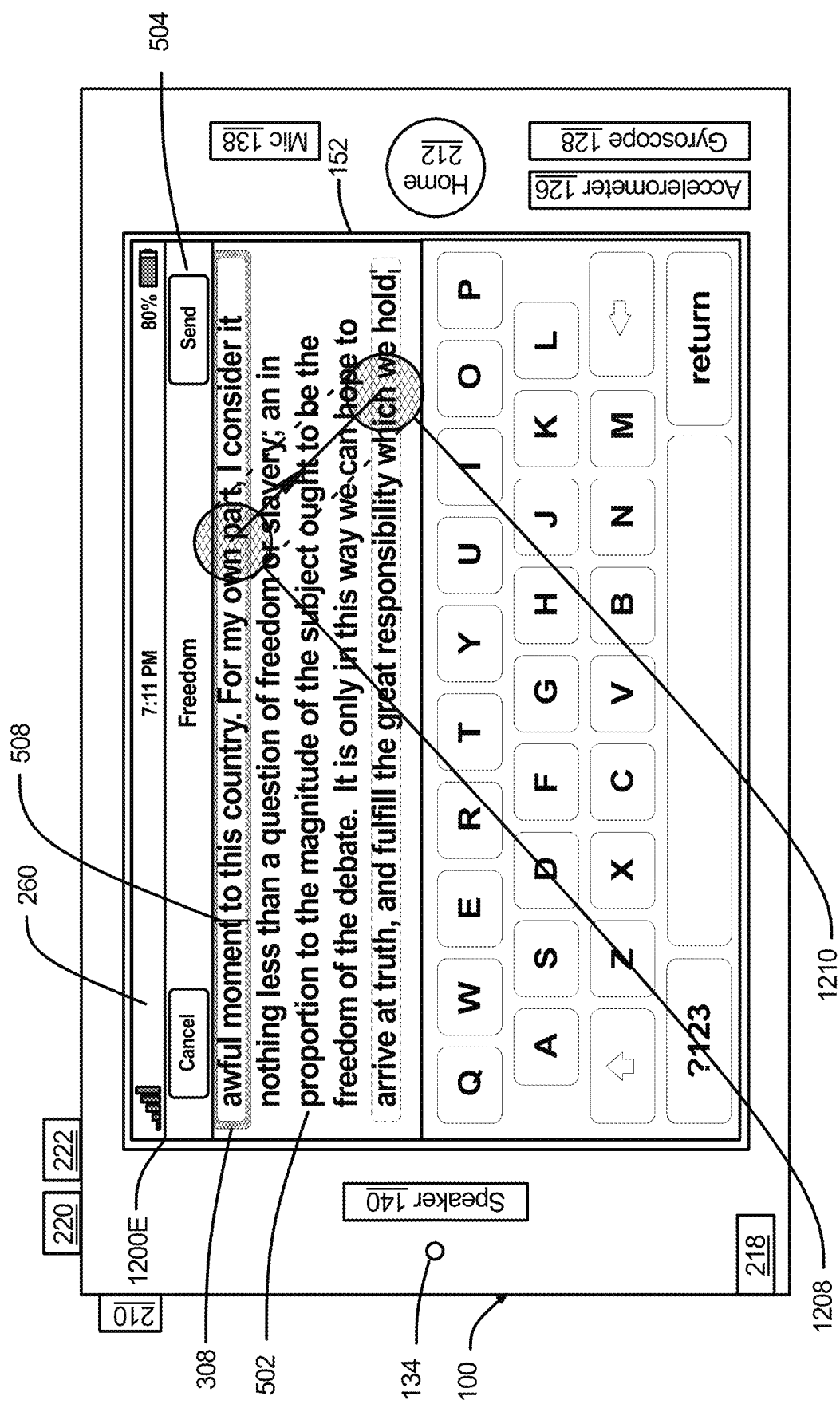
Figure 12F:
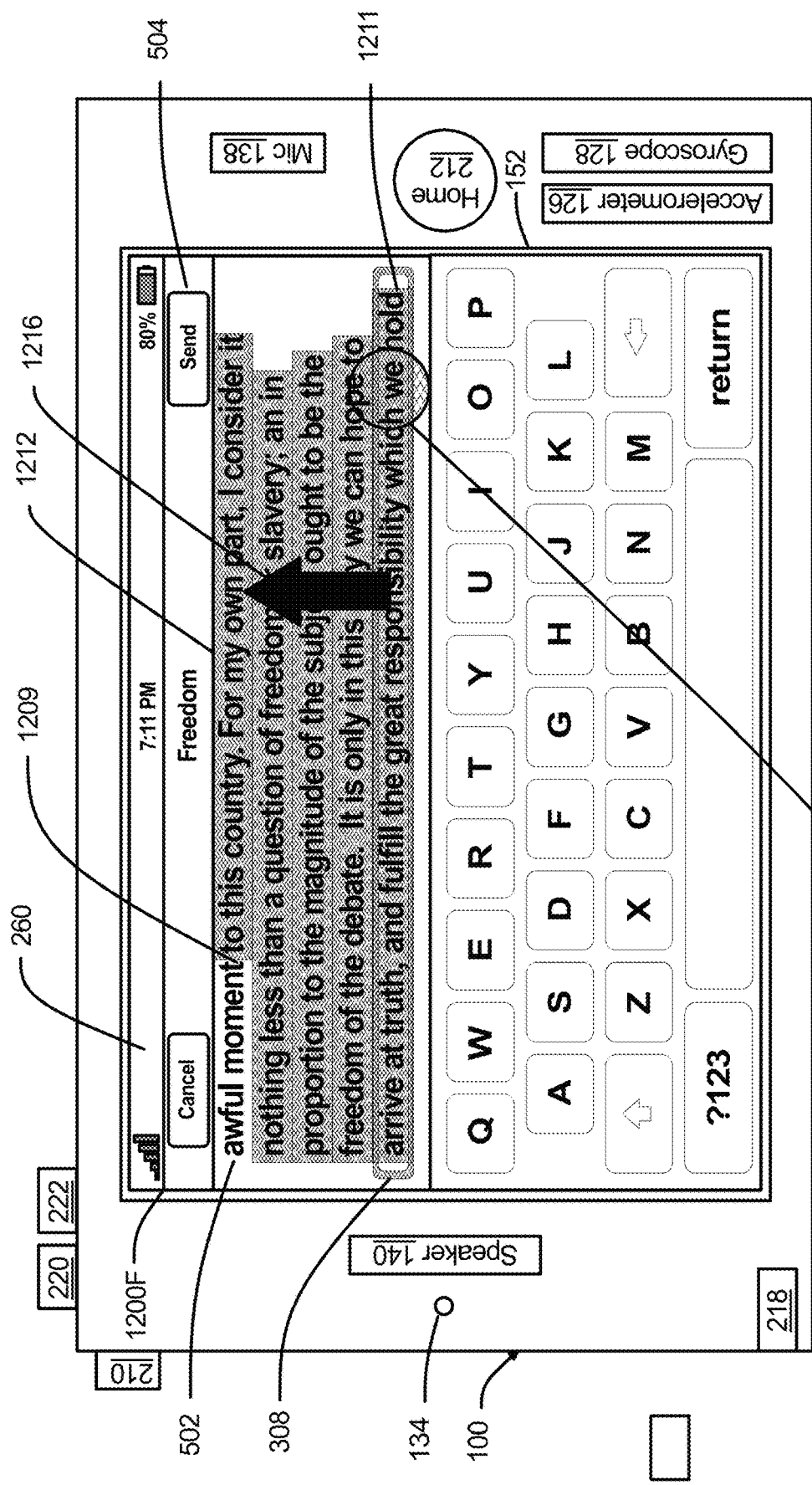
Figure 12G:
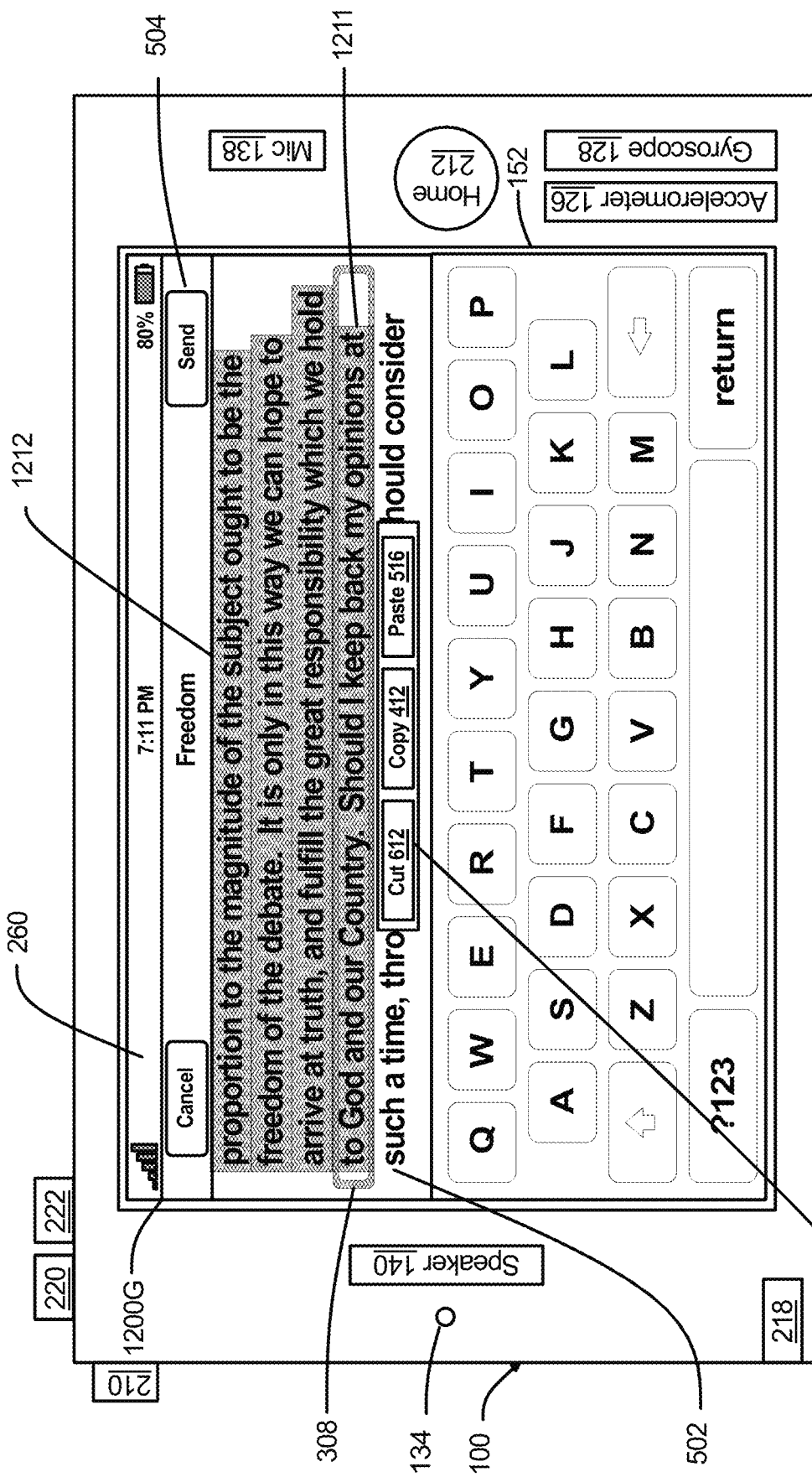

The device displays editable content 502 in UI 1200A (FIG. 12A). A user may perform tap finger gesture 1202 on editable content 502 as illustrated in FIG. 12A. In response, the device displays UI 1200B (FIG. 5B) with cursor 508 at the location of tap finger gesture 1202. The UI 1200B displays soft keyboard 510 with the content scrolled up, as indicated by scroll-up direction-arrow 1204, so that cursor 508 is not hidden by keyboard 510. A user may perform long-press finger gesture 1206 on the editable content as illustrated in UI 1200C (FIG. 12C). In response, the device displays UI 1200D (FIG. 12D) with selection positioning & control (SPC) icon 308 at a first position and cursor 508 (a selection of zero length) at a first position with selection start point 1209 and selection end point 1211 initially at the same position. (In this example, the first position for cursor 508 is the location of long-press finger gesture 1206. In other examples, cursor 508 may be displayed offset to the left or to the right of the location of the finger gesture.) A user may perform tap-and-slide finger gesture 1208 to 1210 on SPC icon 308 as illustrated in FIG. 12E to select text from a first position to a second position as illustrated in FIG. 12F. When SPC icon 308 is moved to the last line of displayed text, the device begins to scroll up the content as illustrated by scroll-up direction-arrow 1216 in FIG. 12F. The device continues to scroll up the content, either until the user moves SPC icon 308 to a position not on the last line of text to stop the scrolling as shown in FIG. 12G, or until the page has scrolled to the end of the content.

In the examples illustrated in FIGS. 3-11, most of the example horizontal slide gestures are to the right and most of the example vertical slide gestures are down the page. In case of slide gestures to the right, the selection start point is at the left end of the selection and the selection end point is at the right end of the selection. The examples of this disclosure also include horizontal slide gestures to the left and vertical slide gestures up the page. In case of slide gestures to the left, the selection start point would be at the right end of the selection and the selection end point would be at the left end of the selection (In this example, and in the examples illustrated in FIGS. 3-11 above, the finger gesture for launching SPC icon 308 may be a long-press finger gesture. In other embodiments, a different gesture or other methods may be used to display SPC icon 308.)

FIG. 13A illustrates an exemplary user interface for user selectable settings. The device displays UI 1300A (FIG. 13A). A user may perform finger gesture on TouchTrack switch 1304 to enable TouchTrack for positioning the cursor and selecting text. When TouchTrack is set to off, the default method of positioning the cursor and selecting text is active in lieu of the method of this disclosure—named TouchTrack for purposes of illustration. A user may perform a slide finger gesture on tracking speed switch 1306 to set the tracking speed to a particular number as illustrated in FIG. 13A. In this example, the tracking speed may be set to any number from #1 to #10. In this example, the tracking speed has been set to #6. The tracking speed setting determines the functional dependence of Kx on the x-component of the slide gesture speed on the SPC icon, where the change in position of the selection in the x-direction is proportional to the change in position of the finger in the x-direction ($\Delta Sx = K_x \Delta F_x$) as discussed in reference to FIGS. 3A-3J, FIGS. 4A-4H, FIGS. 5A-5F, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G. In response, the device uses the functional dependence of Kx for that particular tracking speed setting number. An example functional dependence Kx for 10 different tracking speed settings is illustrated in FIG. 13B. In the example shown, with a tracking speed setting of #6, the value of Kx can range from about 0.6 to about 6 depending upon the x-component of the instantaneous speed of the slide gesture at any position along the slide gesture path. Accordingly, the user can roughly position the selection start point or selection end point with a high speed slide gesture on SPC icon 308; the user can then precisely position the selection start point or selection end point with a low speed slide gesture on SPC icon 308.

FIG. 13B illustrates an example functional dependence of Kx on the x-component of the slide gesture speed on the SPC icon for a given "tracking speed" setting ranging from a tracking speed of setting of 1 to tracking speed setting of 10 as described in reference to FIG. 13A.

Figure 14A:
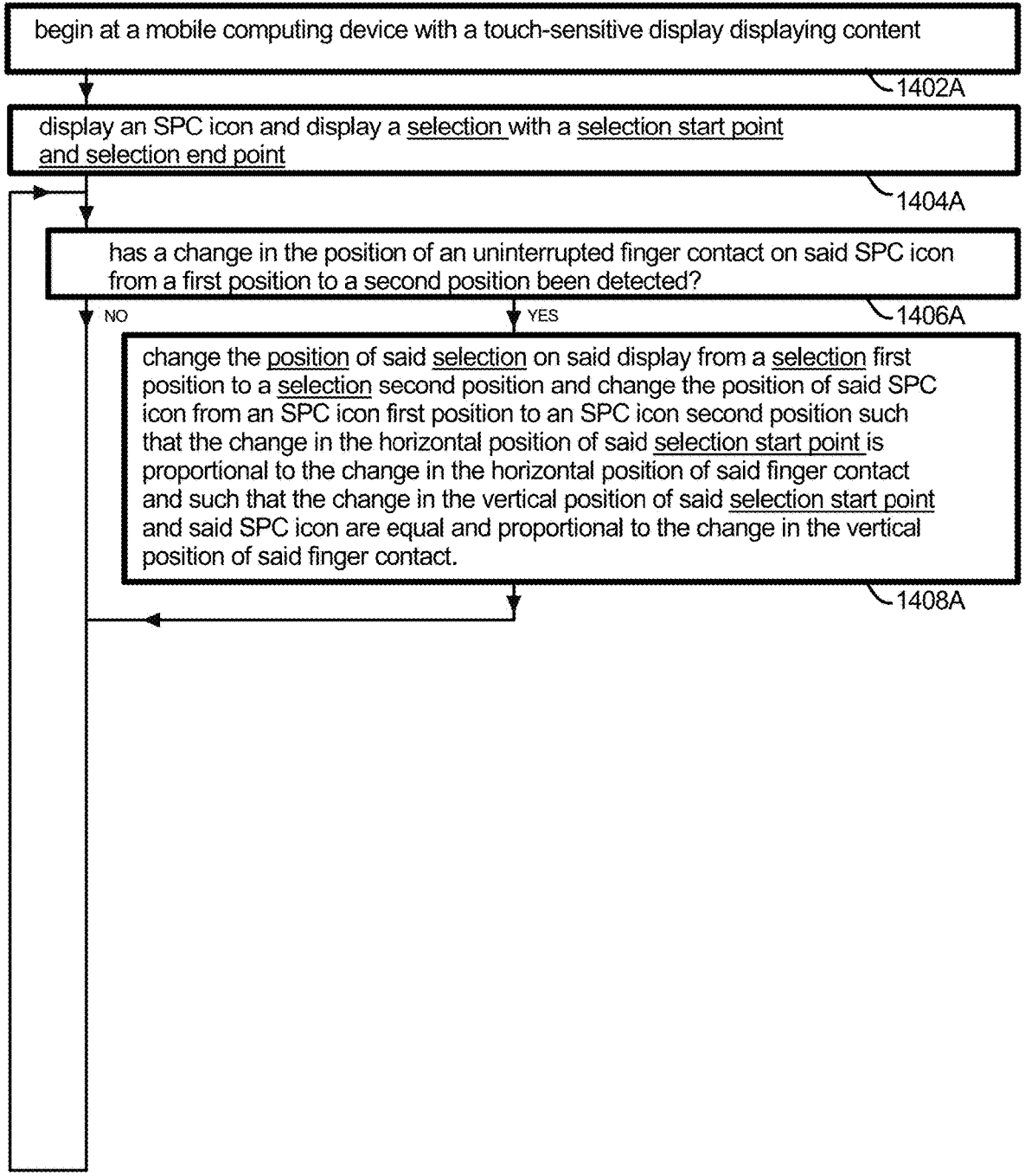
FIGS. 14A-14C are flow diagrams illustrating a process for positioning a selection on a handheld mobile computing device with a touch-sensitive display in accordance with some embodiments.
Figure 14B:
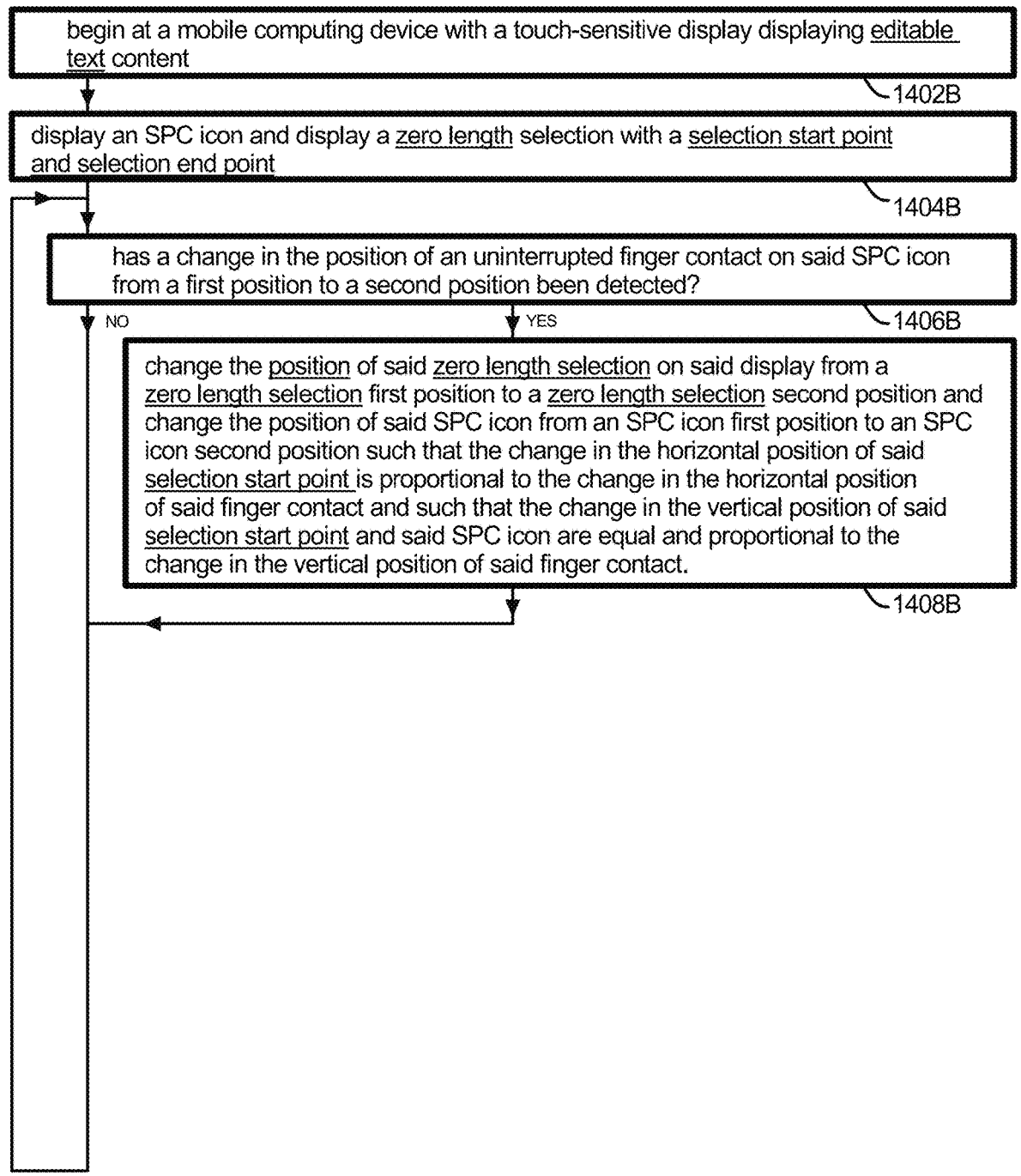
Figure 14C:
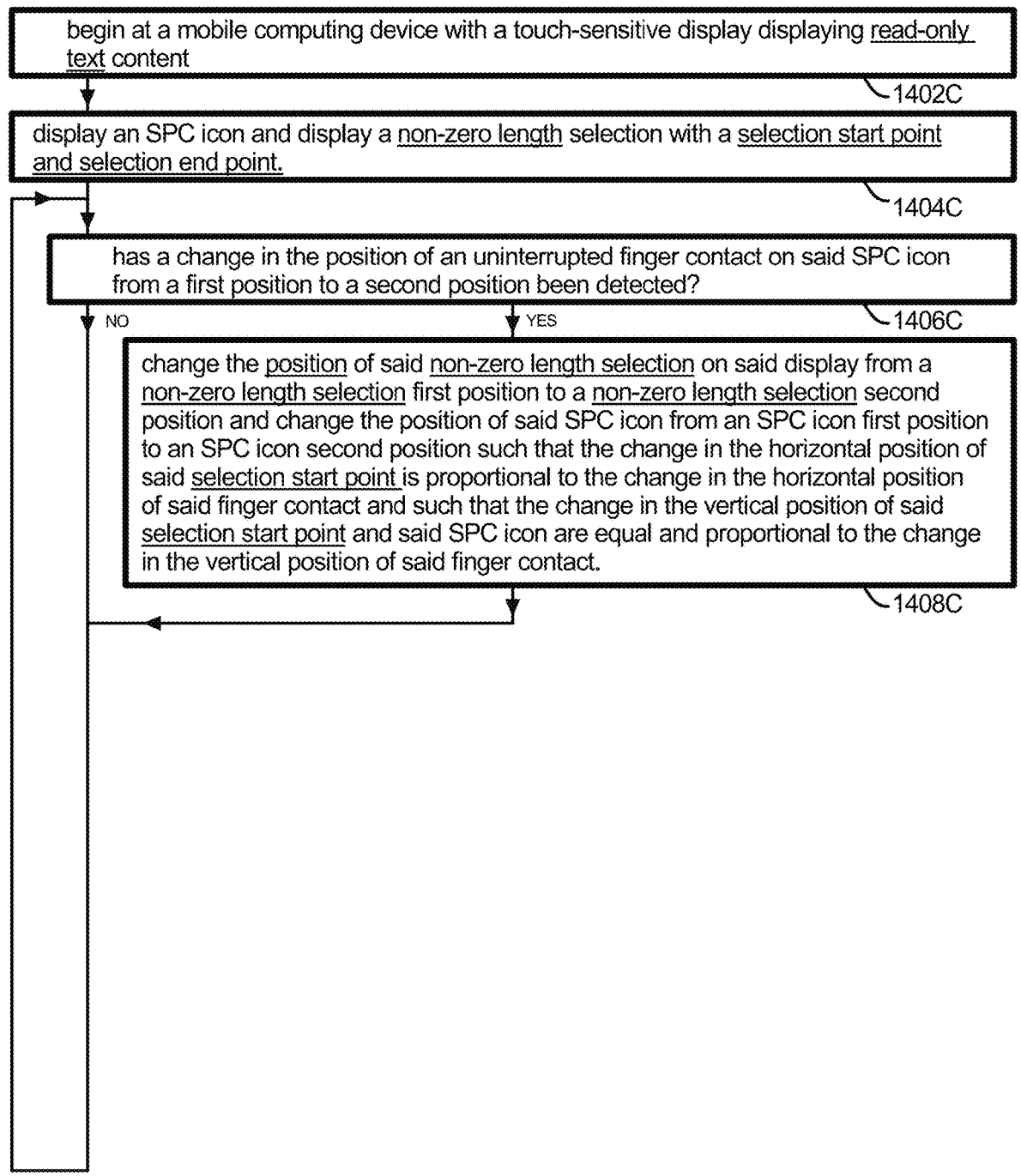

FIGS. 14A-14C are flow diagrams illustrating a process for positioning a selection on a handheld mobile computing device with a touch-sensitive display in accordance with some embodiments. FIGS. 3A-3J, FIGS. 4A-4H, FIGS. 5A-5F, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, and FIG. 13A-13B, illustrate exemplary user interfaces for use in implementing the methods presented in the flow diagrams shown in FIGS. 14A-14C

Figure 15A:
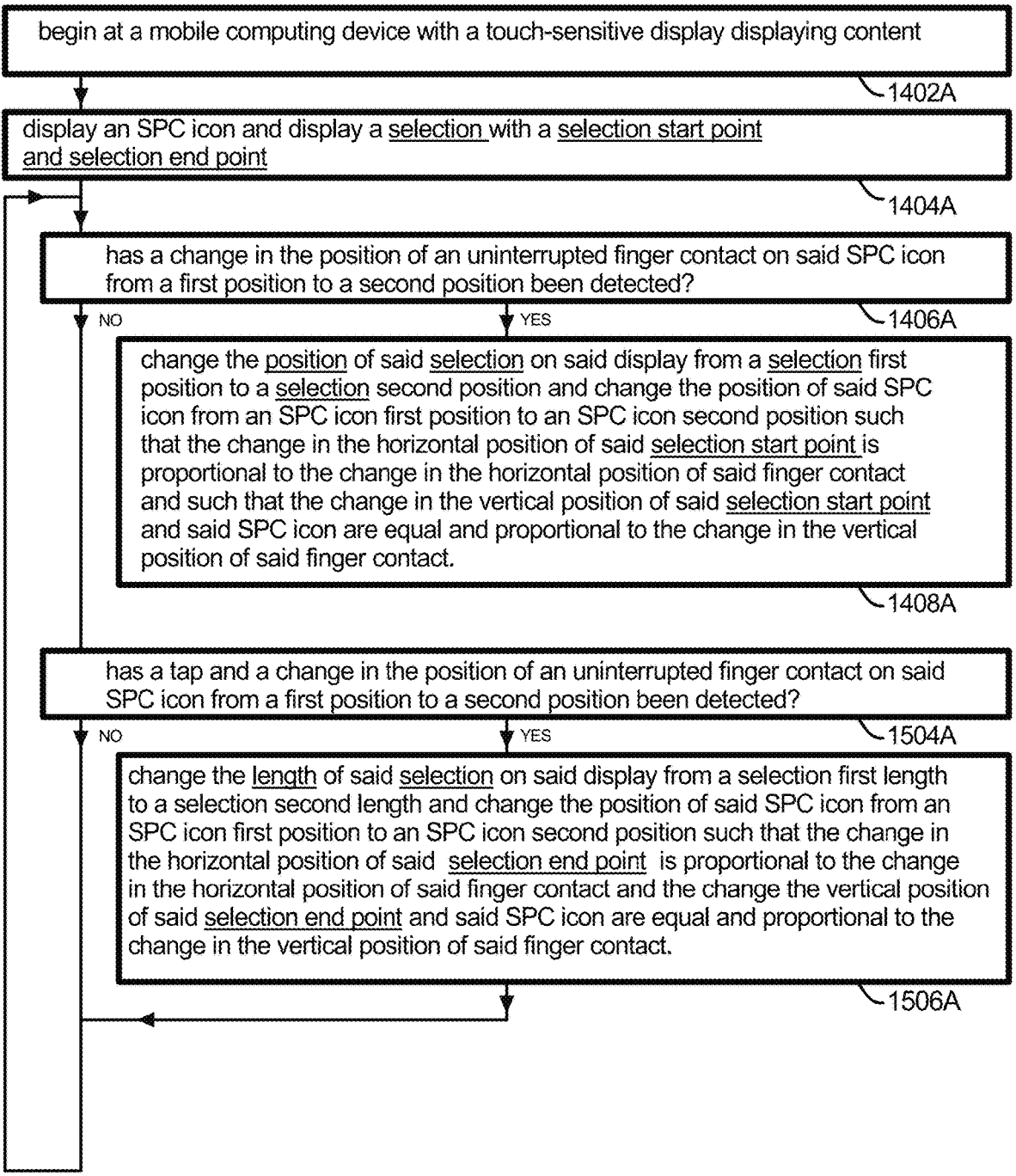
FIGS. 15A-15C are flow diagrams illustrating a process for positioning a selection and selecting text on a handheld mobile computing device with a touch-sensitive display in accordance with some embodiments.
Figure 15B:
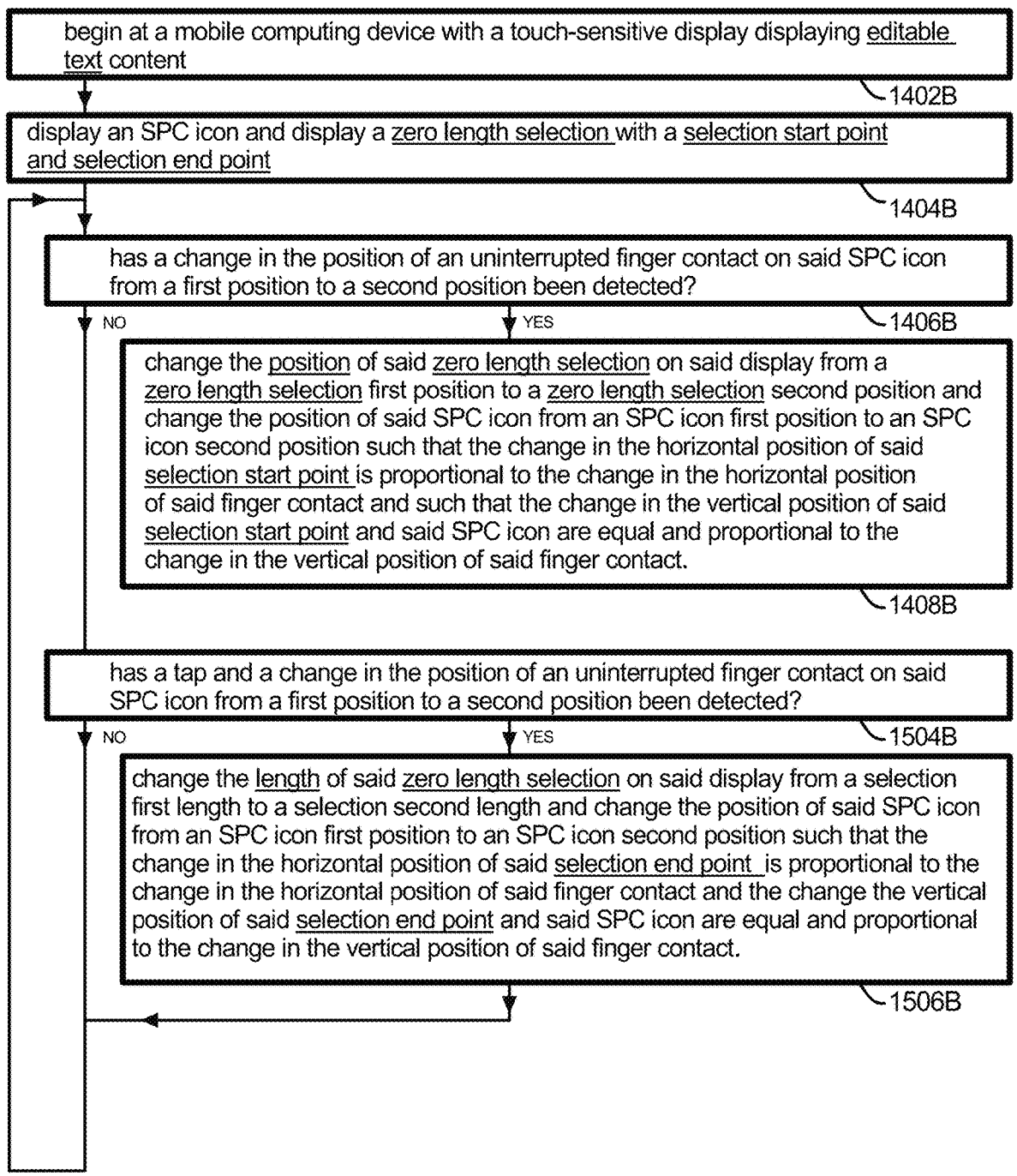
Figure 15C:
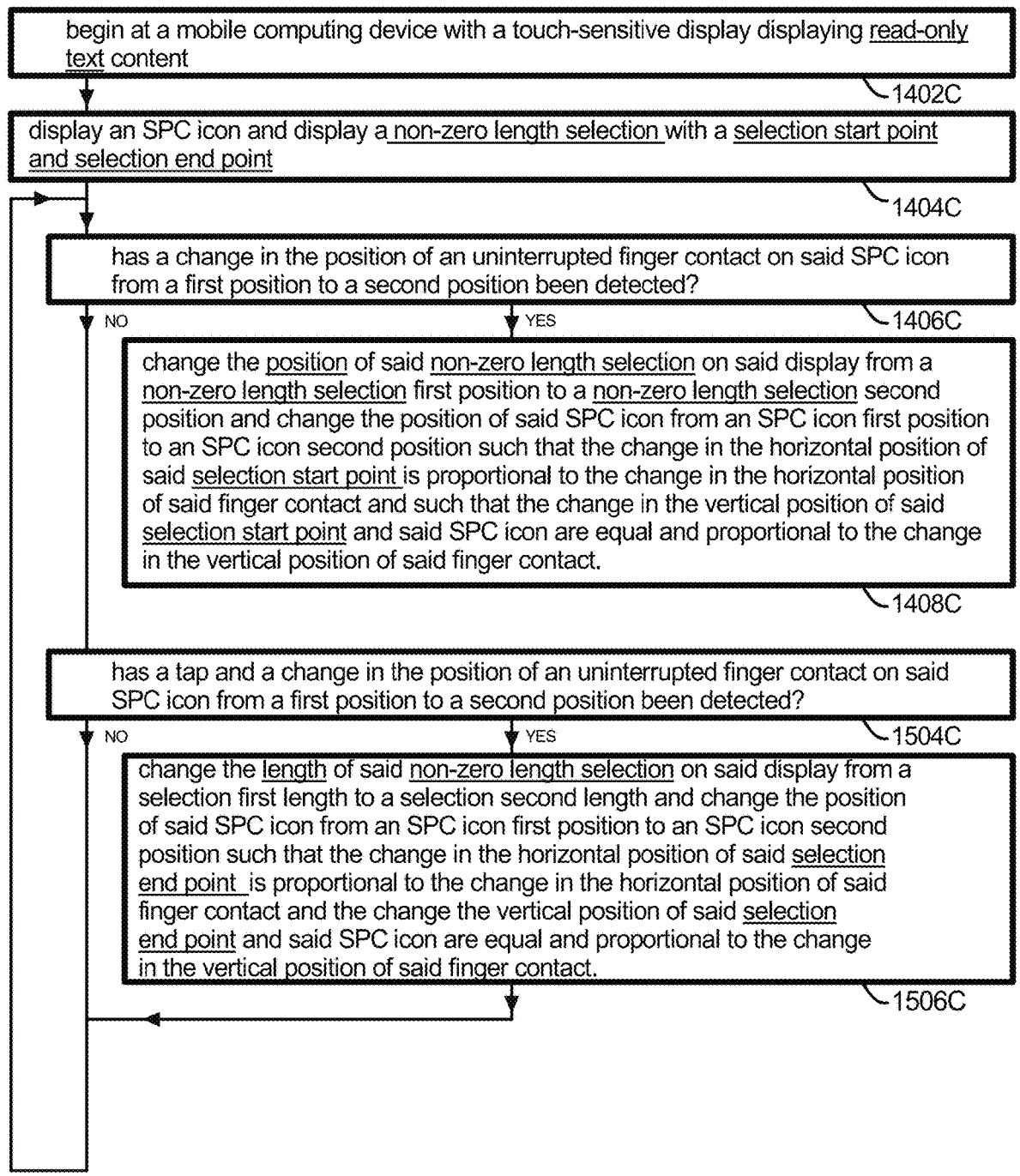

FIGS. 15A-15C are flow diagrams illustrating a process for positioning a selection and selecting content on a handheld mobile computing device with a touch-sensitive display in accordance with some embodiments. FIGS. 3A-3J, FIGS. 4A-4H, FIGS. 5A-5F, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, and FIG. 13A-13B, illustrate exemplary user interfaces for use in implementing the methods presented in the flow diagram shown in FIGS. 15A-15C

Figure 16A:
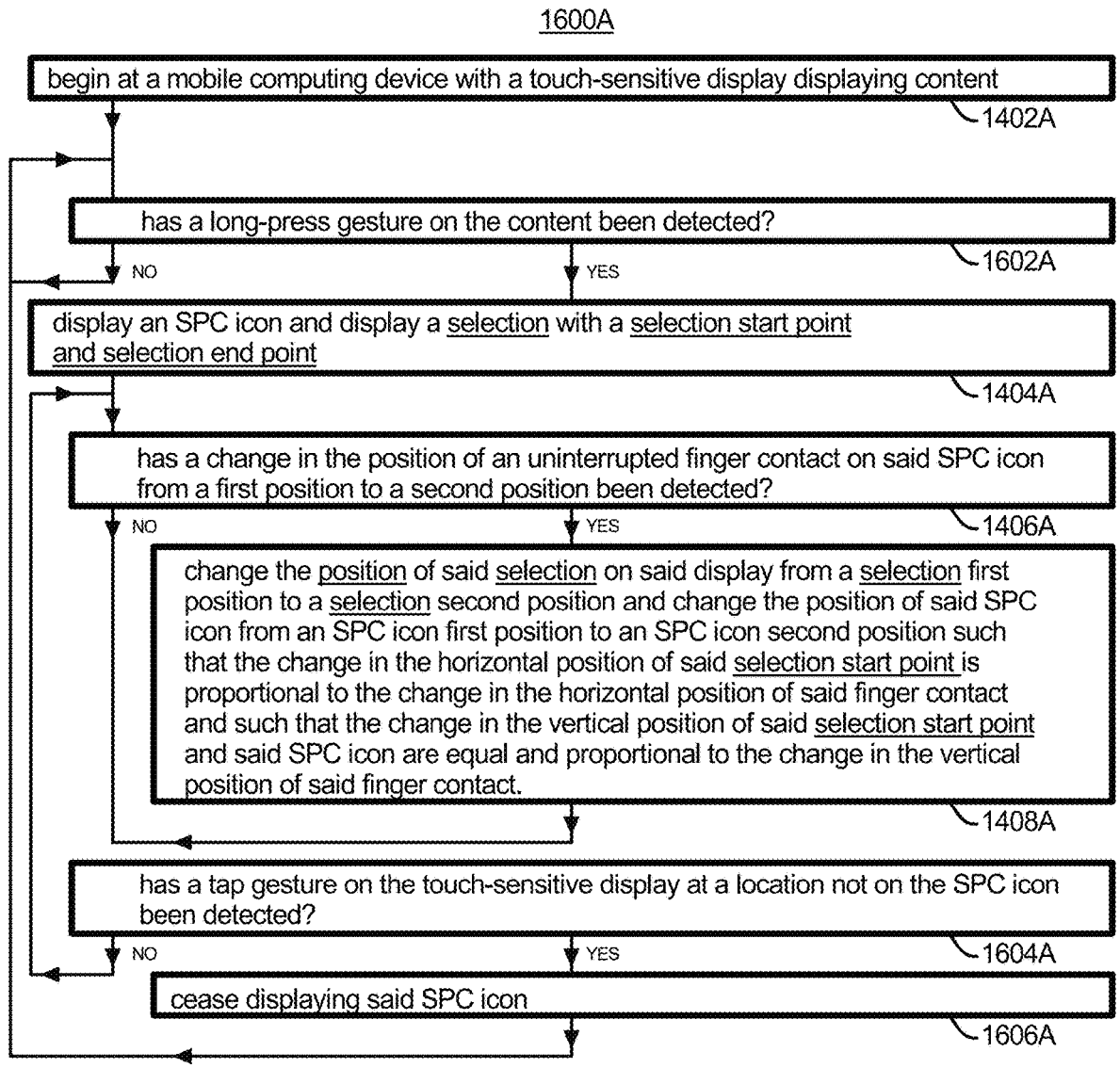
FIGS. 16A-16C are flow diagrams illustrating a process for using a finger gesture to display a selection positioning & control icon for use in positioning a selection on a handheld mobile computing device with a touch-sensitive display in accordance with some embodiments.
Figure 16B:
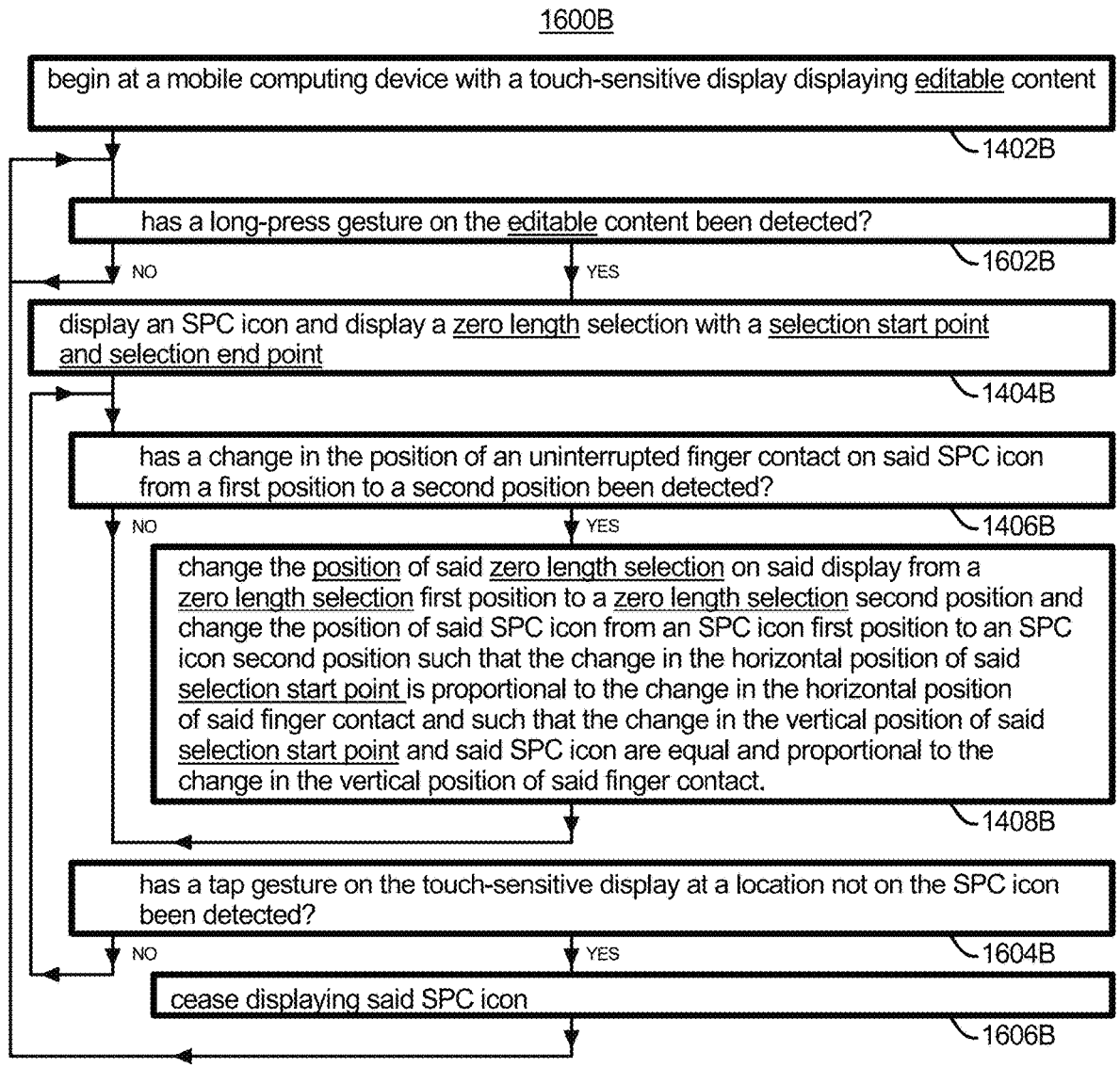
Figure 16C:
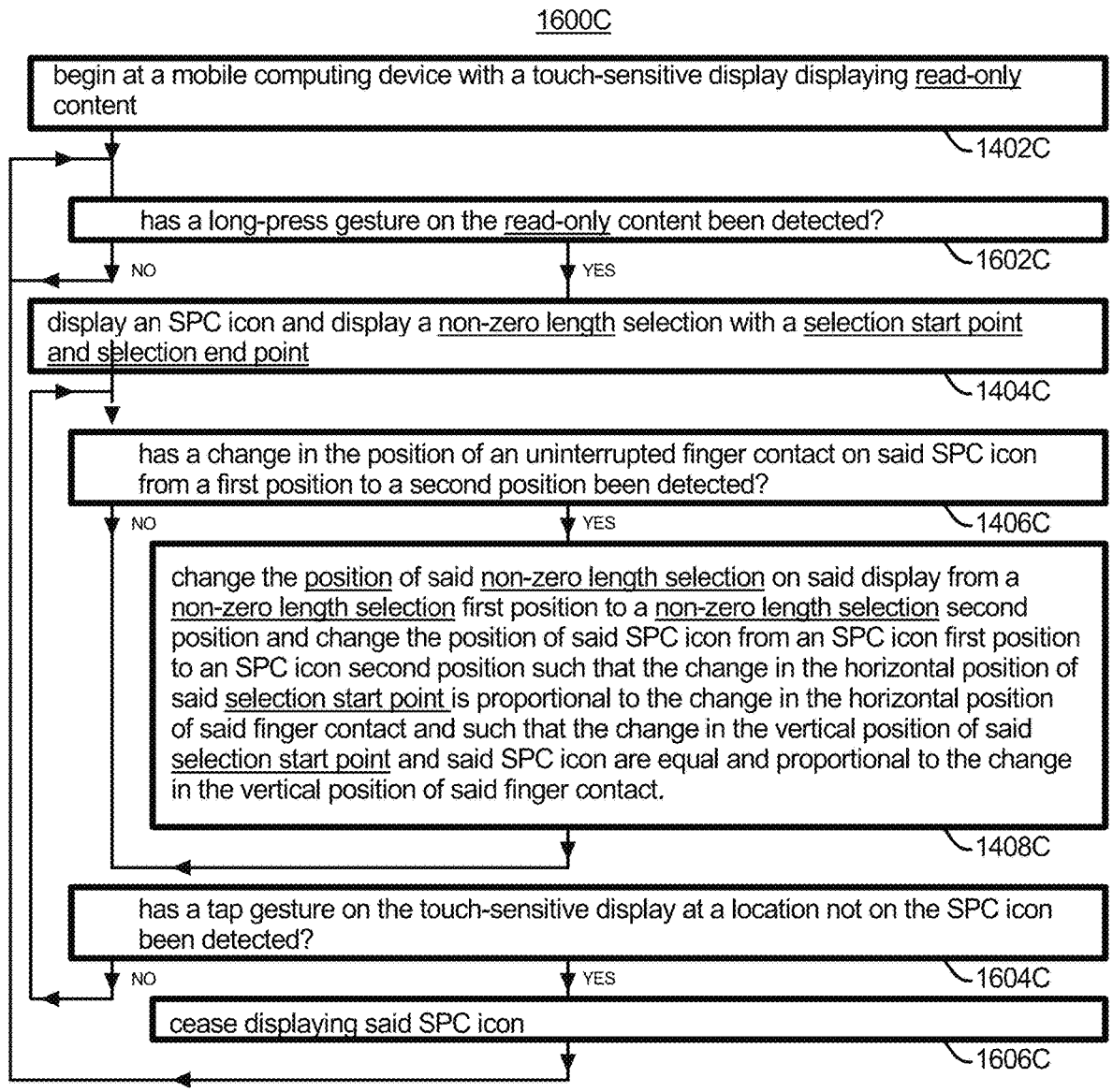

FIGS. 16A-16C are flow diagrams illustrating a process for using a finger gesture to display a selection positioning & control icon for use in positioning a selection on a handheld mobile computing device with a touch-sensitive display in accordance with some embodiments. FIGS. 3A-3J, FIGS. 4A-4H, FIGS. 5A-5F, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, and FIG. 13A-13B, illustrate exemplary user interfaces for use in implementing the methods presented in the flow diagram shown in FIGS. 16A-16C.

The methods and UI may include the use of alternative gestures to those used in the examples shown in conjunction with the exemplary user interfaces in FIGS. 3A-3J, FIGS. 4A-4H, FIGS. 5A-5F, FIGS. 6A-6F, FIGS. 7A-7E, FIGS. 8A-8H, FIGS. 9A-9D, FIGS. 10A-10D, FIGS. 10E-10I, FIGS. 11A-11H, FIGS. 12A-12G, and FIG. 13A-13B, and those used in the example method flow diagrams of FIG. 14A-14C, FIG. 15A-15C, and FIG. 16A-16C.

Alternative gestures, actions, or events, or conditions for displaying the SPC icon include, but are not limited to, the following: 1) a long-press finger gesture on content on a touch-sensitive display, 2) a gesture elsewhere on the display, 3) another type of action such as shaking the device or changing the orientation of the device, 4) display the SPC icon when a particular class or type of application is launched, and 5) display the SPC icon when an application containing a text content area is launched.

Alternative locations for displaying the selection upon the detection of the finger gesture for the displaying of the SPC icon include, but are not limited to, the following: 1) In one exemplary embodiment, the selection is displayed at the location of the finger gesture for displaying the SPC icon, 2) In other exemplary embodiments the selection may be displayed at a position offset from the location of the finger gesture for displaying the SPC icon, 3) In another exemplary embodiment the selection position may remain unchanged if the location of the finger gesture for displaying the SPC icon is at the same vertical position as an existing selection of zero length.

Alternative gestures, actions, or events, or conditions for ceasing to display the SPC icon and selection include, but are not limited to, the following: 1) tap on any location on touch-sensitive display not on the SPC icon, 2) tap an SPC cancel icon, 3) other action such as shaking the device or changing the orientation of the device, 4) automatically cease displaying SPC icon if no finger gesture on the SPC icon is detected for a time duration, and 5) automatically cease displaying SPC icon after the initiation of an action with respect to a selection, where the action includes, but is not limited to, a cut action, a copy action, a paste action, or a text edit action.

Alternative gestures for starting a text selection include, but are not limited to, the following: 1) a tap-and-slide gesture on the SPC icon, 2) a tap on another icon in conjunction with a slide gesture on the SPC icon, 3) a two-finger slide gesture on the SPC icon.

Alternative gestures for ending a selection or drag include, but are not limited to, the following: 1) a finger lift at the end of the slide gesture on the SPC icon when the select lock or drag lock is set to "OFF", 2) a finger lift and a tap at the end of the slide gesture on the SPC icon when the select lock or drag lock set to "ON".

Alternative gestures or events causing the displaying of a toolbar or menu comprising one or more editing icons such as a "Cut" icon, "Copy" icon, or "Paste" icon include, but are not limited to, the following: 1) display of a cursor (a selection of zero length), and 2) display of a selection of non-zero length. Examples are illustrated in FIGS. 3A-3J, FIGS. 4A-4H, FIGS. 5A-5F, FIGS. 6A-6F, FIGS. 7A-7E, FIGS. 8A-8H, FIGS. 9A-9D, FIGS. 10A-10D, FIGS. 10E-10I, FIGS. 11A-11H, and FIGS. 12A-12G.

The methods and UI of this disclosure may include the use of stylus gestures in conjunction with the use of finger gestures, or the use of stylus gestures in lieu of the use of finger gestures.

We have shown several example SPC icon designs in FIG. 3J. There are other variations on the design of the SPC icon with respect to the size and shape of the icon and presence of transparent and/or semitransparent regions, and other features and aspects that may work equally well. For example, the horizontal extent of SPC icon can be less than or equal to the horizontal extent of the display. For example, the horizontal extent of SPC icon can be substantially equal to, approximately one-half of, or approximately one-fourth of the horizontal extent of the display. The value for Kx and the functional dependence of Kx on the time rate of change of finger position in the x direction can be set by the user to provide good usability for the particular horizontal extent of the SPC icon. The size and shape of the SPC icon can changed to suit the needs of a particular application or use case. The vertical extent of the SPC icon can be chosen similarly. For example, the vertical extent of the SPC icon can be less the vertical extent of the selection. The vertical extent of the SPC icon can be substantially equal to the vertical extent of the selection. The vertical extent of the SPC icon can be two to four or more times the vertical extent of the selection. The size, color, and/or degree of transparency of the SPC icon may be user selectable to provide accessibility to the broadest range of users.

The methods and UI may include enabling the user to specify via settings a number of parameters. These may include, but are not limited to enabling the user to specify one or more of the following:

Specify $K_x$ where $\Delta Sx = K_x \Delta F_x$, $\Delta Sx$ is the change in the selection position in the x direction, $\Delta F_x$ is the change in the finger position on the SPC icon in the x direction, and $K_x$ is a constant. This can be illustrated by the following three examples: 1) If $K_x=0.25$ and the user changes her finger position on the SPC icon in the x direction by a distance equal to the full width of the display, then the device will change the position of the selection in the x direction by a distance equal to $1/4^{th}$ the width of the display. 2) If $K_x=1.0$ and the user changes her finger position on the SPC icon in the x direction by a distance equal to the full width of the display, then the device will change the position of the selection in the x direction by a distance equal to the width of the display. 3) If $K_x=4.0$ and the user changes her finger position on the SPC icon in the x direction by a distance equal to $1/4^{th}$ the width of the display, then the device will change the position of the selection in the x direction by a distance equal to the width of the display.

Specify $K_x$ where $\Delta Sx = K_x \Delta F_x$, $\Delta Sx$ is the change in the selection position in the x direction, $\Delta F_x$ is the change in the finger position on the SPC icon in the x direction, and where $K_x$ is a function he time rate of change of the finger position on the SPC icon in the x direction. This can be written $K_x = f(d\Delta F_x/dt)$. In one example embodiment this may include enabling the user to specify the dependence of $K_x$ on the time rate of change of the finger position on the SPC icon in the x direction by enabling the user to set a "tracking speed" parameter over a range of values from "slow" to "fast" as discussed in reference to FIG. 13A and FIG. 13B. In this example embodiment, with a "tracking speed" parameter set by the user at the "slow" end of the range, $K_x$ may be approximately constant with a weak dependence on the time rate of change of finger position on the SPC icon in the x-direction. With a "tracking speed" parameter set by the user at the "fast" end of the range, $K_x$ may have a strong dependence on the time rate of change of finger position on the SPC icon in the x-direction. With a "tracking speed" parameter set by the user at the mid-range position, then $K_x$ may have a moderate dependence on the time rate of change of finger position on the SPC icon in the x direction. This can be illustrated by the following example. When the time rate of change of finger position on the SPC icon in the x direction is small, then the device may set $K_x=0.25$ for example; when the time rate of change of finger position on the SPC icon in the x direction is large, then the device may set $K_x=10$ for example.

The user may define the behavior of the select lock. The user may set "select lock" (sometimes called drag lock with mouse or touch pad pointing devices) to be OFF. With "select lock" OFF, the device can end the selection in response to detecting that the user has lifted his finger at the end of a tap-and-slide finger gesture on the SPC icon. The user may set "select lock" ON. With "select lock" on, the device can end the selection in response to detecting a tap finger gesture after detecting that the user has lifted his finger at the end of the tap-and-slide gesture on the SPC icon. With "select lock" turned ON, the user can conveniently select text from a selection start point to a selection end point with multiple gestures and then end the selection with a finger lift followed by a finger tap gesture on the SPC icon once selection end point has been positioned.

The methods and UI may include enabling the user to specify via settings a number of parameters for providing enhanced accessibility for users. These may include, but are not limited to enabling the user to specify one or more of the following: 1) a user may change the vertical extent of the SPC icon from a standard size (about 12 points in height for example) to a larger size by setting a slider control or by other means to better suit the needs or preferences of the user, 2) a user may set the vertical extent of the SPC icon to be on the order of the height of the largest character for each line of characters, 3) a user may change Kx as outlined above to better serve the needs of the user for convenient and precise horizontal positioning of the selection, 4) a user may define the use of alternative gestures or actions such as voice commands, hand gestures, gaze gestures in addition to, or in lieu of, a particular finger gesture.

Whereas we have focused this disclosure on methods and graphical user interfaces for positioning a cursor and selecting text on mobile computing devices with touch-sensitive displays such as smart phones and tablet computers, these methods and graphical user interfaces may be used with other devices with touch-sensitive displays including, but not limited to, notebook computers with touch-sensitive displays, and notebook/tablet hybrid devices with touch-sensitive displays.

This disclosure includes methods comprising a handheld computing device 100 with a touch-sensitive display implementing one or more of the methods selected from those described in reference to FIGS. 3-13 and those described in FIG. 14A-C, FIG. 15A-C, and FIG. 16A-C.

This disclosure includes a handheld mobile computing device 100 comprising a touch screen display, one or more processors, memory; and one or more programs, wherein one or more programs are stored in memory and configured to be executed by the one or more processors, the one or more programs including instructions for implementing one or more of the methods selected from those described in reference to FIGS. 3-13 and those described in FIG. 14A-C, FIG. 15A-C, and FIG. 16A-C.

This disclosure includes a computer readable storage medium storage medium storing one or more programs, the one or more programs comprising instructions, which when executed by a handheld mobile computing device 100 with a touch screen display, cause the device to implement one or more of the methods selected from those described in reference to FIGS. 3-13 and those described in FIG. 14A-C, FIG. 15A-C, and FIG. 16A-C.

This disclosure includes graphical user interfaces on a computing device 100 with a touch-sensitive display selected from those described in reference to FIGS. 3-13 and those described in reference to FIG. 14A-C, FIG. 15A-C, and FIG. 16A-C.

Throughout this disclosure we have referred to selection 310. We have also referred to cursor 508. Finally, we have referred to selected text, denoted by some marker such a highlighting, showing the selection start point and the selection end point within a body of text. One selected text example is selection 408 described in reference to FIG. 4D. To avoid confusion in this disclosure, we now describe again each of these items in the context of existing devices and existing graphical user interfaces.

Cursor 508 (a selection of zero length) is sometimes called an insertion mark. In this disclosure the cursor (a selection of zero length) is displayed as a vertical bar. The user may position the cursor (a selection of zero length) to mark the location at which text entry can begin within an editable content displayed on a display screen. In the case of a new document with no text, the cursor (a selection of zero length) may be displayed by default at the first position in the document where text may be entered. Since the cursor (a selection of zero length) marks a text entry location, a cursor (a selection of zero length) is displayed within editable content and no cursor is displayed within read-only content. The cursor is familiar to any user of a word processing application.

The smallest selection for editable text is cursor 508 (a selection of zero length). The smallest selection for read-only text is selection 310 of one character length.

A multi-character text selection is also a type of mark. The user may select the location of the selection start point and the location of the selection end point. The mark denotes the portion of text that has been selected by the user. Highlighting or other means may be used identify the selected text. Since text may be selected for example for cut, copy, or paste operations within editable content, and for copy operations within read-only content, selected text may be displayed within both editable and read-only content. The selection of text is again familiar to any user of a word processing application.

A marker, such as a cursor (a selection of zero length) or a selection of one or multiple character length, is associated with content and thereby moves with the content when the content is scrolled (moved).

Desktop and notebook computers employ a graphical-user-interface designed for use with a device such as a mouse or touch pad for controlling the position of a pointer on the display screen. Mobile computing devices with a touch-sensitive displays typically employ a graphical user interface designed for use with the user's finger as the pointer. Whereas the graphical user interfaces for these devices include such a cursor (a selection of zero length) or a selection of one or multiple character length, the graphical user interfaces of these devices do not typically display a pointer. The pointer for these devices with touch-sensitive displays is typically the user's finger.

The foregoing disclosure, for the purpose of explanation, has included reference to specific embodiments. However, the illustrative discussions above are not intended to be exhaustive or to limit the invention to the precise forms disclosed. Many modifications and variations are possible in view of the above teachings. The embodiments were chosen and described in order to explain the principals of the invention and its practical applications, to thereby enable others skilled in the art to best utilize the invention and various embodiments with various modifications as are suited to the particular use contemplated.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

I claim:

1. A mobile computing device, comprising:
   a touch-sensitive display;
   a processor; and
   a memory configured to store one or more programs;
   wherein the processor is configured to execute the one or more programs to cause the mobile computing device to:
   display within a text content having a text content type a selection having a selection start point and a selection end point;
   display the selection within the text content wherein the selection is a zero-length selection when the text content type is editable text content;
   display the selection within the text content wherein the selection is a one-character-length selection when the text content type is read-only text content;
   display a control icon;
   detect a contact on the touch-sensitive display; and
      in response to detecting a change in a position of the contact beginning anywhere on the control icon, change a position of the selection start point within the text content by an amount proportional to the change in the position of the contact.

2. The device of claim 1, the one or more programs further including instructions to cause the device to:
   detect the speed of the change in a position of the contact on the touch-sensitive display; and
   in response to detecting a change in horizontal position of the contact beginning anywhere on the control icon, change a horizontal position of the selection start point within the text content by an amount proportional to the change and the speed of change in the horizontal position of the contact.

3. The device of claim 1, the one or more programs further including instructions to cause the device to:
   in response to detecting a tap and change in a position of the contact beginning anywhere on the control icon:
      start a multicharacter text selection at the selection start point wherein a position of the selection end point within the text content is changed.

4. The device of claim 3, the one or more programs further including instructions to cause the device to:

in response to detecting a lift from the control icon, end the multicharacter selection at the selection end point to complete an extended length selection.

5. The device of claim 3, the one or more programs further including instructions to cause the device to:
in response to detecting a lift from the control icon followed by a tap on the control icon, end the multicharacter selection at the selection end point to complete an extended length selection.

6. The device of claim 4, the one or more programs further including instructions to cause the device to:
in response to detecting a tap at a first position on the control icon:
cancel the extended length selection;
display a selection at the first position; and
continue to display the control icon.

7. The device of claim 5, the one or more programs further including instructions to cause the device to:
in response to detecting a tap at a first position on the control icon:
cancel the extended length selection;
display a selection at the first position; and
continue to display the control icon.

8. A non-transitory computer readable storage medium storing one or more programs, the one or more programs comprising instructions, when executed, cause a mobile computing device with a touch sensitive display to:
display within a text content having a text content type a selection having a selection start point and a selection end point;
display the selection within the text content wherein the selection is a zero-length selection when the text content type is editable text content;
display the selection within the text content wherein the selection is a one-character-length selection when the text content type is read-only text content;
display a control icon;
detect a contact on the touch-sensitive display; and
in response to detecting a change in a position of the contact beginning anywhere on the control icon, change a position of the selection start point within the text content by an amount proportional to the change in the position of the contact.

9. The non-transitory computer readable storage medium of claim 8 further including instructions, when executed, cause the device to:
detect the speed of the change in a position of the contact on the touch-sensitive display; and
in response to detecting a change in horizontal position of the contact beginning anywhere on the control icon, change a horizontal position of the selection start point within the text content by an amount proportional to the change and the speed of change in the horizontal position of the contact.

10. The non-transitory computer readable storage medium of claim 8 further including instructions, when executed, cause the device to:
in response to detecting a tap and change in a position of the contact beginning anywhere on the control icon:
start a multicharacter text selection at the selection start point wherein a position of the selection end point within the text content is changed.

11. The non-transitory computer readable storage medium of claim 10 further including instructions, when executed, cause the device to:
in response to detecting a lift from the control icon, end the multicharacter selection at the selection end point to complete an extended length selection.

12. The non-transitory computer readable storage medium of claim 10 further including instructions, when executed, cause the device to:
in response to detecting a lift from the control icon followed by a tap on the control icon, end the multicharacter selection at the selection end point to complete an extended length selection.

13. The non-transitory computer readable storage medium of claim 11 further including instructions, when executed, cause the device to:
in response to detecting a tap at a first position on the control icon:
cancel the extended length selection;
display a selection at the first position; and
continue to display the control icon.

14. The non-transitory computer readable storage medium of claim 12 further including instructions, when executed, cause the device to:
in response to detecting a tap at a first position on the control icon:
cancel the extended length selection;
display a selection at the first position; and
continue to display the control icon.

15. A method, comprising:
at a computing device with a touch-sensitive display:
displaying within a text content having a text content type a selection having a selection start point and a selection end point;
displaying the selection within the text content wherein the selection is a zero-length selection when the text content type is editable text content;
displaying the selection within the text content wherein the selection is a one-character-length selection when the text content type is read-only text content;
displaying a control icon;
detecting a contact on the touch-sensitive display; and
in response to detecting a change in a position of the contact beginning anywhere on the control icon, changing a position of the selection start point within the text content by an amount proportional to the change in the position of the contact.

16. The method of claim 15, further including:
detecting the speed of the change in a position of the contact on the touch-sensitive display; and
in response to detecting a change in horizontal position of the contact beginning anywhere on the control icon, changing a horizontal position of the selection start point within the text content by an amount proportional to the change and the speed of change in the horizontal position of the contact.

17. The method of claim 15, further including:
in response to detecting a tap and change in a position of the contact beginning anywhere on the control icon:
starting a multicharacter text selection at the selection start point wherein a position of the selection end point within the text content is changed.

18. The method of claim 17, further including:
in response to detecting a lift from the control icon, ending the multicharacter selection at the selection end point to complete an extended length selection.

19. The method of claim 17, further including:
in response to detecting a lift from the control icon followed by a tap on the control icon, ending the multicharacter selection at the selection end point to complete an extended length selection.

20. The method of claim 18, further including:
in response to detecting a tap at a first position on the control icon:
cancelling the extended length selection;
displaying a selection at the first position; and
continue to display the control icon.

21. The method of claim 19, further including:
in response to detecting a tap at a first position on the control icon:
cancelling the extended length selection;
displaying a selection at the first position; and
continue to display the control icon.

22. The device of claim 1, wherein the control icon is displayed as a rectangle surrounding a line of text.

23. The non-transitory computer readable storage medium of claim 8, wherein the control icon is displayed as a rectangle surrounding a line of text.

24. The method of claim 15, wherein the control icon is displayed as a rectangle surrounding a line of text.

\* \* \* \* \*